US010389139B2

(12) United States Patent
Velderman et al.

(10) Patent No.: US 10,389,139 B2
(45) Date of Patent: Aug. 20, 2019

(54) PORTABLE POWER SUPPLY

(71) Applicant: Black & Decker Inc., Newark, DE (US)

(72) Inventors: Matthew J. Velderman, Baltimore, MD (US); John D. Cox, Lutherville, MD (US); Andrew E. Seman, Jr., Pylesville, MD (US); Daniel J. White, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 617 days.

(21) Appl. No.: 14/876,458

(22) Filed: Oct. 6, 2015

(65) Prior Publication Data

US 2016/0099575 A1    Apr. 7, 2016

Related U.S. Application Data

(60) Provisional application No. 62/099,614, filed on Jan. 5, 2015, provisional application No. 62/060,305, filed on Oct. 6, 2014.

(51) Int. Cl.
*H02J 7/00*  (2006.01)
*H02J 5/00*  (2016.01)
*B25F 5/00*  (2006.01)

(52) U.S. Cl.
CPC ............ *H02J 5/00* (2013.01); *B25F 5/00* (2013.01); *H02J 7/0013* (2013.01); *H02J 7/0042* (2013.01); *H02J 7/0065* (2013.01)

(58) Field of Classification Search
CPC ........................................... H02J 7/00

USPC ............................................ 320/112
See application file for complete search history.

(56) References Cited

U.S. PATENT DOCUMENTS

| 5,929,597 | A | 7/1999 | Pfeifer |
| 6,087,815 | A | 7/2000 | Pfeifer et al. |
| 6,104,162 | A | 8/2000 | Sainsbury et al. |
| 6,154,006 | A | 11/2000 | Hatanaka et al. |
| 6,498,457 | B1 | 12/2002 | Tsuboi |
| 6,528,970 | B1 * | 3/2003 | Liu ..................... H01M 10/46 320/107 |
| 7,190,091 | B1 | 3/2007 | Marshall |
| 8,994,336 | B2 | 3/2015 | Brotto et al. |
| 9,166,422 | B2 | 10/2015 | Brotto et al. |
| 9,344,008 | B2 | 5/2016 | Brotto et al. |
| 9,991,706 | B2 | 6/2018 | Brotto et al. |

(Continued)

OTHER PUBLICATIONS

International Search Report for Application No. PCT/US15/54262 dated Feb. 5, 2016.

(Continued)

*Primary Examiner* — Edward Tso
*Assistant Examiner* — Ahmed H Omar
(74) *Attorney, Agent, or Firm* — Michael Aronoff

(57) ABSTRACT

The present disclosure is directed to a portable power supply system for providing power to corded power tools. The portable power supply is configured to receive AC power through an AC power connector from an AC power source and DC power through a DC power connector from a DC power source. The portable power supply is configured to selectively provide the AC power and the DC power to a power supply output. The AC power and the DC power may be provided simultaneously or alternately to the power supply output.

22 Claims, 65 Drawing Sheets

(56) References Cited

U.S. PATENT DOCUMENTS

| | | | |
|---|---|---|---|
| 2001/0043052 A1 | 11/2001 | Griffey et al. | |
| 2008/0211310 A1 | 9/2008 | Jitaru et al. | |
| 2009/0184582 A1 | 7/2009 | Hwang | |
| 2011/0006603 A1 | 1/2011 | Robinson et al. | |
| 2011/0006660 A1 | 1/2011 | Robinson et al. | |
| 2011/0090726 A1 | 4/2011 | Brotto et al. | |
| 2011/0309681 A1* | 12/2011 | Kamijima | H02J 7/0013 307/66 |
| 2013/0113424 A1 | 5/2013 | Michael | |
| 2014/0266006 A1 | 9/2014 | Luke | |
| 2015/0349585 A1* | 12/2015 | Budde | H02J 9/062 307/66 |

OTHER PUBLICATIONS

Written Opinion dated Apr. 20, 2017 issued in corresponding PCT application PCT/US2015/054262.
EP Search Report for Application No. EP Application No. 15188642 dated Apr. 11, 2016.
Extended EP Search Report dated Mar. 22, 2018 issued in corresponding EP application No. 15849258.7.

* cited by examiner

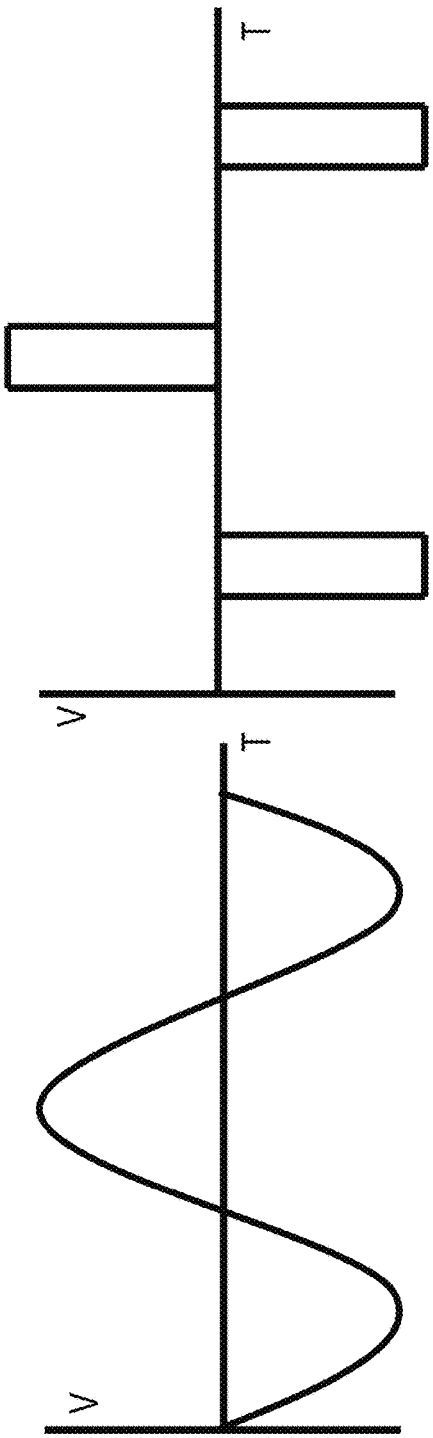
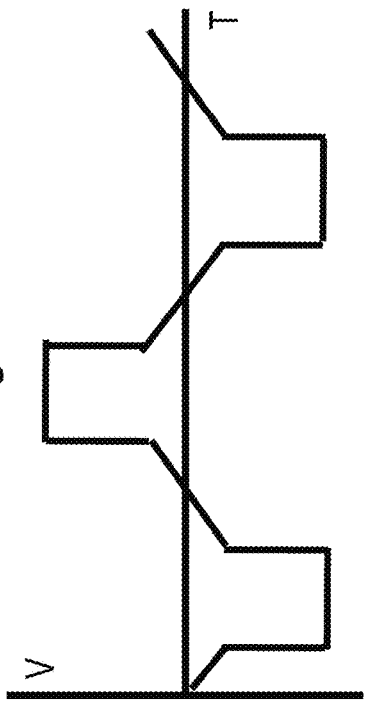
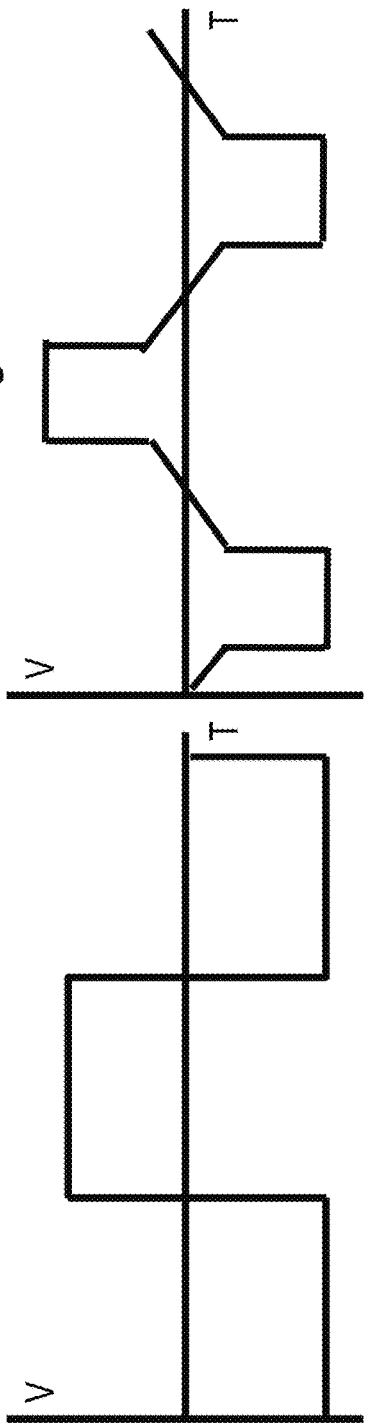
Figure 7a
Figure 7b
Figure 7c
Figure 7d

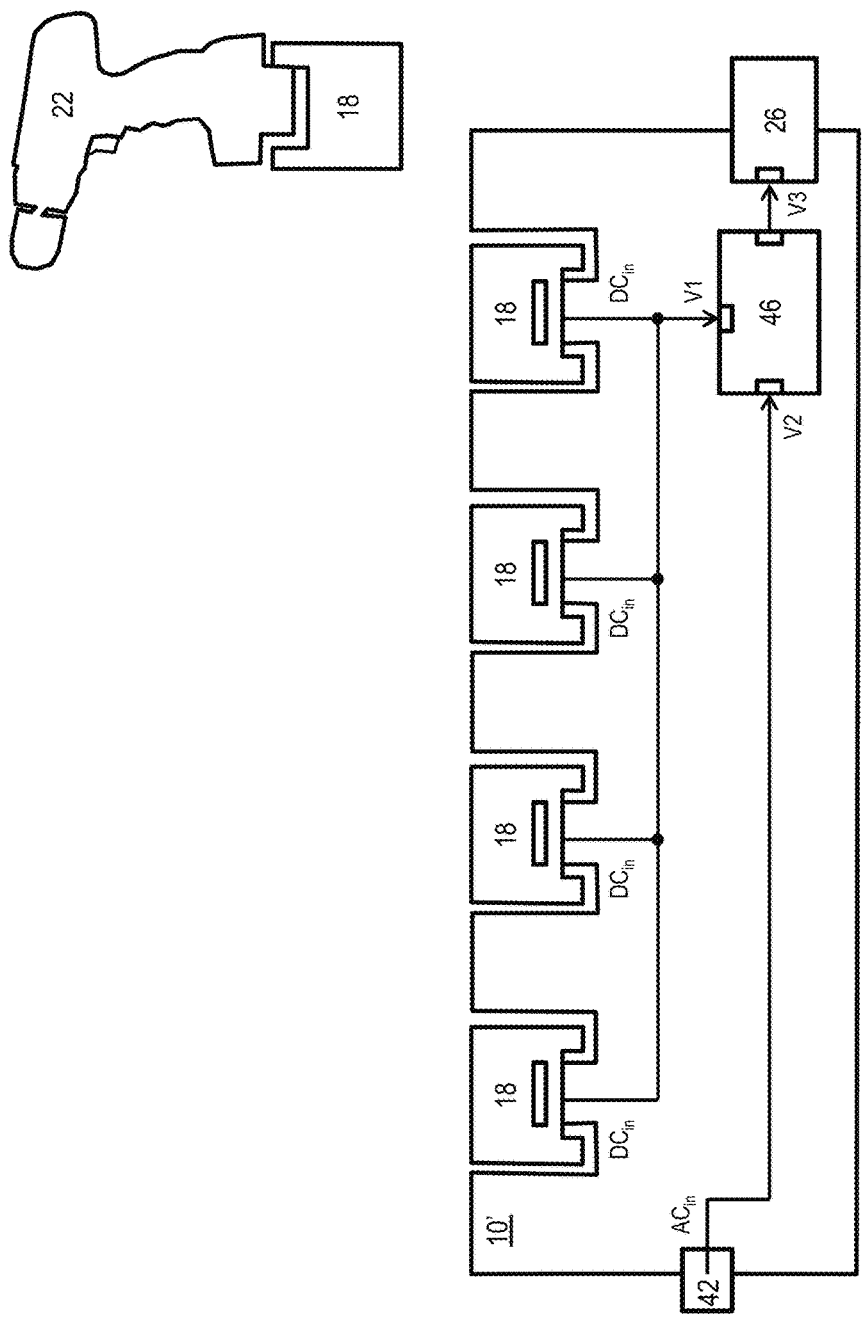

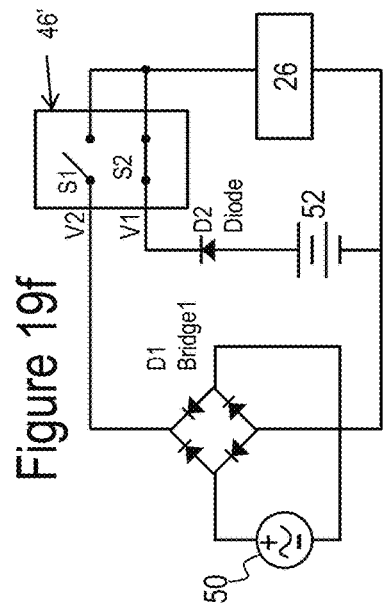

Figure 19f

See Figure 28 and Figure 19b
Motor is operating using battery power
output => see Figure 6

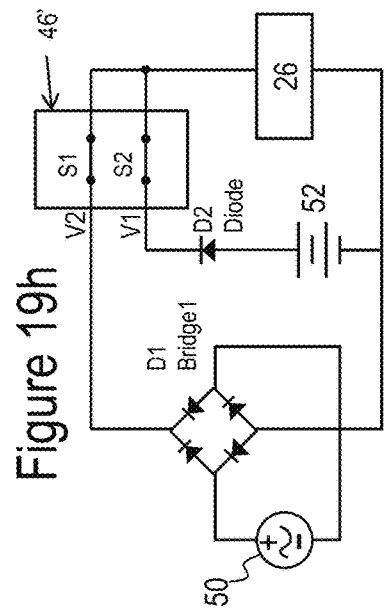

Figure 19h

See Figure 28 and Figure 19d
Motor is operating using rectified AC mains line power
and battery power connected in parallel
output => see Figure 31

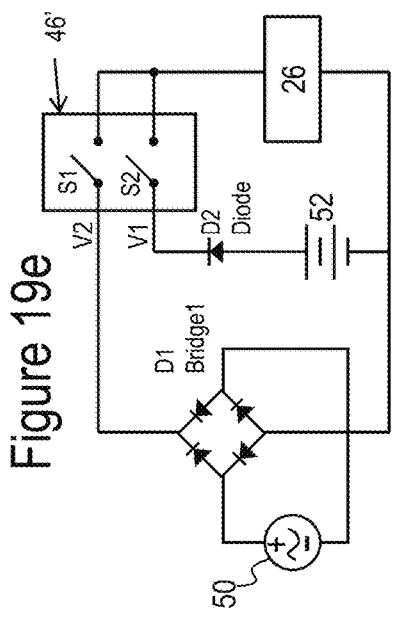

Figure 19e

See Figure 28 and Figure 19a
S1 and S2 are open and motor is stopped or coasting

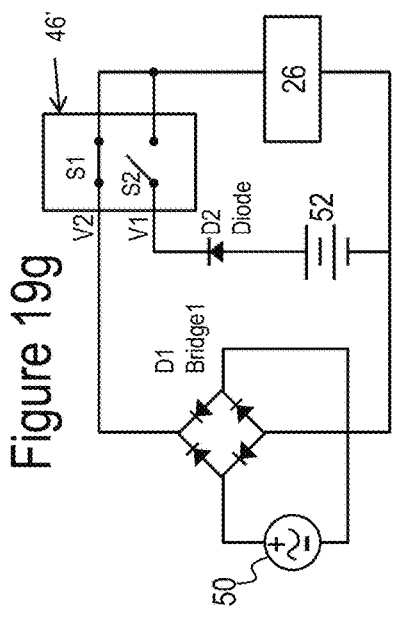

Figure 19g

See Figure 28 and Figure 19c
Motor is operating using rectified AC mains line power
output => see Figure 29

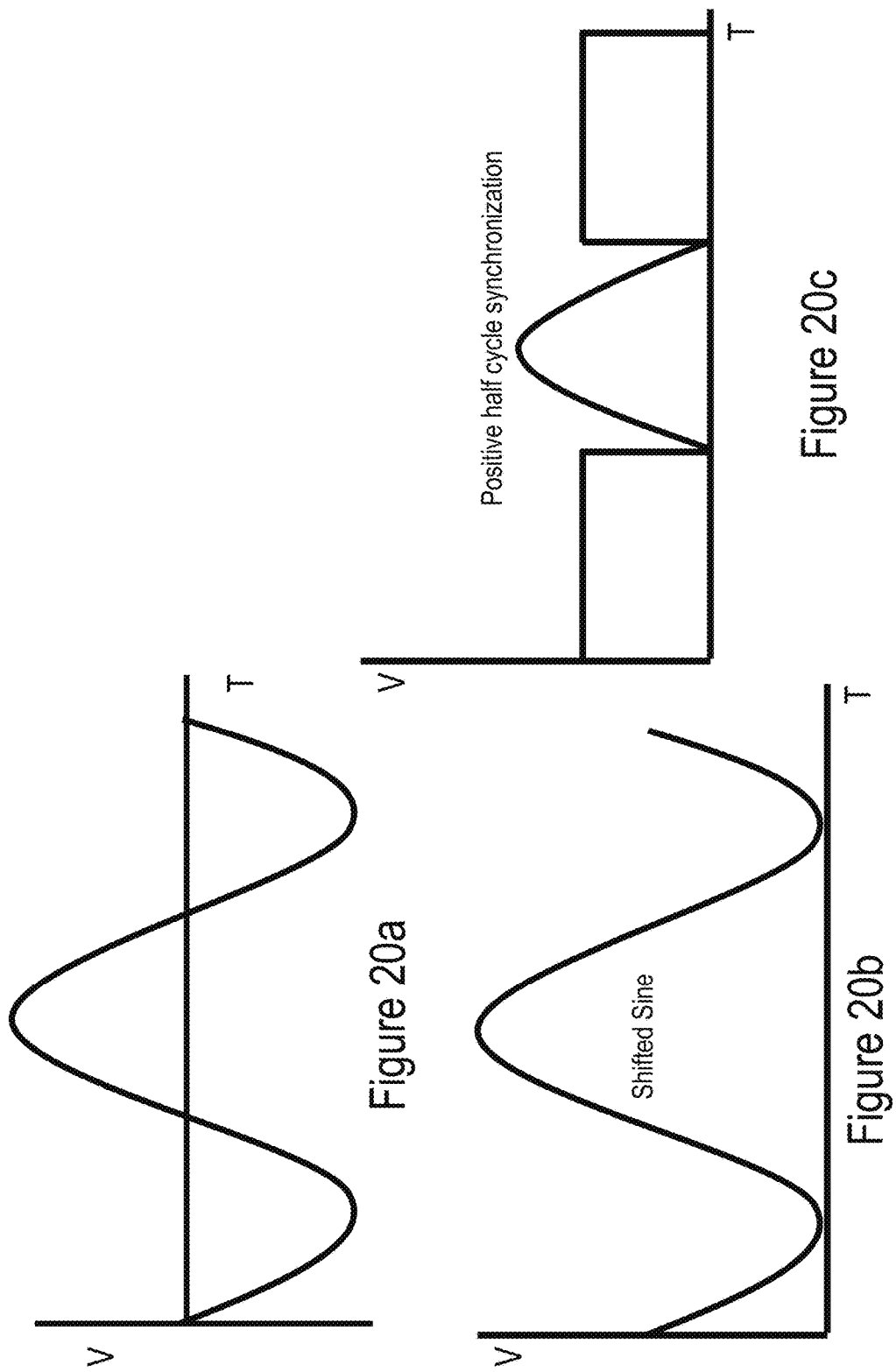

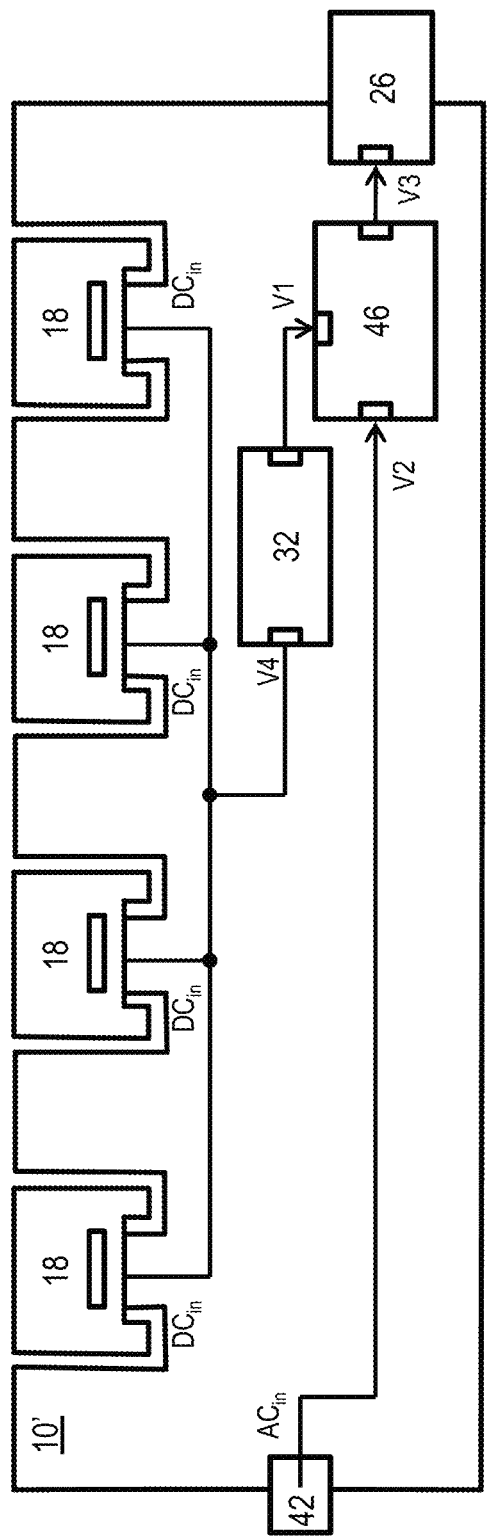

Output of voltage controller 46
160 volt battery pack(s) power and peak matching AC mains line power Output from Voltage Controller
50% battery pack power and 50% mains line power to Output

PORTABLE POWER SUPPLY

RELATED APPLICATIONS

This application claims priority under 35 U.S.C. § 119(e) to U.S. Provisional Patent Application No. 62/060,305, filed Oct. 6, 2014, titled "System and Method for Renting, Charging, and Discharging Battery Packs," and U.S. Provisional Patent Application No. 62/099,614, filed Jan. 5, 2015, titled, "Portable Power Supply," which are incorporated by reference in their entirety.

This application also incorporates by reference in their entirety U.S. patent application Ser. No. 12/917,128, filed Nov. 1, 2010, titled "Portable Alternating Current Inverter Having Reduced Impedance Losses," U.S. patent application Ser. No. 12/037,290, filed Feb. 28, 2008, titled "Portable Power Supply," U.S. Provisional Patent Application No. 60/891,540, filed Feb. 26, 2007, and U.S. patent application Ser. No. 14/715,258, filed May 18, 2015, titled "Power Tool System."

TECHNICAL FIELD

This application relates to a portable power supply system and method for providing portable power. In one implementation, the system is configured to receive DC power from a DC power source and AC power from an AC power source. The system is configured to output power from the DC power source and/or the AC power source.

BACKGROUND

Various types of electric power tools are commonly used in construction, home improvement, outdoor, and do-it-yourself projects. Conventional power tools generally fall into two categories—corded power tools that are powered by an AC power source, e.g., an AC mains line, and cordless power tools that are powered by one or more DC power sources, e.g., a rechargeable battery pack.

Corded power tools generally are used for heavy duty applications that require high power and/or long runtimes, such as heavy duty sawing, heavy duty drilling and hammering, and heavy duty metal working. However, as their name implies, corded power tools require the use of a cord that can be connected to an AC power source. In many applications, such as on construction sites, it is not convenient or practical to find a continuously available AC power source and/or AC power must be generated by a portable power supply such as a generator, e.g. gas powered generator.

Cordless power tools generally are used for lighter duty applications that require low or medium power and/or short runtimes, such as light duty sawing, light duty drilling, and fastening. As cordless tools tend to be more limited in their power and/or runtime, they have not generally been accepted by the industry for all applications. They are also limited by weight since the higher capacity batteries tend to have greater weight, creating an ergonomic disadvantage.

Generally, conventional power tool battery packs may not be able to run conventional corded power tools or other corded electrical devices, while untransformed AC power may not be able to be used to run cordless power tools. Further, the battery packs for cordless power tools may require frequent recharging, may be expensive to purchase, and may be cumbersome to manage on a large construction site.

There are portable power supplies (sometimes referred to as inverters) that utilize batteries to provide power to an inverter which in turn provides AC output power to operate corded power tools designed to operate from wall/AC mains line power. These conventional battery based portable power supplies utilize integral batteries or conventional sealed lead acid (SLA) batteries. Although this allows the user to operate the corded power tool without having access to wall/AC mains line power, it does not allow the user to remove the battery from the portable power supply and use the battery to operate a set of cordless power tools. In other words, conventional systems provide for a battery pack for operating a set of cordless power tools and a battery for operating the battery based portable power supply wherein the battery pack for operating the set of cordless power tools cannot supply power to the portable power supply and the battery for operating the portable power supply cannot supply power to the cordless power tools. In the power tool industry, it is desirable to be able to use cordless power tool battery packs to drive the corded power tools. In addition, it is desirable to use cordless power tool battery packs to run non-power tool electrical device that are also designed to operate from wall (AC, mains line) power.

Another aspect of this disclosure is operating electrical devices that normally operate on mains line power, for example corded power tools, to simultaneously use the mains line power and battery power to increase the power available to perform work.

Traditionally the mains line power supply in the US is limited to 15 or 20 amps from a 120 volt AC power receptacle. Because the 15 amp branch circuit is relatively common conventional devices that plug into a standard 120 volt AC power receptacle are designed around this 15 amp limit. Such a design limits the input power from the AC mains line to about 1800 watts and thus the output power of a typical motor will be about 1200 watts, taking into account various system efficiencies. For short durations these power levels may be exceeded, but at the risk of opening the circuit protection device associated with the branch circuit supplying the load. There are many power tool applications that would benefit from the power beyond what can be effectively delivered through the 120 volt AC power receptacle. Currently the only options for these applications are to utilize a special receptacle, a generator with special receptacles or alternative motive power such as an internal combustion engine. This aspect presents a method and system to deliver higher operating power without special receptacles or internal combustion engines attached to the electrical device.

SUMMARY

Instead of having a first type of battery for operating a set of cordless power tools and a second type of battery for operating a battery based portable power supply, one aspect of the present invention is to provide a battery based portable power supply having an electromechanical interface configured to mate with a removable battery pack. The removable battery pack has an electromechanical interface configured to mate with the portable power supply electromechanical interface and an electromechanical interface of a set of cordless power tools. In other words, the portable power supply electromechanical interface is identical to the electromechanical interface of the set of cordless power tools. As such, the removable battery pack is able to provide power to both the portable power supply and the cordless power tools. The portable power supply may be configured with a single interface to receive a single battery pack or may be configured with a plurality of interfaces to receive a corresponding plurality of battery packs.

An aspect of the present invention includes a removable battery-based portable power supply. An exemplary embodiment of the portable power supply comprises a housing. The housing comprises an electromechanical interface configured to removably mate/couple with an electromechanical interface of a battery pack wherein the battery pack electromechanical interface is configured to removably mate/couple with an electromechanical interface of a first electrical device. The first electrical device may be, for example, a cordless power tool. The output is configured to couple to and provide power to a second electrical device. The second electrical device may be, for example, a corded power tool. The portable power supply also comprises an inverter coupled to the battery interface and to the output.

The power supply may or may not include a booster for increasing the DC power of the batter pack(s).

Another aspect of the present invention includes a battery-based portable power supply that inputs battery-based DC power and/or AC power. Another exemplary embodiment of the portable power supply comprises a housing. The housing comprises an electromechanical interface configured to removably mate/couple with an electromechanical interface of a battery pack wherein the battery pack electromechanical interface is configured to removably mate/couple with an electromechanical interface of a first electrical device. The power supply housing also comprises an input configured to couple to an alternating current (AC) power source, an output configured to couple to a second electrical device to provide power to the second electrical device. The power supply also comprises a voltage controller coupled to the housing electromechanical interface, coupled to the input, and coupled to the output. The voltage controller is configured (1) to couple the input to the output or the electromechanical interface to the output and (2) to couple the input and the electromechanical interface to the output.

Another exemplary embodiment of the portable power supply comprises a housing. The housing comprises an electromechanical interface configured to removably mate/couple with an electromechanical interface of a battery pack wherein the battery pack electromechanical interface is configured to removably mate/couple with an electromechanical interface of a first electrical device. The housing also comprises an input configured to couple to an alternating current (AC) power source. The portable power supply also comprises a rectifier coupled to the input, an output configured to couple to and provide power to a second electrical device. The portable power supply also comprises a voltage controller coupled to the housing electromechanical interface, coupled to the rectifier, and coupled to the output and configured (1) to couple the rectifier to the output or the electromechanical interface to the output and (2) to couple the rectifier and the electromechanical interface to the output.

An example of electrical devices that could make up the set of electrical devices is a set of power tools. The one removable, rechargeable battery pack could be a plurality of battery packs. The power supply may or may not include an inverter for the battery pack(s). The power supply may or may not include an AC power supply input. The power supply may or may not include a rectifier for any AC power supplied to the AC power supply input.

A first embodiment of an instant portable power supply comprises a housing. The housing comprises an electromechanical interface configured to removably mate/couple with an electromechanical interface of a battery pack wherein the battery pack electromechanical interface is configured to removably mate/couple with an electromechanical interface of a first electrical device; an output configured to couple to a second electrical device to provide power to the second electrical device; and an inverter coupled to the battery interface and to the output.

The aforementioned first embodiment may further comprise a removable battery pack. The removable battery pack may comprise an electromechanical interface configured to removably mate/couple with the housing electromechanical interface and the electromechanical interface of the first electrical device and when electromechanically mated to the housing electromechanical interface, it is configured to provide power to the inverter.

In the aforementioned first embodiment the removable battery pack may comprises a plurality of battery packs and the housing electromechanical interface may comprise an electromechanical interface for each of the plurality of battery packs.

In the aforementioned first embodiment the removable battery pack may comprise a plurality of battery cells.

The aforementioned first embodiment may further comprise a booster.

The aforementioned first embodiment may further comprise a second output configured to couple to a third electrical device to provide DC power to the third electrical device.

The aforementioned first embodiment may further comprise a second output configured to couple to a third electrical device to provide DC power to the third electrical device.

In the aforementioned first embodiment an input of the second output is coupled to an output of the booster.

In the aforementioned first embodiment an input of the second output is coupled to the housing electromechanical interface.

The aforementioned first embodiment may further comprise a control communication connection between the inverter and the housing interface and the removable battery pack may comprise a pack status monitor and a current controller and the pack status monitor and the current controller may communicate with the inverter via the control communication connection.

The aforementioned first embodiment may further comprise a pack status monitor and a current controller and a control communication connection between the pack status monitor and the housing interface and the battery pack communicates battery pack parameter information from the battery pack to the pack status monitor and the current controller via the control communication connection.

The aforementioned first embodiment may further comprise a pack status monitor and a current controller and a control communication connection between the pack status monitor and each of the plurality of housing interfaces and each of the plurality of battery packs communicates battery pack parameter information from the battery pack to the pack status monitor and the current controller via the control communication connection.

In the aforementioned first embodiment the pack status monitor may comprise a plurality of pack status monitors, each of the plurality of pack status monitors may be associated with a single housing interface and all of the plurality of pack status monitors may be coupled to the current controller.

In the aforementioned first embodiment the current controller may comprise a plurality of current controllers, each of the plurality of current controllers may be associated with a single pack status monitor and all of the plurality of current controllers may be coupled to an input of the inverter.

The aforementioned first embodiment may further comprise an electrical device coupled to the output and a control communication connection between the electrical device and inverter.

In the aforementioned first embodiment the control communication connection may be part of a power supply connection between the output and the electrical device.

A second embodiment of an instant portable power supply comprises a housing. The housing comprises an electromechanical interface configured to removably mate/couple with an electromechanical interface of a battery pack wherein the battery pack electromechanical interface is configured to removably mate/couple with an electromechanical interface of a first electrical device; an input configured to couple to an alternating current (AC) power source; an output configured to couple to a second electrical device to provide power to the second electrical device; and a voltage controller coupled to the housing electromechanical interface, coupled to the input, and coupled to the output and configured (1) to couple the input to the output or the electromechanical interface to the output and (2) to couple the input and the electromechanical interface to the output.

The aforementioned second embodiment may further comprise a removable battery pack. The battery pack may comprise an electromechanical interface configured to removably mate/couple with the housing electromechanical interface and the electromechanical interface of the first electrical device and when electromechanically mated to the housing electromechanical interface it is configured to provide power to the voltage controller.

In the aforementioned second embodiment the removable battery pack may comprise a plurality of battery packs and the housing electromechanical interface may comprise an electromechanical interface for each of the plurality of battery packs.

In the aforementioned second embodiment the removable battery pack may comprise a plurality of battery cells.

The aforementioned second embodiment may further comprise an inverter and an input of the inverter may be coupled to the housing electromechanical interface and an output of the inverter may be coupled to the voltage controller.

The aforementioned second embodiment may further comprise a booster.

The aforementioned second embodiment may further comprise a charger, a current control and a charge control, either internally or in conjunction with the battery.

The aforementioned second embodiment may further comprise an electrical device. The electrical device may be configured to communicate with the voltage controller to control a mode of voltage controller.

A third embodiment of an instant portable power supply comprises a housing. The housing comprises an electromechanical interface configured to removably mate/couple with an electromechanical interface of a battery pack wherein the battery pack electromechanical interface is configured to removably mate/couple with an electromechanical interface of a first electrical device; an input configured to couple to an alternating current (AC) power source; a rectifier coupled to the input; an output configured to couple to a second electrical device to provide power to the second electrical device; and a voltage controller coupled to the housing electromechanical interface, coupled to the rectifier, and coupled to the output and configured (1) to couple the rectifier to the output or the electromechanical interface to the output and (2) to couple the rectifier and the electromechanical interface to the output.

The aforementioned third embodiment may further comprise a removable battery pack. The battery pack may comprise an electromechanical interface configured to removably mate/couple with the housing electromechanical interface and the electromechanical interface of the first electrical device and when electromechanically mated to the housing electromechanical interface and configured to provide power to the voltage controller.

In the aforementioned third embodiment the removable battery pack may comprise a plurality of battery packs and the housing electromechanical interface may comprise an electromechanical interface for each of the plurality of battery packs.

In the aforementioned third embodiment the removable battery pack may comprise a plurality of battery cells.

The aforementioned third embodiment may further comprise an inverter.

The aforementioned third embodiment may further comprise a booster.

Another aspect of the present invention includes a power supply apparatus comprising a housing having a receptacle, the receptacle configured to receive a battery pack; a power input connector configured to receive an input of electrical power; a power output connector configured to deliver an output of electrical power; a charging circuit coupled to the power input connector and to the receptacle, the charging circuit configured to control providing charging power to the receptacle using the input of electrical power; and a discharging circuit coupled to the power output connector and to the receptacle, the charging circuit configured to control providing discharging power from the receptacle to the power output connector, wherein the charging circuit is configured to provide charging power to the receptacle when the housing is received in a vending machine and when the housing is outside of the vending machine and a source of electrical power is connected to the power input connector.

The foregoing embodiment may also comprise a communications connector configured to be coupled to a communications line in the vending machine to send and/or receive a signal that causes the charging circuit to provide charging power to the receptacle when the housing is inside of the vending machine. The power input connector may be configured to receive a source of AC input power or the power input connector may be configured to receive a source of DC input power. The power input connector may comprise a first connector configured to receive a source of AC power and a second connector configured to receive a source of DC power. The power output connector may comprise an AC connector and/or a DC connector.

The foregoing embodiment may also comprise at least one battery pack and an inverter circuit configured to convert a DC power output from the at least one battery pack to an AC power output that is delivered to the power output connector. The at least one battery pack may be configured to generate a DC voltage that is greater than or equal to a peak value of a desired AC voltage, and the inverter circuit may be configured to convert the DC voltage generated by the at least one battery pack to an AC output voltage with a peak value that is at least as great as the peak value of the desired AC voltage, the AC output voltage being delivered to the power output connector.

The foregoing embodiment may also comprise a switching device that enables switching between a charging mode in which the charging circuit is active to charge the battery packs and a discharging mode in which the discharging circuit is active to enable discharge of the battery packs to the power outlet. The switching device may include an external switch that is switchable by a user. The switching device may include an automated switching device that switches to the charging mode upon detecting that the power input connector is coupled to a source of electrical power.

The foregoing embodiment may also comprise a handle coupled to the housing to enable carrying of the housing and at least one battery pack wherein the battery pack may be removable from the housing. The at least one battery pack may have a first set of electrical terminals that is connectable to a second set of electrical terminals in the receptacle to enable charging and discharging the at least one battery pack in the housing. The first set of electrical terminals can be connected to a third set of terminals on an electrical device that is separate from the apparatus, to enable the at least one battery pack to be electrically connected to the electrical device when the battery pack is removed from the housing. The electrical device may comprise a power tool, another battery charging device or another electrical device.

Another aspect of the present invention includes a power supply system comprising a battery pack and a charging and discharging container having a housing with a receptacle, the receptacle configured to removably receive and electrically connect to the battery pack, a power input connector configured to receive input power from an external power supply, a power output connector configured to deliver output power from the battery pack, a charging circuit configured to control charging of the battery pack with the input power when the battery pack is received in the receptacle, and a discharging circuit configured to control discharging of output power from the battery pack to the power output connector, wherein the power output connector is electrically coupleable to a first electrical device to power the first electrical device when the battery pack is received in the receptacle, and wherein the battery pack is electrically coupleable to a second electrical device to power the second electrical device when the battery pack is removed from the receptacle.

Another aspect of the present invention includes a system comprising a battery pack; a first electrical device; a second electrical device; and a charging and discharging container having a housing with a receptacle, the receptacle configured to removably receive and electrically connect to the battery pack, a power input connector configured to receive input power from an external power supply, a power output connector configured to deliver an output power from the battery pack, a charging circuit configured to control charging of the battery pack with the input power when the battery pack is received in the receptacle, and a discharging circuit configured to control discharging of output power from the battery pack to the power output connector, wherein the power output connector is electrically coupleable to the first electrical device to power the first electrical device when the battery pack is received in the receptacle, and wherein the battery pack is electrically coupleable to the second electrical device to power the second electrical device when the battery pack is removed from the receptacle.

In the foregoing embodiments the power input connector may be configured to receive a source of AC input power or a source of DC input power. The power input connector may comprise a first connector configured to receive a source of AC power and a second connector configured to receive a source of DC power. The power output connector may comprise an AC connector or a DC connector. The foregoing embodiment may also comprise an inverter circuit configured to convert a DC power output from the battery packs to an AC power output that is delivered to the power output connector. In the foregoing embodiment, the at least one battery pack may be configured to generate a DC voltage that is greater than or equal to a peak value of a desired AC voltage, and the inverter circuit may be configured to convert the DC voltage generated by the battery pack to an AC output voltage with a peak value that is at least as great as the peak value of the desired AC voltage, the AC output voltage being delivered to the power output connector. The foregoing embodiment may also comprise a switching device that enables switching between a charging mode in which the charging circuit is active to charge the battery packs and a discharging mode in which the discharging circuit is active to enable discharge of the battery packs to the power output connector. The switching device may include an external switch that is switchable by a user. The switching device may include an automated switching device that switches to the charging mode upon detecting that the power input connector is coupled to a source of electrical power. The foregoing embodiment may also comprise a handle coupled to the housing to enable carrying of the housing. The first electrical device may comprise an AC power tool and the second electrical device comprises a DC power tool.

Another aspect of the present invention includes a battery pack container comprising a housing having a receptacle for receiving at least one battery pack; a first power input connector configured to receive power from an AC power supply; a second power input connector configured to receive power from a DC power supply; and a charging circuit coupled to the first and second power input connectors and to the receptacle, the charging circuit configured to control providing charging power to the receptacle using power from at least one of the AC power supply and the DC power supply.

The foregoing embodiment may also comprise a power output connector coupled to the housing and configured to supply output power; and a discharging circuit coupled to the power output connector and to the receptacle, the discharging circuit configured to control discharging of electrical power from the at least one battery pack to the power output connector. The power output connector may comprise an AC connector and/or a DC connector.

The foregoing embodiment may also comprise an inverter circuit configured to convert a DC power output from the at least one battery pack to an AC power output that is delivered to the power output connector. The at least one battery pack may be configured to generate a DC voltage that is greater than or equal to a peak value of a desired AC voltage, and the inverter circuit may be configured to convert the DC voltage generated by the at least one battery pack to an AC output voltage with a peak value that is at least as great as the peak value of the desired AC voltage, the AC output voltage being delivered to the power output connector.

The foregoing embodiment may also comprise a switching device that enables switching between a charging mode in which the charging circuit is active to charge the battery packs and a discharging mode in which the discharging circuit is active to enable discharge of the battery packs to the power outlet. The switching device may include an external switch that is switchable by a user or may include an automated switching device that switches to the charging mode upon detecting that the power input connector is coupled to a source of electrical power.

The foregoing embodiment may also comprise a handle coupled to the housing to enable carrying of the housing.

Another aspect of the present invention includes a portable power supply apparatus comprising a housing having a receptacle for receiving at least one battery pack; a handle coupled to the housing to enable carrying of the housing; a power input connector configured to receive input power from an external power supply; a power output connector configured to supply power from the housing; a charging circuit coupled to the power input connector and to the receptacle, the charging circuit configured to control providing charging power to the receptacle using the input power; and a discharging circuit coupled to the power outlet and to the receptacle, the charging circuit configured to control discharging of output power from the receptacle to the power output connector.

The foregoing embodiment may also comprise an inverter circuit configured to convert a DC power output from the receptacle to an AC power output that is delivered to the power output connector. The foregoing embodiment may also comprise at least one battery pack, wherein the at least one battery pack may be configured to generate a DC voltage that is greater than or equal to a peak value of a desired AC voltage, and the inverter circuit may be configured to convert the DC voltage generated by the battery pack to an AC output voltage with a peak value that is at least as great as the peak value of the desired AC voltage, the AC output voltage being delivered to the power output connector. The power input connector may be configured to receive a source of AC input power and/or a source of DC input power. The power input connector may comprise a first input connector configured to receive a source of AC power and a second input connector configured to receive a source of DC power. The power output connector may comprise an AC connector and/or a DC connector.

The foregoing embodiment may also comprise a switching device that enables switching between a charging mode in which the charging circuit is active to charge the battery packs and a discharging mode in which the discharging circuit is active to enable discharge of the battery packs to the power output connector. The switching device may include an external switch that is switchable by a user or an automated switching device that switches to the charging mode upon detecting that the power input connector is coupled to a source of electrical power.

Another aspect of the present invention includes a portable power supply comprising a housing including a battery connector for electrically coupling to a battery pack; a power input connector configured to receive power from an external power supply; a power output connector configured to supply power from the housing; a switch for selectively coupling the battery connector to the power input connector or the battery connector to the power output connector.

In the foregoing embodiment, the switch may include a first switch for coupling the battery connector to the power input connector and a second switch for coupling the battery connector to the power output connector.

The foregoing embodiment may also comprise a charging circuit coupled to the power input connector and to the battery connector, wherein the charging circuit supplies charging power received at the power input connector to the battery connector. The foregoing embodiment may also comprise an inverter circuit coupled to the battery connector and to the power output connector, wherein the inverter circuit is configured to receive DC voltage output from the battery connector, convert the received DC voltage to an AC voltage and supply the AC voltage to the power output connector.

Another aspect of the present invention includes a portable power supply comprising a carrier comprising a battery connector, the battery connector configured to receive a removable, rechargeable battery pack, a charging circuit coupled to the battery connector to supply charging power to the battery connector, a power supply input connector coupled to the charging circuit configured to receive input power and to provide the input power to the charging circuit, wherein the input power may be received from a variety of power sources.

In the foregoing embodiment the input power may comprise an AC power source and/or a DC power source. In the foregoing embodiment, the power supply input connector may comprise an AC power connector and/or a DC power connector. The foregoing embodiment may comprise a receptacle, wherein the receptacle comprises the battery connector. The foregoing embodiment may comprise a handle for transporting the carrier containing the battery pack. The foregoing embodiment may comprise a cover for the receptacle for securing the battery pack in the receptacle during transportation.

Implementations of this aspect may include one or more of the following features.

Advantages may include one or more of the following.

These and other advantages and features will be apparent from the description and the drawings.

BRIEF DESCRIPTION OF THE DRAWINGS

FIGS. 7*a*-7*d* are simple graphs illustrating an output from various exemplary inverters of the portable power supply of the present invention.

FIG. 18 is another simple block diagram of the exemplary portable power supply of FIG. 17 with the battery packs coupled to the power supply housing.

FIGS. 19a-19h are simple circuit diagrams of exemplary voltage controllers of the present invention.

FIGS. 20a through 20c are simple graphs illustrating power curves of the present invention.

FIG. 21 is a simple block diagram of another exemplary portable power supply of the present invention.

DETAILED DESCRIPTION

Figure 1:
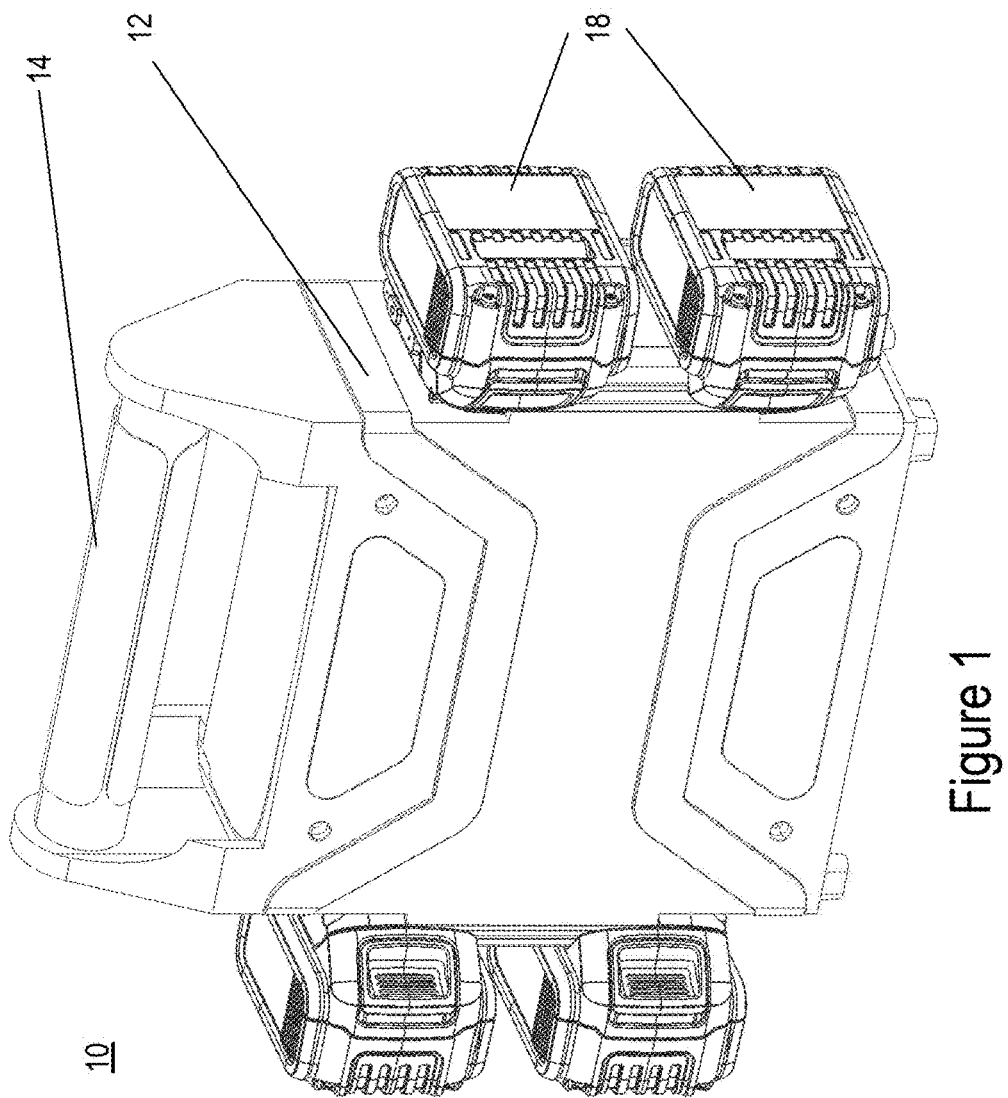
FIG. 1 is a perspective view of an exemplary portable power supply of the present invention.
Figure 2:
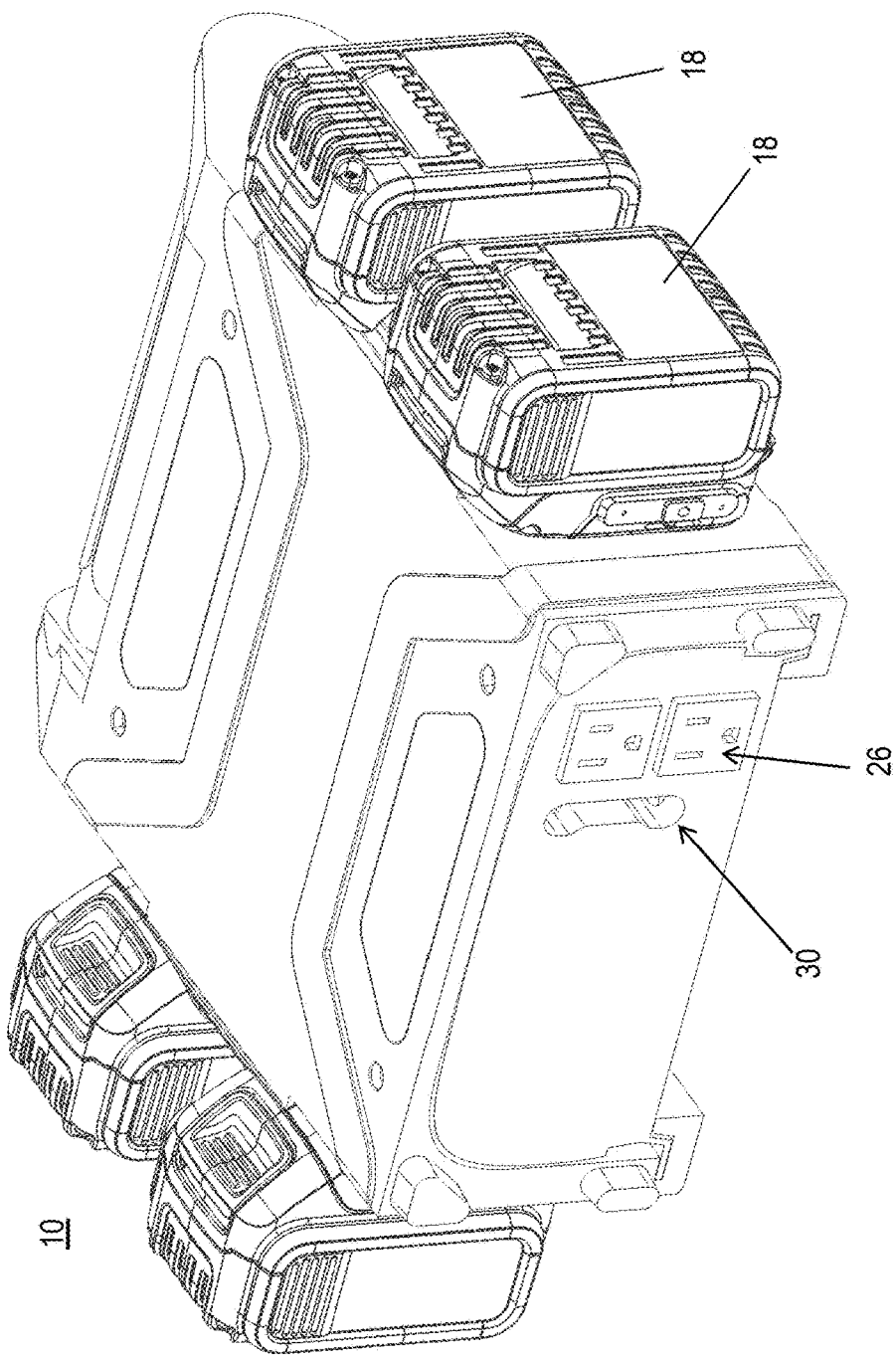
FIG. 2 is another perspective view of the exemplary portable power supply of FIG. 1.
Figure 3:
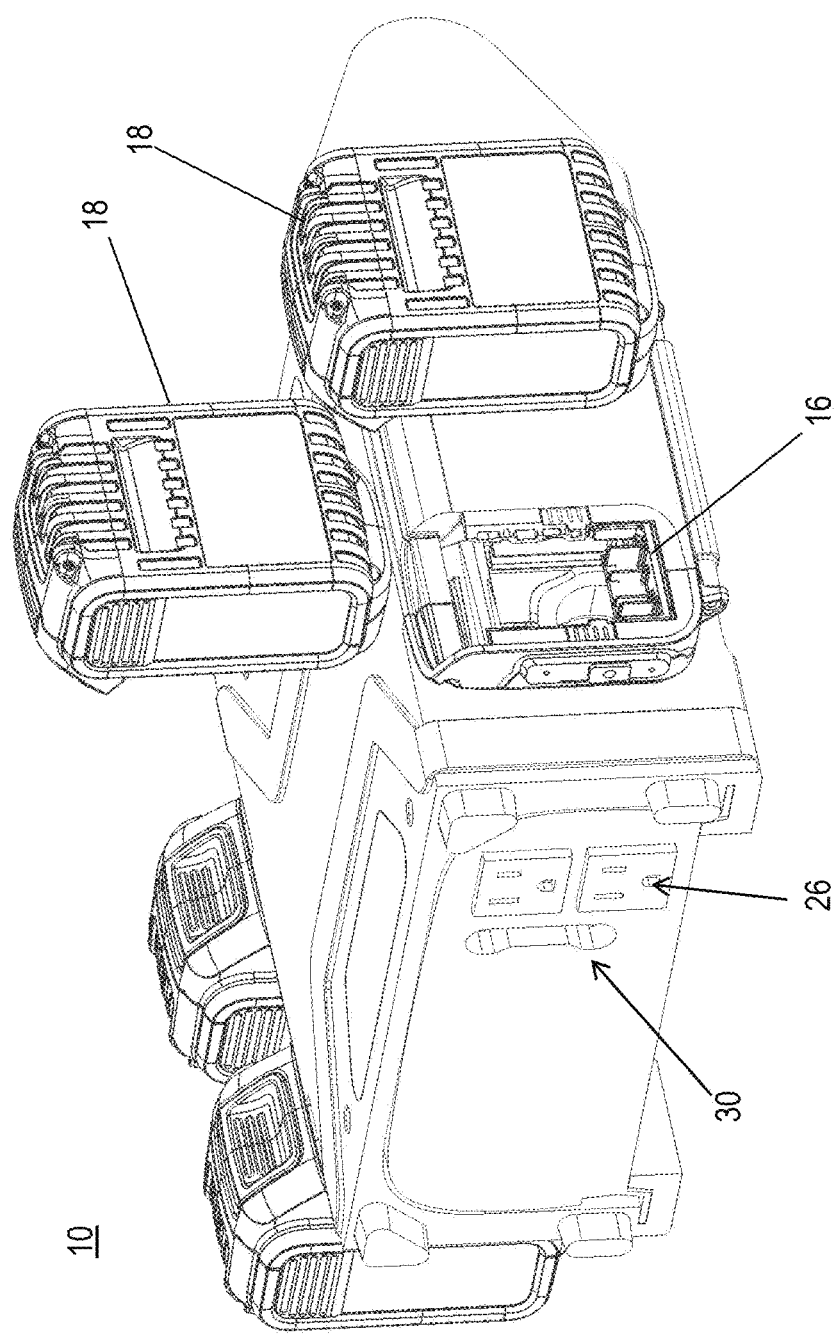
FIG. 3 is another perspective view of the exemplary portable power supply of FIG. 1 with a battery pack removed.

Referring to FIG. 1 through FIG. 3, in an exemplary embodiment, a removable battery pack based portable power supply 10 is illustrated. The portable power supply comprises a carrier housing 12 and a handle 14. The housing of this exemplary embodiment of the portable power supply comprises four electromechanical interfaces—also referred to as a power supply interface 16. The power supply electromechanical interfaces are configured to removably mate/couple with an electromechanical interface of a battery pack 18—also referred to as a battery pack interface 20—wherein the battery pack electromechanical interface 20 is configured to removably mate/couple with an electromechanical interface of an electrical device, for example, a cordless power tool 22—also referred to as a tool interface 24. In alternate exemplary embodiments, the housing may have fewer or more electromechanical interfaces such that it is configured to couple with fewer or more battery packs. An exemplary embodiment of the portable power supply may have a few as one interface and be configured to operate with a single battery pack.

Referring also to FIG. 2, the housing also includes at least one output connector/coupler 26 configured to couple to a corded electrical device 28 to provide AC power or hybrid AC/DC power to the electrical device 28 coupled to the connector/coupler 26. The housing 12 may also includes a second AC or hybrid power connector/coupler. The housing 12 may also include a third output connector/coupler 30 configured to couple to a corded electrical device to provide DC power to the electrical device coupled to the DC connector/coupler 30.

An exemplary battery based portable power supply system, illustrated in FIGS. 1-5 comprises four removable, rechargeable battery packs 18. The battery packs 18 include an electromechanical interface 20 configured to removably mate/couple with the housing electromechanical interface 16 and an electromechanical interface 24 of a cordless power tool 22 and when electromechanically mated to the housing electromechanical interface, configured to provide power to an inverter 32. As noted above, alternate exemplary battery-based portable power supply systems may include fewer or more battery packs.

Figure 4:
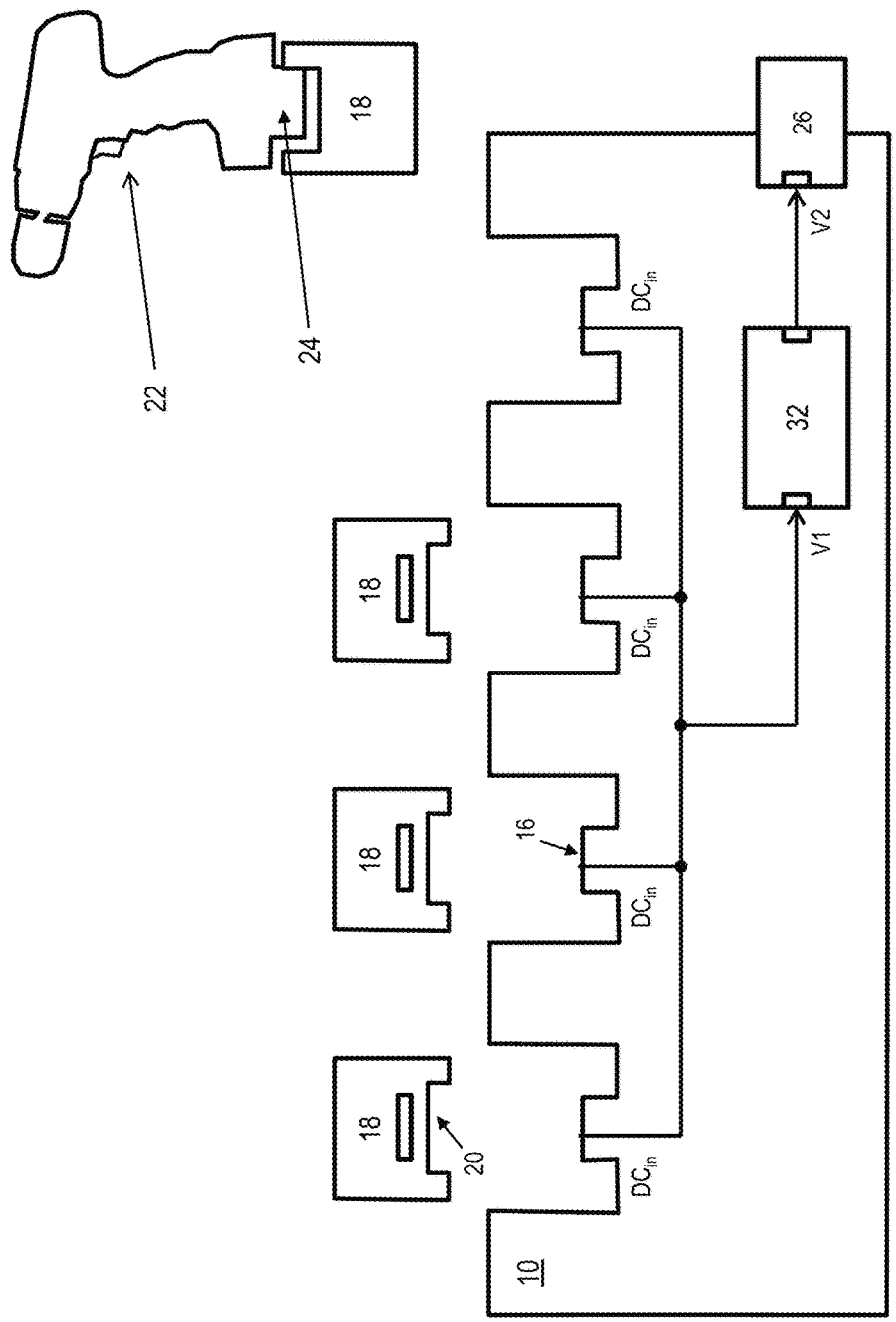
FIG. 4 is a simple block diagram of an exemplary portable power supply of the present invention, a plurality of removable battery packs and a power tool.

Referring to FIG. 4, an exemplary portable power supply system is illustrated. The illustrated exemplary portable power supply system comprises the inverter 32. The inverter 32 includes an input coupled to the plurality (in this example four) housing interfaces 16 and an output coupled to the portable power supply output 26. FIG. 4 illustrates three battery packs 18 removed from the portable power supply 10 and one battery pack 18 coupled to a cordless power tool 22. As noted above, the battery packs 18 are configured with an electromechanical interface 20 that is configured to mate with the electromechanical interface 16 of the portable power supply 10 and a substantially identical electromechanical interface 24 of the cordless power tool 22. In other words, the interfaces 16, 24 are configured such that the battery pack 18 can mate with both the tool interface 24 and the power supply interface 16 and provide power to both the tool 22 and the power supply 10.

Figure 5:
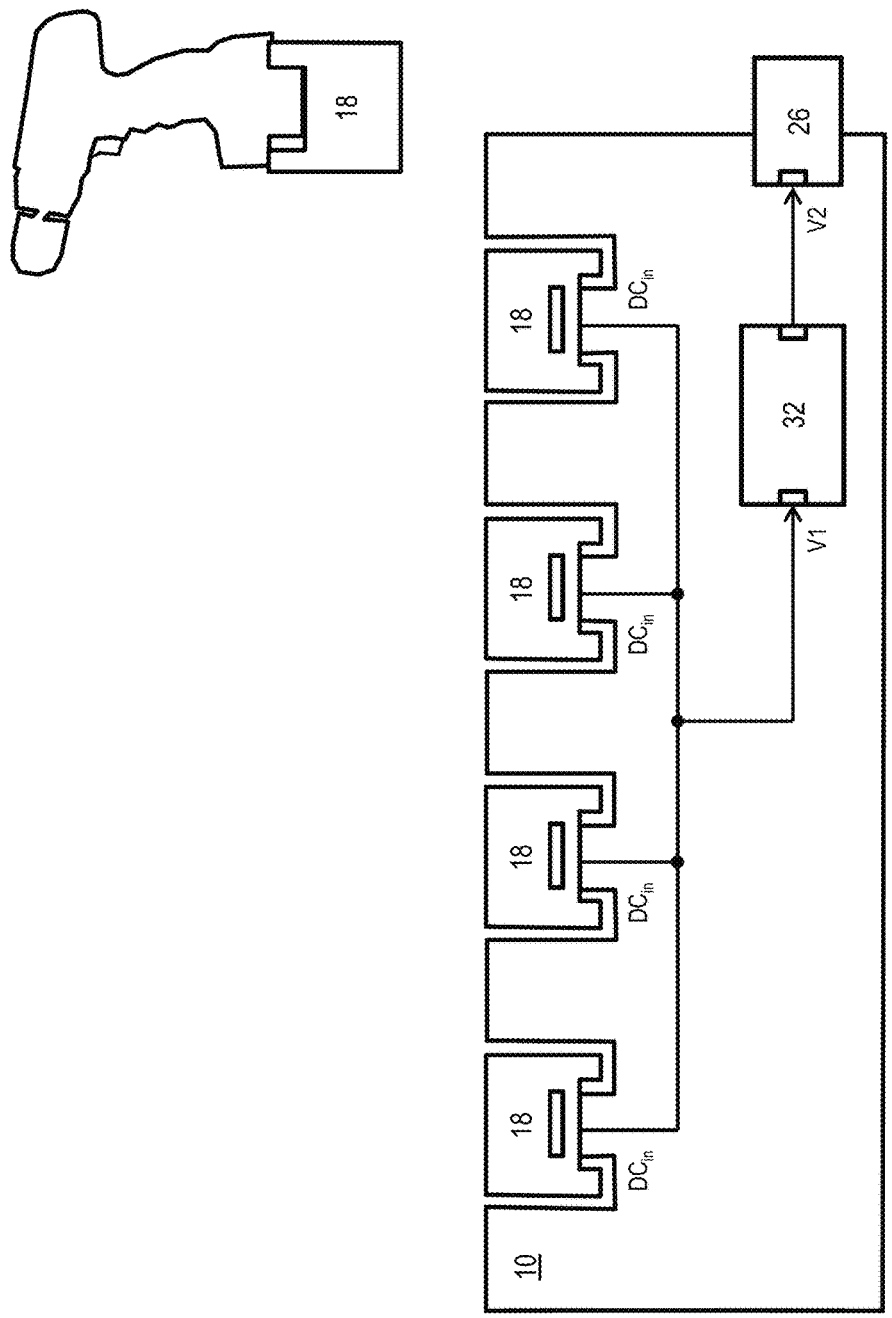
FIG. 5 is another simple block diagram of the exemplary portable power supply of FIG. 4 with the battery packs coupled to the power supply housing.

Referring to FIG. 5, the battery packs 18 are illustrated in the coupled position in which the battery pack interface 20 has mated with the housing interface 16 and electricity can flow between the battery packs 18 and the portable power supply 10. Referring to FIG. 5, the input V1 of the inverter 32 is coupled to the battery pack(s) 18 and output of the inverter 32 is coupled to the input V2 of the output connector 26 such that the battery pack(s) 18 provides DC voltage to the inverter 32 and the inverter 32 provides AC voltage to the output connector 26. The inverter 32 may provide, for example, one of the voltage signals illustrated in FIG. 7 to the output connector 26.

Figure 6:
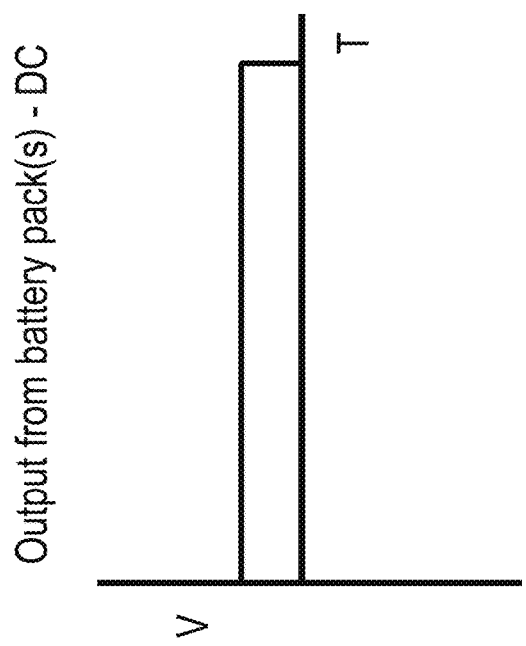
FIG. 6 is a simple graph illustrating an output from the battery packs.

Referring to FIG. 6, there is illustrated a simple graph of the voltage output of the battery pack(s) 18. As noted above, the portable power supply 10 may be configured to receive/mate with one or more battery pack(s) 18. The exemplary embodiment of the portable power supply 10 illustrated herein is configured to receive/mate with four battery packs 18. The battery pack(s) 18 may have any voltage available. For example, the four battery packs 18 illustrated in FIG. 5 may be rated at 20 volts. In this instance, the output of the battery packs and the input to the inverter would be 80 volts when the packs are fully charged. Alternatively, the power supply could be configured to receive/mate with a single 80 volt battery. Alternatively, the four battery packs could be rated at 40 volts or 60 volts. Alternatively, the four battery packs could be convertible battery packs that are rated at 20 volts in a first configuration and at 60 volts in a second configuration.

Referring again to FIG. 5 and to FIG. 7, the portable power supply includes an inverter 32. Generally speaking, an inverter converts an input DC voltage to an output AC voltage. An exemplary embodiment of the power supply 10 may include a three-phase bridge inverter. Other types of inverters are contemplated by this disclosure. More particularly, FIG. 7 illustrates an output from various exemplary inverters 32 that may be used with the power supply 10. Specifically, the inverter 32 may be configured to output a pure sine wave (FIG. 7a), a modified sine wave (FIG. 7b), a square wave (FIG. 7c) or a modified square wave with a sloped zero crossing (FIG. 7d). In addition, an exemplary inverter may be configured to provide more than one of the outputs illustrated in FIG. 7.

Figure 8:
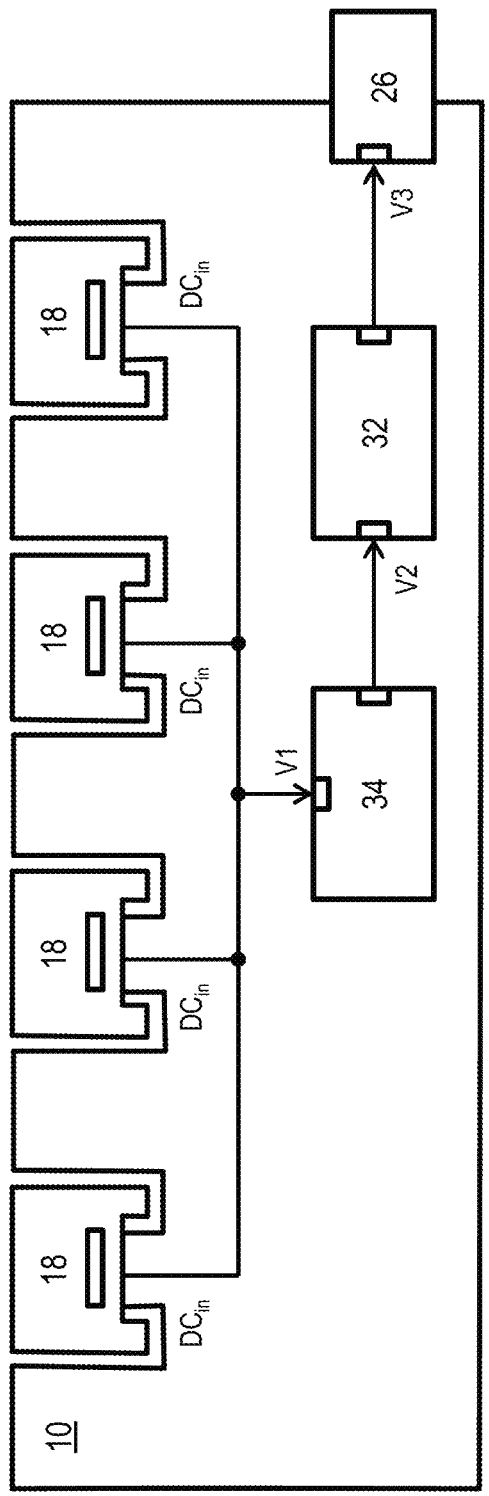
FIG. 8 is a simple block diagram of another exemplary portable power supply of the present invention.

Referring to FIG. 8, the power supply may also include a booster 34. The booster will boost the input DC power/voltage from the battery packs 18 to a higher DC power/voltage. For example, if each of the illustrated battery packs 18 is rated at 20 volts for a battery bank voltage of 80 volts but the output requires a 120 volts the booster 34 can boost the DC voltage to 120 volts RMS or more.

The portable power supply 10 may be configured to operate with a battery pack(s) 18 that supplies a DC voltage level that is less than that of the wall/AC mains line voltage level. In this configuration, the portable power supply will include a boost circuit to increase the DC voltage level from the battery pack(s) 18 to the voltage level of the wall/AC mains line voltage (i.e. 120v or 230v). Referring to FIG. 8, the input V1 of the booster 34 is coupled to the battery pack(s) 18 and output of the booster 34 is coupled to the input V2 of the inverter 32 and the output of the inverter 32 is coupled to the input V3 of the output connector 26 such that the battery pack(s) 18 provides DC voltage to the booster 34 and the booster 34 provides boosted DC voltage to the inverter 32 and the inverter 32 provides boosted AC voltage to the output connector 26. The inverter 32 may provide, for example, one of the voltage signals illustrated in FIG. 7 to the output connector 26.

Figure 9:
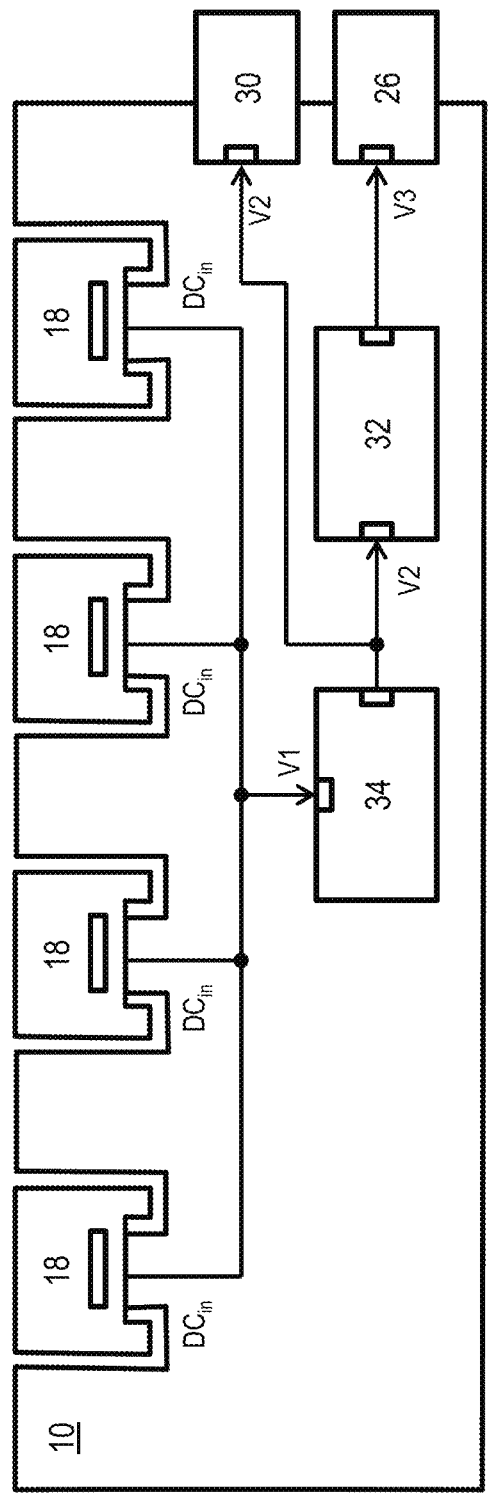
FIG. 9 is a simple block diagram of another exemplary portable power supply of the present invention.

Referring to FIG. 9, the power supply 10 may also include a second output 30. While one output 26 is coupled to the inverter 32 and may provide AC power to a connected device, the other output 30 is coupled to the output of the booster 34 and provides DC power to a connected device. Alternatively, the other/second output 30 could be coupled directly to the battery pack(s); in other words coupled to the input V1 of the booster 34.

A portable power supply 10 powered by battery pack(s) 18 allows for easy output of a DC voltage. The battery pack(s) 18 can be coupled to a DC output coupler/connector 30 prior to a boost circuit or after the boost circuit. Additionally, the DC voltage can be combined with a rectified AC voltage. The combined voltage can be coupled to a DC output coupler/connector or to an AC output coupler/connector.

Figure 10:
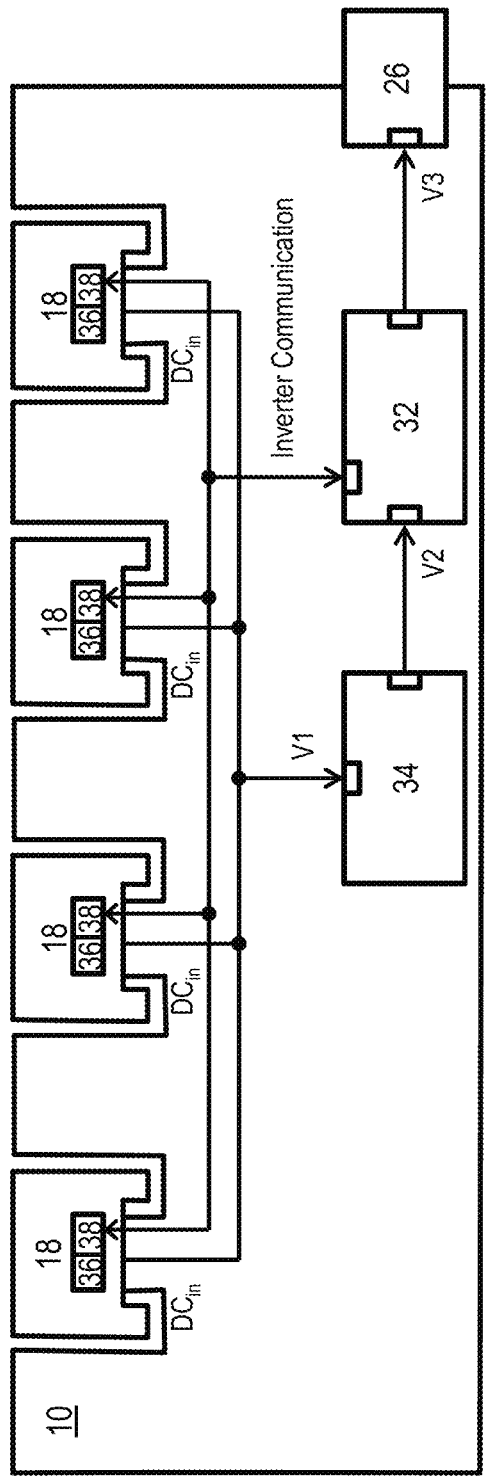
FIG. 10 is a simple block diagram of another exemplary portable power supply of the present invention.

Referring to FIG. 10, a pack status monitor (PSM) 36 monitors the voltage or temperature or other parameter of one or more of the cells of each removable battery pack 18. A current controller 38 receives on/off signal from the pack status monitor 36. The current controller 38 communicates with the inverter 32 and turns the inverter 32 off when one or more of the battery pack cells crosses a discharge threshold or when one or more of the cells crosses a temperature threshold. When the inverter 32 is off the packs 18 no longer discharge and power is not available at the output 26. Alternatively, a switch could be placed between the inverter 32 and the output 26 and the current controller 38 could open the switch instead of turning the inverter 32 off. Referring to FIG. 10, the input V1 of the booster 34 is coupled to the battery pack(s) 18 and output of the booster 34 is coupled to the input V2 of the inverter 32 and the output of the inverter 32 is coupled to the input V3 of the output connector 26 such that the battery pack(s) 18 provides DC voltage to the booster 34 and the booster 34 provides boosted DC voltage to the inverter 32 and the inverter 32 provides boosted AC voltage to the output connector 26. The inverter 32 may provide, for example, one of the voltage signals illustrated in FIG. 7 to the output connector 26.

Powered by batteries requiring monitoring: Conventional cordless power tool battery packs that utilize Li-Ion, Magnesium-Ion, Aluminum-Ion or similar chemistries require sophisticated monitoring in order to keep the power tools and battery packs safe. This level of sophistication is much greater than that used for SLA batteries used with conventional portable power supplies. A novel aspect of the currently disclosed portable power supply 10 is the manner in which it monitors the battery pack(s) 18 and outputs power in light of the battery pack(s) status.

Another key point of the design is that the inverter 32 will be driven by batteries 18 that require sophisticated monitoring in order to keep the system safe. Batteries like Li-ion, Magnesium-ion and Aluminum-ion all require more sophisticated monitoring than that of the industry standard lead acid. The inverter 32 can do this in a few different ways. A first method of monitoring the battery pack(s) 18 is to measure more than one cell parameter (voltage, temperature, current) using the electronics (not shown) in the battery pack 18 and then communicate the parameter status information to the portable power supply 10. Based on the parameter status information the portable power supply 10 can stop operation, i.e., stop providing output power from the portable power supply 10. A second method of monitoring the battery pack(s) 18 is to measure the cell parameters using electronics in the portable power supply 10. Again, based on the parameter status information the portable power supply 10 can stop operation, i.e., stop providing output power from the portable power supply 10.

Figure 11:
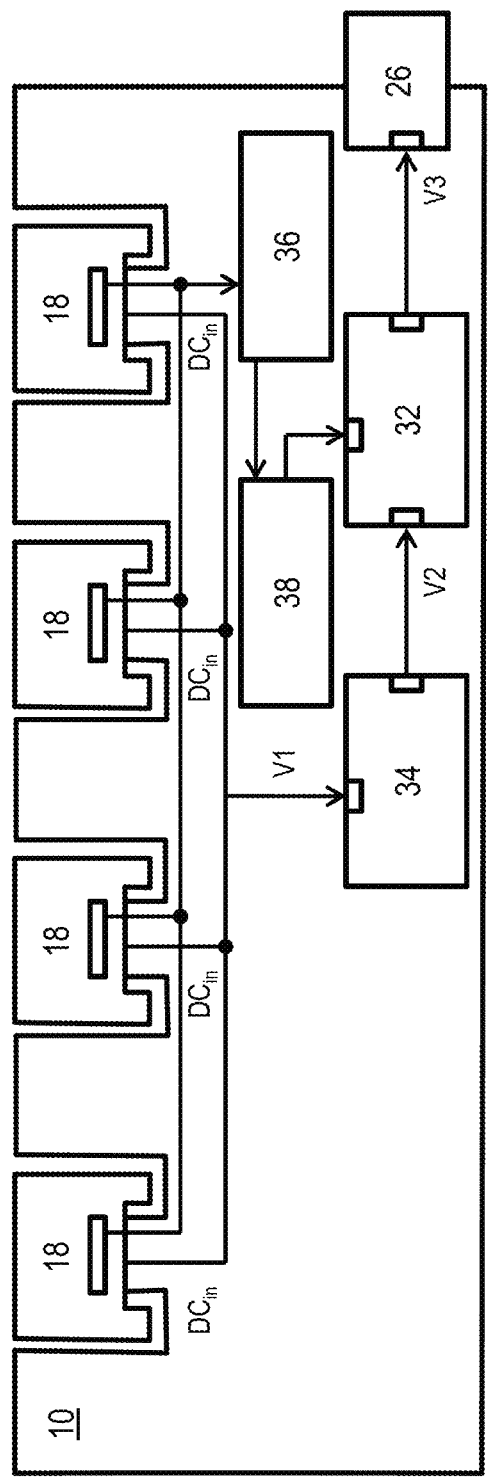
FIG. 11 is a simple block diagram of another exemplary portable power supply of the present invention.

Referring to FIG. 11, the pack status monitor 36 monitors the voltage or temperature or other parameter of one or more of the cells of each removable battery pack 18. The current controller 38 receives an on/off signal from the pack status monitor 36. The current controller 38 turns the inverter 32 off when one or more of the battery pack cells crosses a discharge threshold or when one or more of the cells crosses a temperature threshold. When the inverter 32 is off, the packs 18 no longer discharge and power is not available at the output 26. Alternatively, a switch could be placed between the inverter 32 and the output 26 and the current controller 38 could open the switch instead of turning the inverter 32 off.

Figure 12:
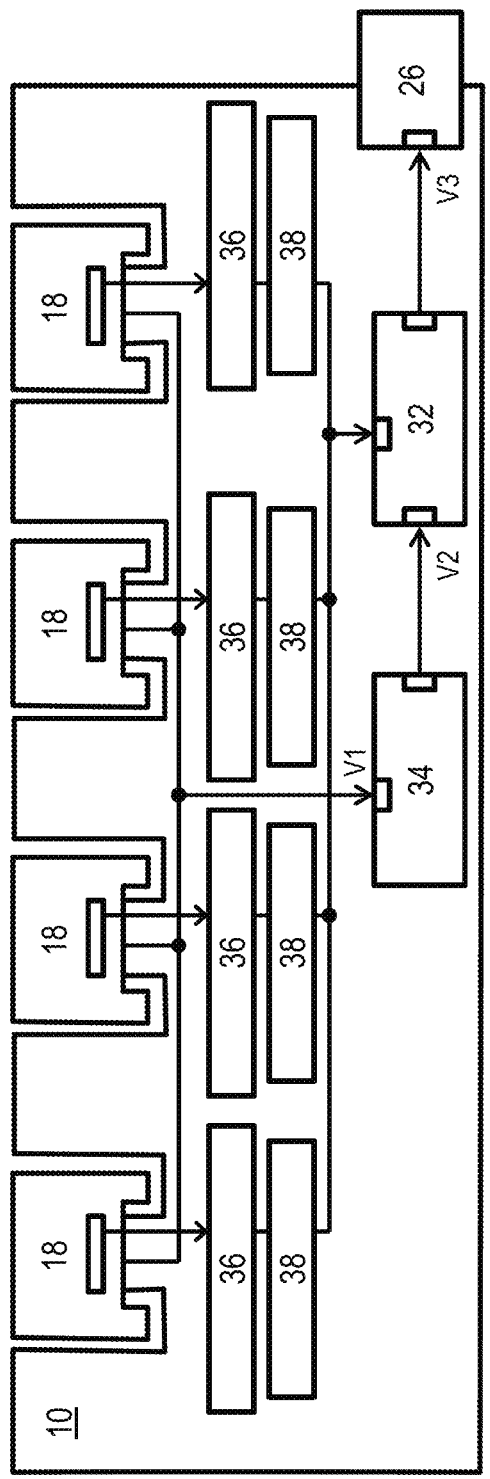
FIG. 12 is a simple block diagram of another exemplary portable power supply of the present invention.

Referring to FIG. 12, the portable power supply 10 includes a pack status monitor 36 and a current controller 38 for each battery pack 18.

Figure 13:
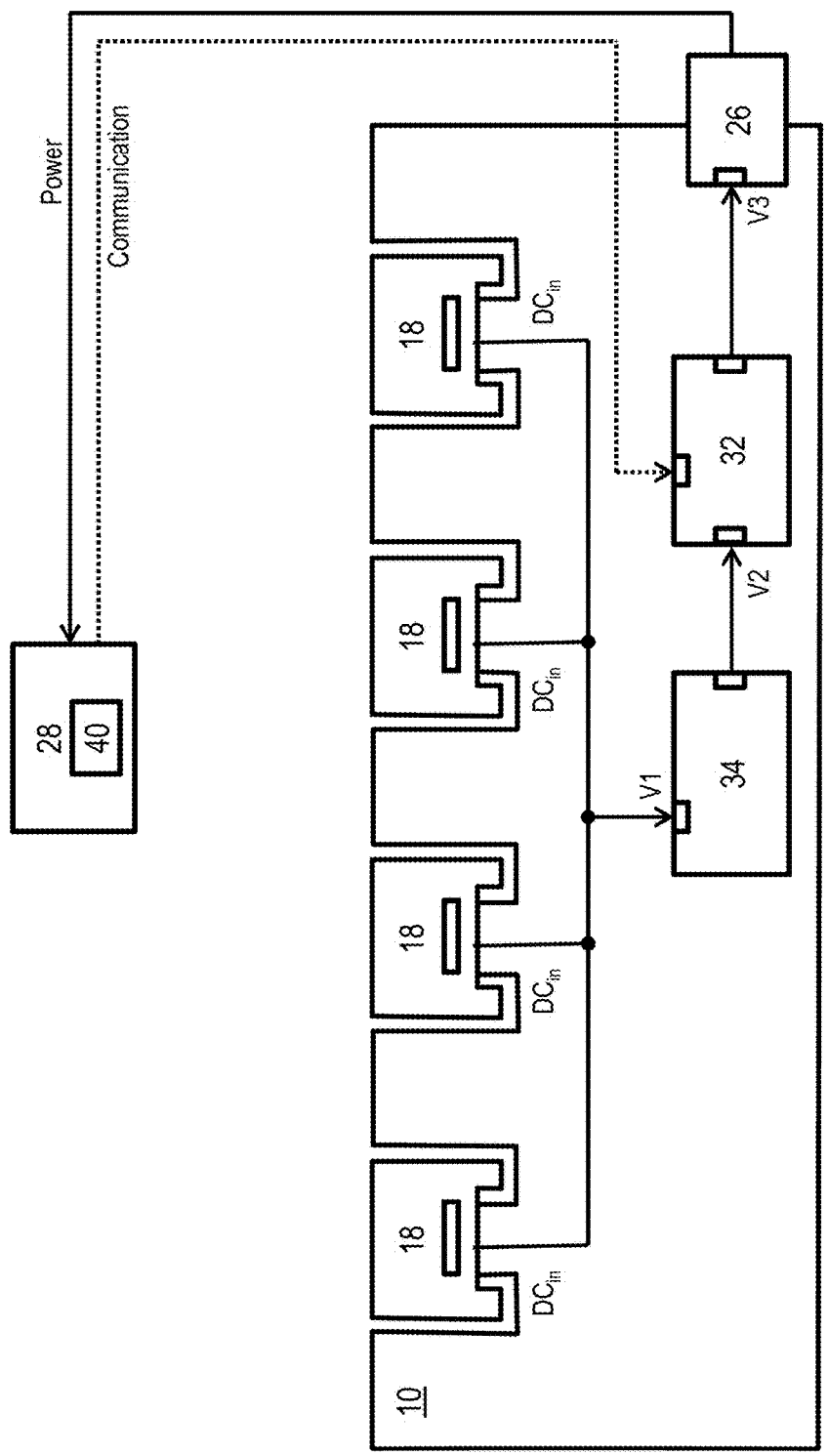
FIG. 13 is a simple block diagram of another exemplary portable power supply of the present invention.

Referring to FIG. 13, the electrical device 28 monitors various parameters of the electrical device 28 such as current or temperature. An electrical device controller 40 sends an on/off communication signal to the inverter 32. The inverter 32 is turned off when one or more of the monitored electrical device 28 parameters indicate the electrical device 28 should cease operations. When the inverter 32 is off, the packs 18 no longer discharge and power is not available at the output 26. Alternatively, a switch could be placed between the inverter 32 and the output 26 and the electrical device controller 40 could open the switch instead of turning the inverter 32 off. The electrical device 28 is also able to identify itself and communicate information about itself to the inverter 32 or control the inverter 32 to match the electrical device 28 parameters. For example, the inverter 32 may be configured to output a modified sine wave in a default condition but may be capable of outputting other signals. If the electrical device 28 requires a pure sine wave, it can communicate that information to the inverter 32 and the inverter 32 can be reconfigured to output a pure sine wave. In addition or alternatively, the electrical device 28 may be configured to operate at power levels higher than standard or conventional tools. The electrical device 28 can communicate this to the inverter 32 and the inverter can alter its output accordingly. For example, the electrical device 28 may be configured to operate drawing a maximum of 30 A, while conventional electrical devices are configured to operate drawing 20 A. The inverter 32 can be reconfigured to allow a 30 A draw.

Figure 14:
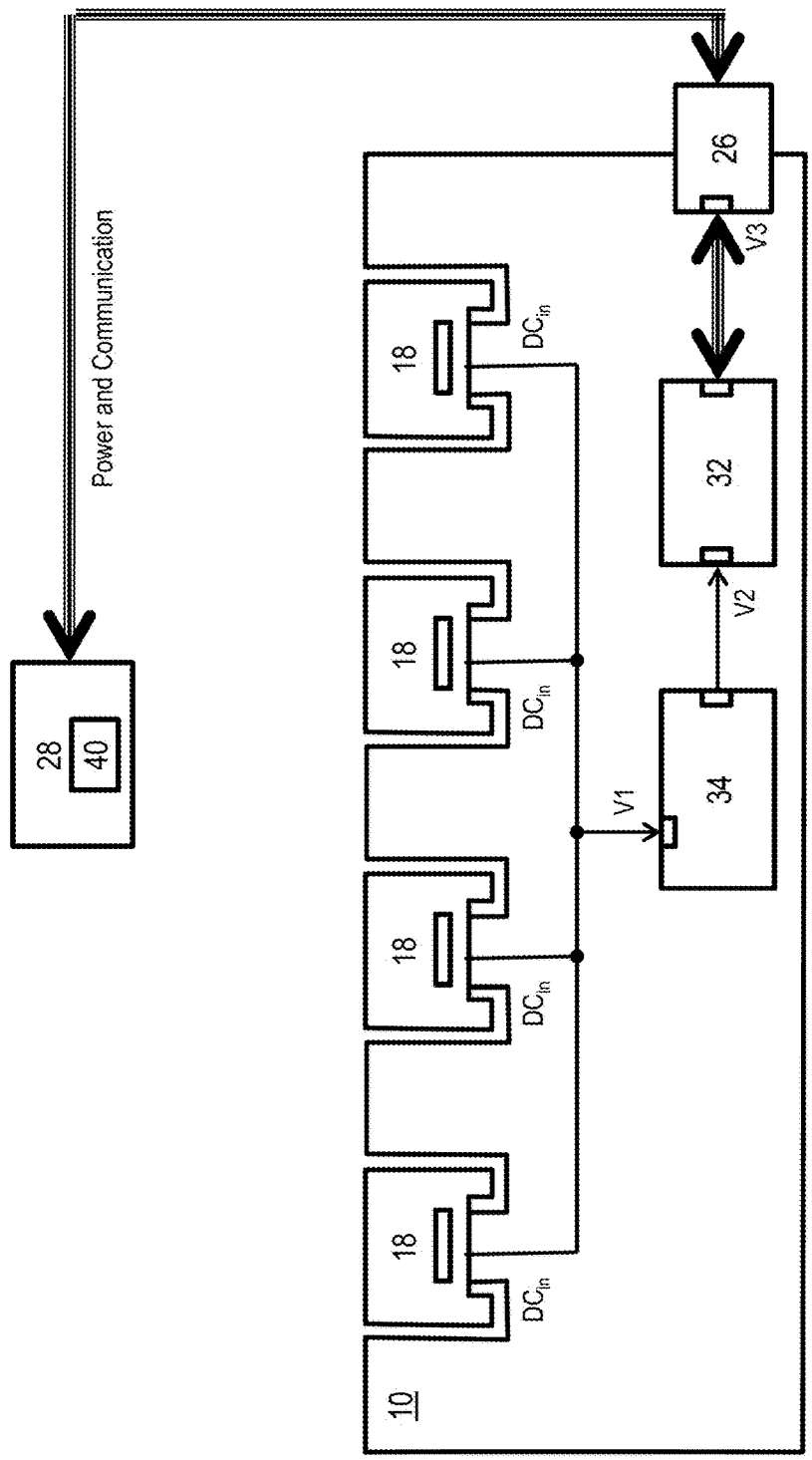
FIG. 14 is a simple block diagram of another exemplary portable power supply of the present invention.

Referring to FIG. 14, in an alternate exemplary embodiment, the electrical device 28 and the power supply 10 may be configured such that the communication signal between the electrical device 28 and the power supply 10 is carried over the power connection between the electrical device 28 and the power supply 10.

A novel aspect of the present disclosure is using a battery pack 18 (a single battery pack or a plurality of battery packs) configured to provide power to a set of cordless power tools 22 and to provide power to a portable power supply 10. In the configuration of the portable power supply 10 that is configured to receive a plurality of battery packs 18, there are two exemplary electrical designs and two exemplary mechanical designs for implementing the removable battery pack aspect. In the first exemplary electrical design the portable power supply 10 is configured to run only when all of the battery packs 18 are installed in the portable power supply. If one of the plurality of battery packs 18 is removed, the portable power supply 10 will not operate. In the second exemplary electrical design the portable power supply 10 is configured to run if all or less than all of the battery packs 18 are installed in the portable power supply 10. The second electrical design allows the portable power supply 10 to provide output power but the amount of output power may be reduced as the number of installed battery packs 18 is reduced.

The first exemplary mechanical design does not provide any latching or clipping between the battery pack(s) 18 and the portable power supply 10. In this design there is merely a friction fit between the battery pack(s) 18 and the portable power supply 10. The second exemplary mechanical design uses a latch system between the battery pack(s) 18 and the portable power supply identical or similar to the latch system between the battery pack(s) 18 and the set of cordless power tools 22.

Another novel aspect of the present disclosure is a power supply that is able to provide AC and/or DC power to a connected device 28. To achieve higher power output levels than what can be achieved utilizing AC mains line power alone, an energy storage device such as an electrochemical battery may be utilized in a hybrid AC/DC power system. The battery power may be used to augment the AC mains line power whenever the power demand from a connected device 28 exceeds the power delivery capability of the AC mains line. By augmenting the AC mains line power during periods of heavy power requirements the hybrid power system will prevent circuit protection device (fuse) trips.

Figure 15:
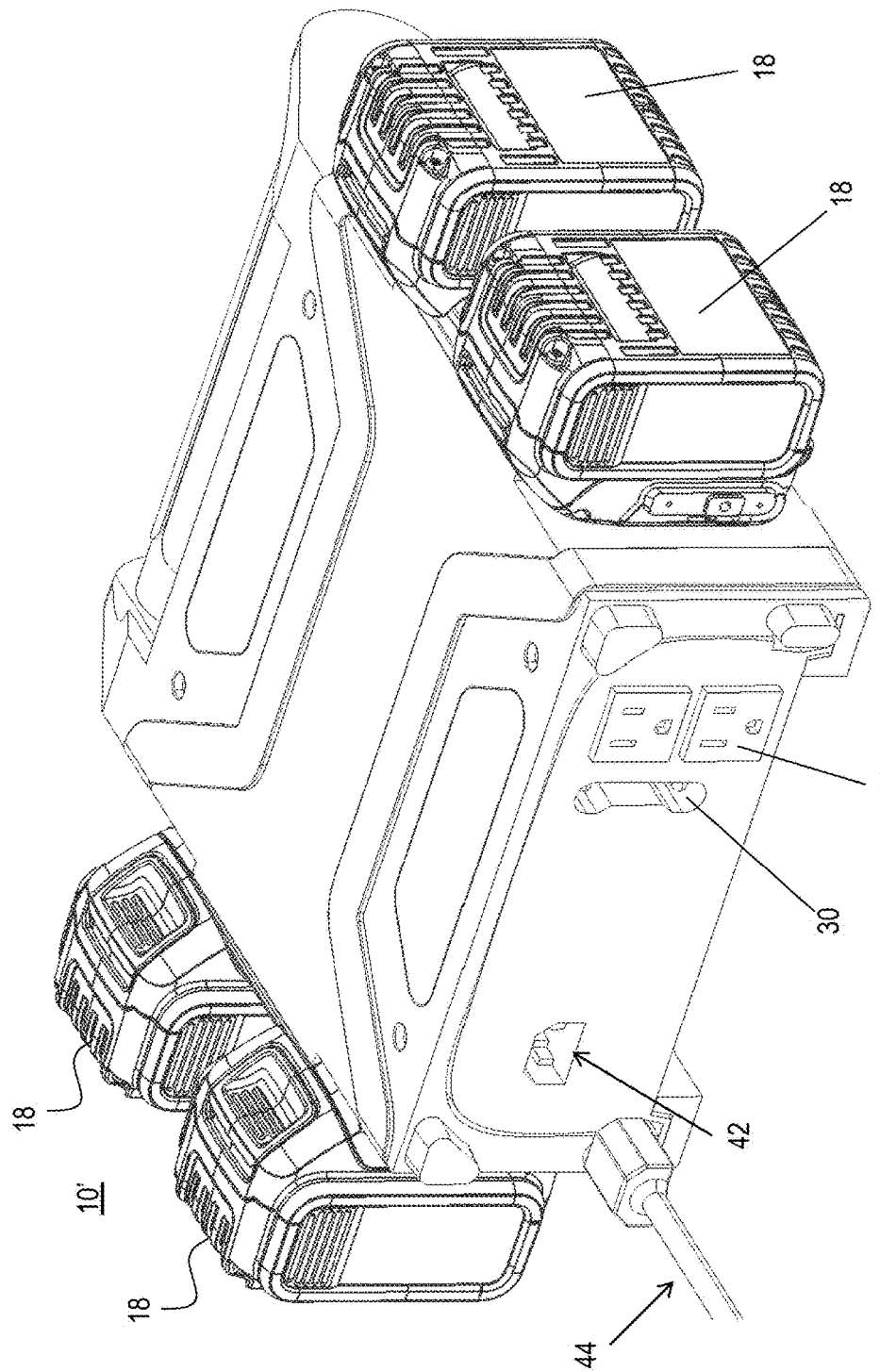
FIG. 15 is a perspective view of another exemplary portable power supply of the present invention.
Figure 16:
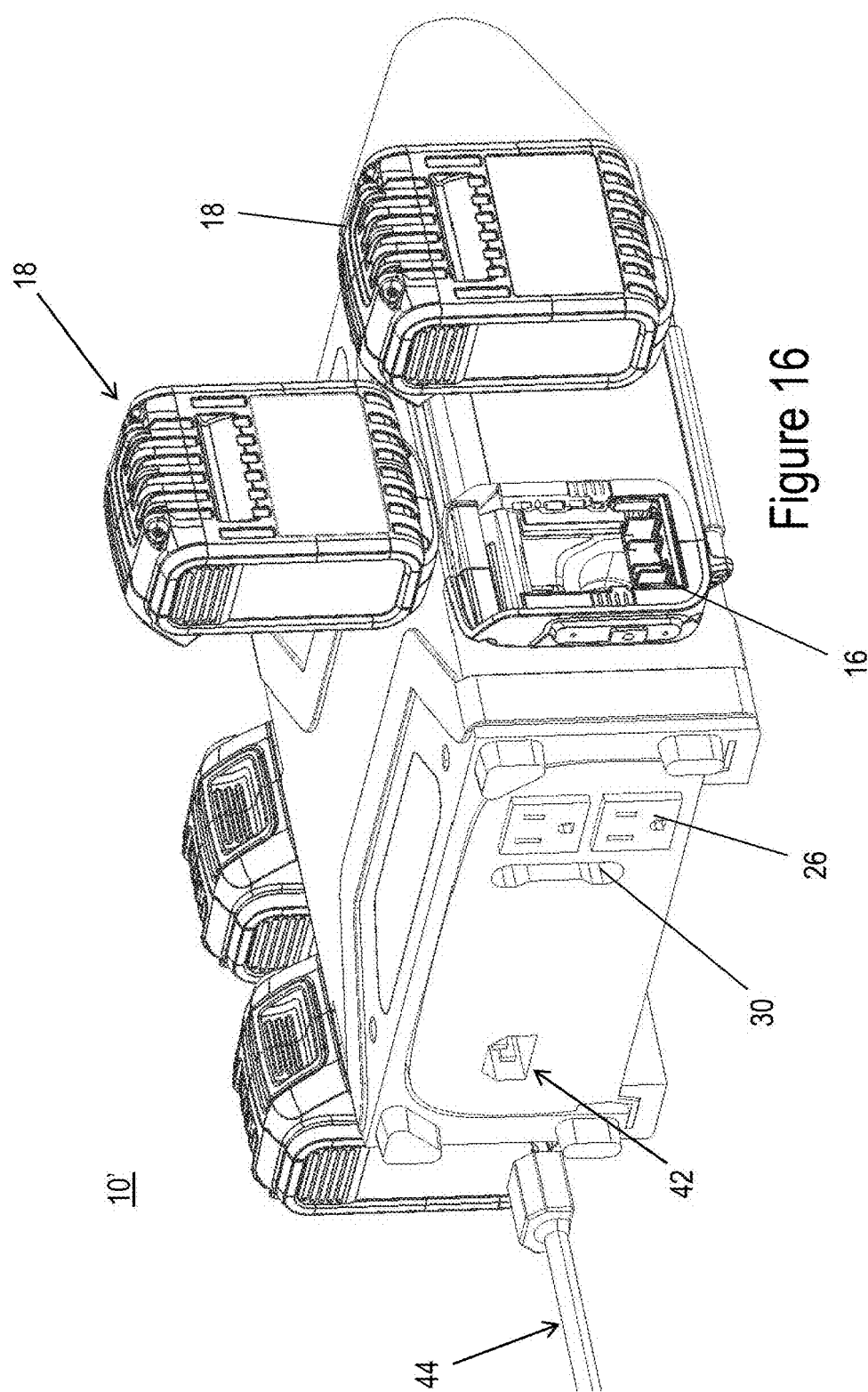
FIG. 16 is another perspective view of the exemplary portable power supply of FIG. 15 with a battery pack removed.

Referring to FIGS. 15 and 16, another exemplary embodiment of a portable power supply 10' is illustrated. This embodiment is similar to the embodiment described above. This embodiment also comprises an input coupler/connector 42. The input coupler/connector 42 is configured to receive AC power from an exterior AC power source, for example, the AC mains line. The power supply 10' may also comprise an input cord 44 for coupling the input connector 42 to the power source.

Figure 17:
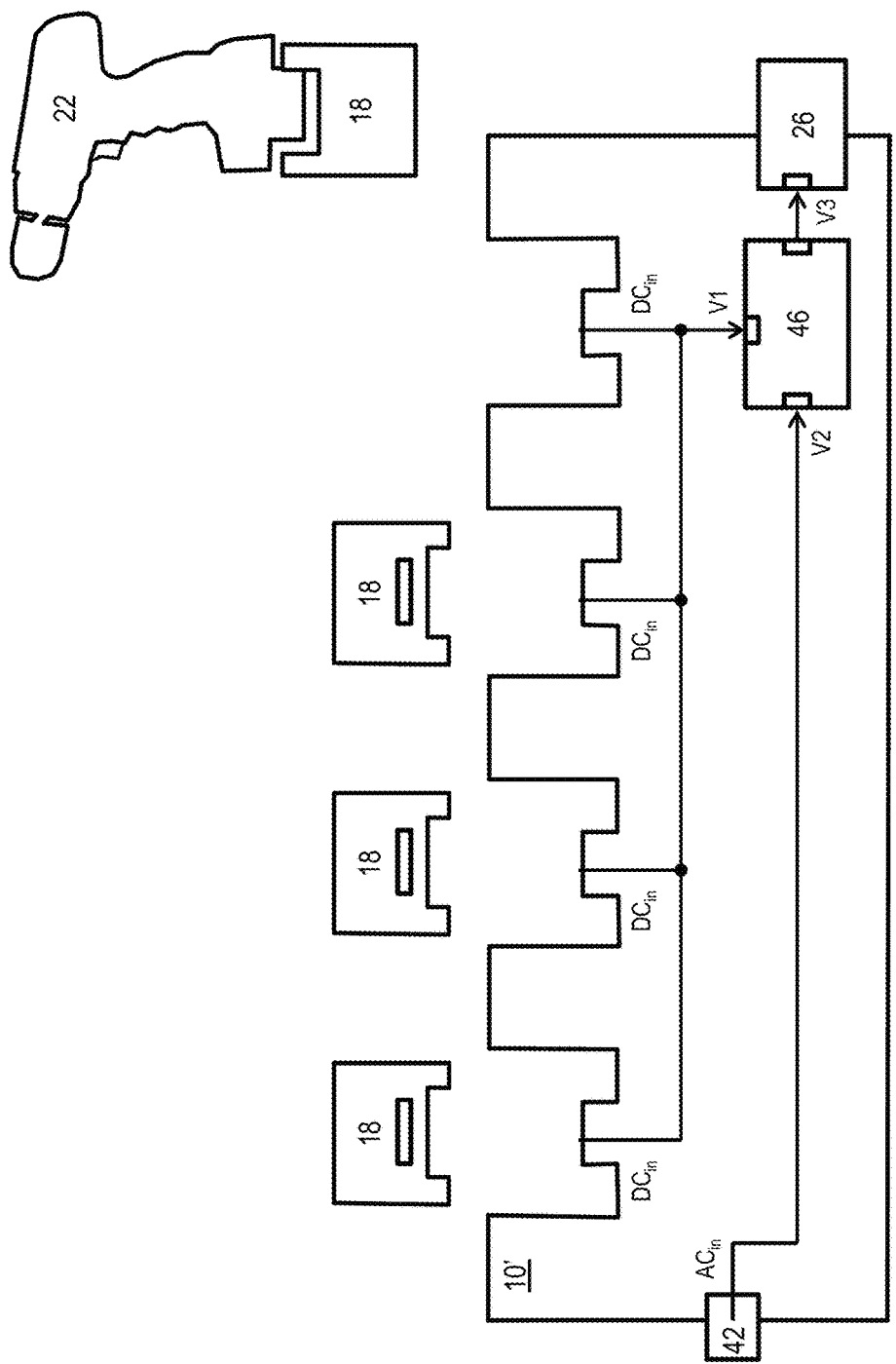
FIG. 17 is a simple block diagram of an exemplary portable power supply of the present invention, a plurality of removable battery packs and a power tool.

Referring to FIGS. 17, 18 and 19, the portable power supply 10' also comprises a voltage controller 46. The voltage controller 46 comprises a switching circuit for selectively providing DC power and/or AC power to an output 26. An exemplary voltage controller switching circuit may include a combination of semiconductor or electromechanical switches, as shown in FIGS. 19a through 19d and a switch controller 48 to provide a method of controlling AC mains line power/current draw and/or battery power/current draw.

Referring to FIG. 18, the input V1 of the voltage controller 46 is coupled to the battery pack(s) 18 such that the battery pack(s) 18 provides DC voltage to the voltage controller 46 and the input V2 of the voltage controller 46 is coupled to the AC input 42 such that the AC supply provides AC voltage to the voltage controller 46. The input V3 of the output coupler 26 is coupled to the output of the voltage controller 46 such that the voltage controller 46 provides voltage solely from input V1 or voltage solely from V2 or provides voltage from V1 and V2, wherein the voltage input to inputs V1 and V2 may be synchronized with each other, may alternate with each other, may be connected in series or may be connected in parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output.

In an alternate embodiment, the portable power supply 10' illustrated in FIG. 18 may include a switch on the power supply housing 12 connected to the voltage controller 46 to control the voltage controller state. In another alternate embodiment, the portable power supply 10' illustrated in FIG. 18 may include a charger coupled to the AC input 42 and to the battery pack(s) 18.

Figure 19B:
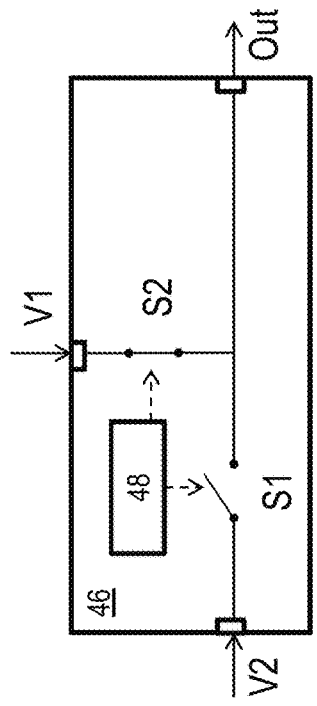
Figure 19D:
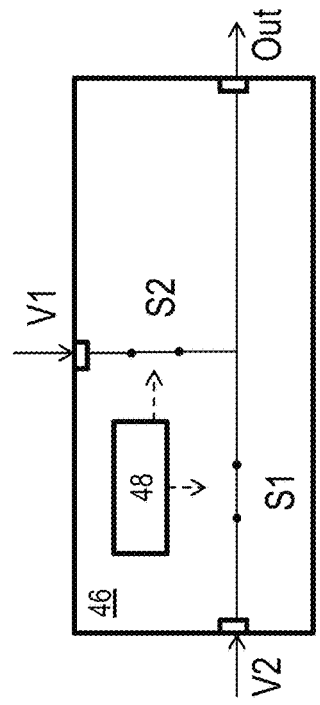
Figure 19A:
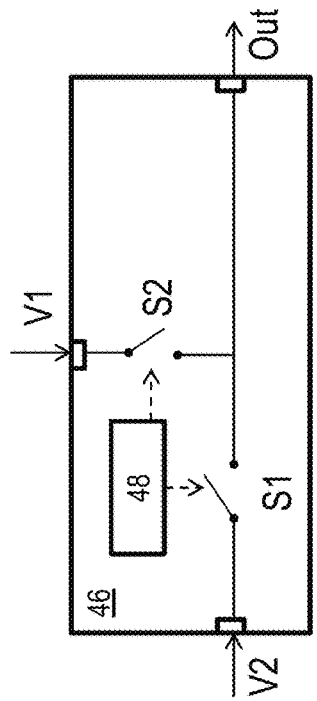

FIGS. 19e through 19h illustrate an alternate embodiment of an AC power supply 50 and a DC power supply 52 connected to a voltage controller 46'. FIGS. 19a-19h illustrate the various states of the voltage controller 46, 46': state 1—no power provided to the output 26 (FIGS. 19a, 19e), state 2—only DC power provided to the output 26 (FIGS. 19b, 19f), state 3—only AC power provided to the output 26 (FIGS. 19c, 19g), and state 4—DC and AC power provided to the output 26 (FIG. 19d, 19h).

Figure 19C:
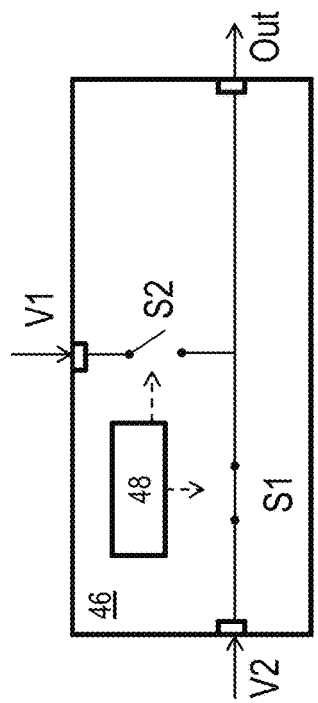
Figure 30:
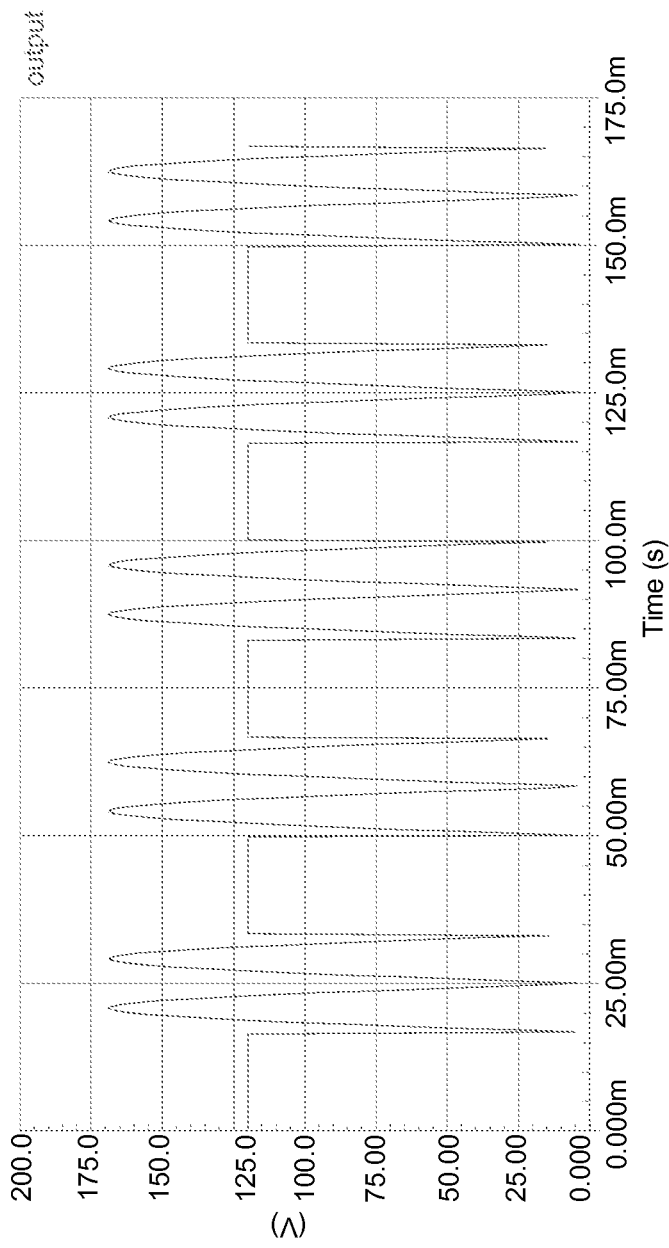
FIG. 30 is a simple graph of an exemplary output from an exemplary voltage controller of the present invention.

There are several proposed methods of providing power to an output 26 when both DC battery power and AC mains line power are available as an input. The first method is to alternatively select the AC mains line power and DC battery power based on the power/current draw of an electrical device, e.g. corded power tool 28, coupled to the output 26. Referring to FIGS. 19b and 19c, the switches S1 and S2 alternately open and close. In other words, the switch controller 48 alternates the states of the switches S1 and S2 between the configurations illustrated in the configuration illustrated in FIGS. 19b and 19c. The timing of this opening and closing can be in synchronization with the power signal on the AC mains line such that switching between 19b and 19c only occurs on the full AC cycle. The ratio of average battery power/current to average mains line power/current can be controlled by controlling the ratio of full AC mains line power cycles to battery power cycle (FIG. 30). Alternating between the battery power and the mains line power could also be asynchronous to the mains line power/voltage signal and at different frequencies.

Figure 31:
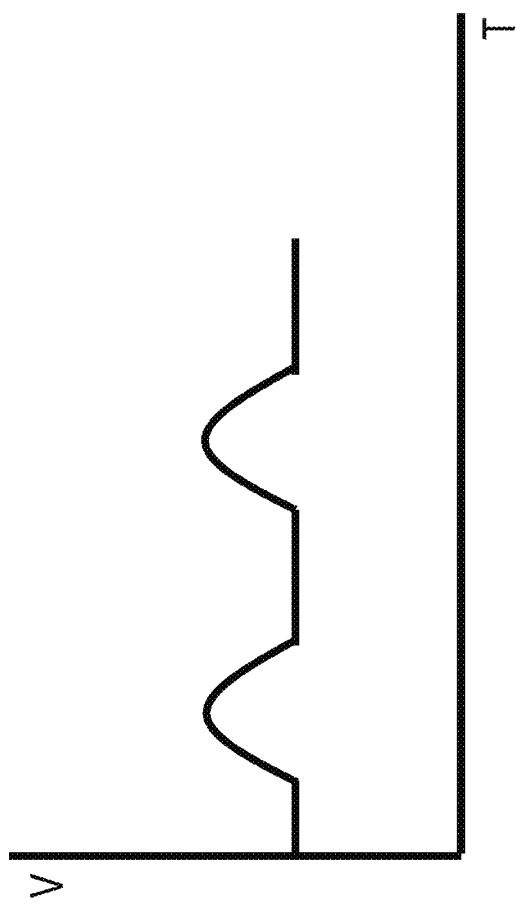
FIG. 31 is another simple graph of an exemplary output from an exemplary voltage controller of the present invention.

Another method would be to selectively connect the battery power/voltage and the AC mains line power/voltage (1) alternating between the voltage controller state illustrated in FIG. 19b and the state illustrated in FIG. 19c or (2) being in the voltage controller state illustrated in FIG. 19d in which both the AC mains line power/voltage and the DC battery power/voltage are coupled to the output. With reference to FIG. 31, either method described above could effectively fill in the valleys between the rectified AC waveform with power from the battery 18. This will reduce the average power/current requirement from the AC mains line.

Referring to FIG. 20a, there is illustrated a graph of an exemplary input from the AC mains line. Referring to FIG. 20b, there is illustrated a graph of an exemplary output from a voltage controller in which the input from the AC mains line and the input from the battery pack(s) is connected in series. The waveform illustrated in FIG. 20c could be the result of the voltage controller 46 of FIG. 18 that alternates between the state illustrated in FIG. 19b and the state illustrated in FIG. 19c.

Referring to FIG. 21, there is illustrated another exemplary embodiment of a portable power supply 10'. In this embodiment the power supply includes an inverter 32—as described above—coupled between the battery pack(s) 18 and the voltage controller 46.

Referring to FIG. 21, the input V1 of the voltage controller 46 is coupled to the output of the inverter 32 and the input V4 of the inverter 32 is coupled to the battery pack(s) 18 such that the battery pack(s) 18 provides DC voltage to the inverter 32 and the inverter 32 provides AC voltage to the voltage controller 46 and the input V2 of the voltage controller 46 is coupled to the AC input 42 such that the AC supply provides AC voltage to the voltage controller 46. The input V3 of the output coupler 26 is coupled to the output of the voltage controller 46 such that the voltage controller 46 provides voltage solely from input V1 or voltage solely from V2 or provides voltage from V1 and V2, wherein the voltage input to inputs V1 and V2 may be synchronized with each other, may alternate with each other, may be connected in series or may be connected in parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output.

Figure 22:
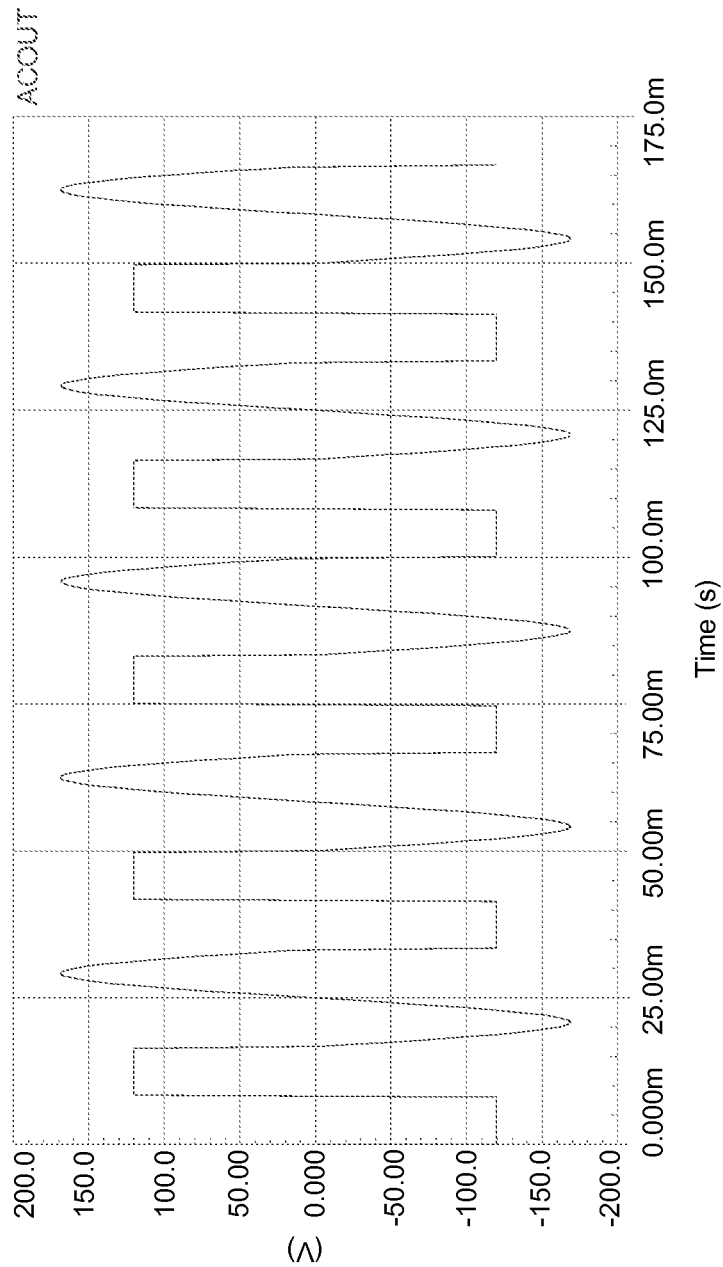
FIG. 22 is a simple graph of an exemplary output from an exemplary voltage controller of the present invention.

Referring to FIG. 22, there is illustrated a graph of an exemplary voltage output V3 from the voltage controller 46. The waveform illustrated in FIG. 22 could be the result of the voltage controller 46 of FIG. 21 alternating between the state illustrated in FIG. 19b and the state illustrated in FIG. 19c. In this example, the output of the inverter 32 (see FIG. 7c) is synchronously matched with the input at the AC connecter 42 (see FIG. 20a) and the switches S1, S2 are closed during alternating cycles of the input. Specifically, switch S1 is open and switch S2 is closed during the first cycle and switch S1 is closed and switch S2 is open during the second cycle. This method continues with the switches S1 and S2 alternating being open and closed at each cycle. In this instance, the voltage controller 46 is in the state of FIG. 19*b*—connected to the battery pack(s) 18—50% of the switching duty cycle and in the state of FIG. 19*c*—connected to the AC mains line—50% of the switching duty cycle.

Figure 23:
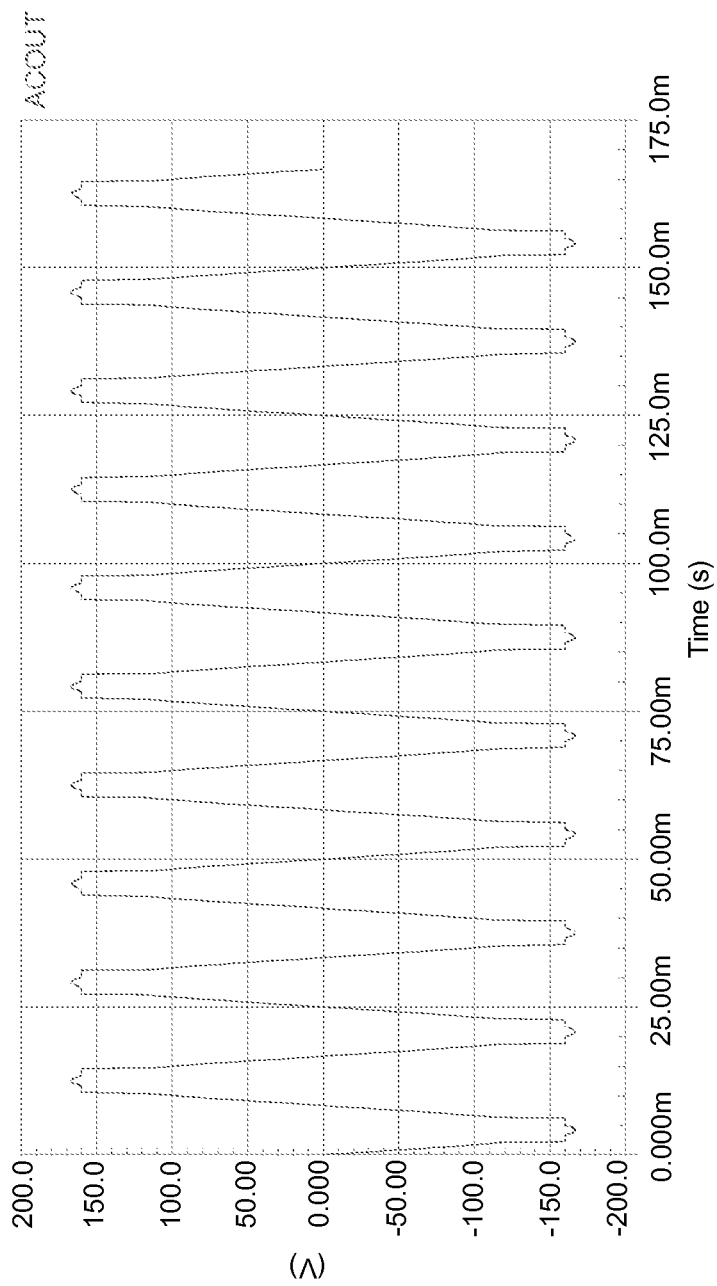
FIG. 23 is another simple graph of an exemplary output from an exemplary voltage controller of the present invention.

Referring to FIG. 23, there is illustrated a graph of an exemplary voltage output from the voltage controller 46. The waveform illustrated in FIG. 23 could be the result of the voltage controller 46 of FIG. 21 alternating between the state illustrated in FIG. 19*b*—connected to the battery pack(s) 18—and the state illustrated in FIG. 19*c*—connected to the AC mains line. In this example, the output of the inverter 32 (see FIG. 7*c*) is synchronously matched with the input at the AC connecter 42 (see FIG. 20*a*) and the switches S1, S2 are closed during the cycles of the input. In this instance, the voltage controller 46 starts and stays in state of FIG. 19*c* for approximately the first tenth of the duty cycle, switches to state of FIG. 19*b* for the second tenth of the duty cycle, switches to state of FIG. 19*c* for the third tenth of the duty cycle, switches to state of FIG. 19*b* for the fourth tenth of the duty cycle, switches to state of FIG. 19*c* for the fifth and sixth tenths of the duty cycle, switches to state of FIG. 19*b* for the seventh tenth of the duty cycle, switches to state of FIG. 19*c* for the eighth tenth of the duty cycle, switches to state of FIG. 19*b* for the ninth tenth of the duty cycle and finally switches to state FIG. 19*c* for the last tenth of the duty cycle.

Figure 24:
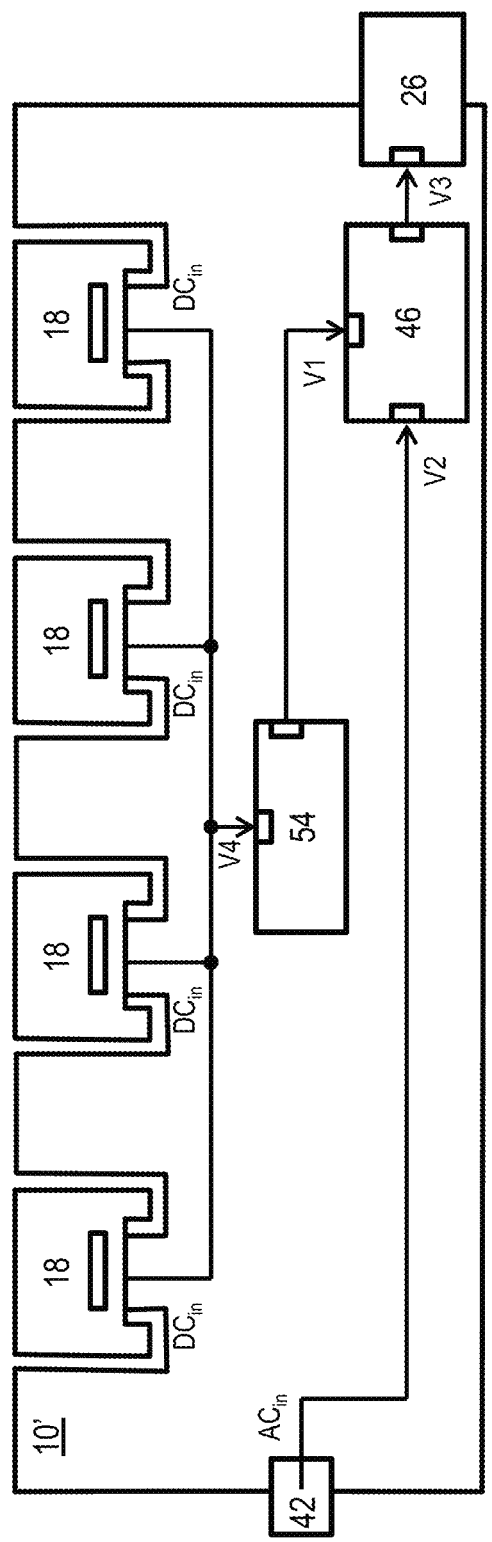
FIG. 24 is a simple block diagram of another exemplary portable power supply of the present invention.

Referring to FIG. 24, there is illustrated an exemplary power supply 10' of FIG. 18 further comprising a booster 54. The booster is similar to the booster described above. Referring to FIG. 24, the input V1 of the voltage controller 46 is coupled to the output of the booster 54 and the input V4 of the booster 54 is coupled to the battery pack(s) 18 such that the battery pack(s) 18 provides DC voltage to the booster 54 and the booster 54 provides boosted DC voltage to the voltage controller 46 and the input V2 of the voltage controller 46 is coupled to the AC input 42 such that the AC supply provides AC voltage to the voltage controller 46. The input V3 of the output coupler 26 is coupled to the output of the voltage controller 46 such that the voltage controller 46 provides voltage solely from input V1 or voltage solely from input V2 or provides voltage from V1 and V2, wherein the voltage input to inputs V1 and V2 may be synchronized with each other, may alternate with each other, may be connected in series or parallel to simultaneously provide voltage from the AC power supply and/or voltage battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output.

Figure 25:
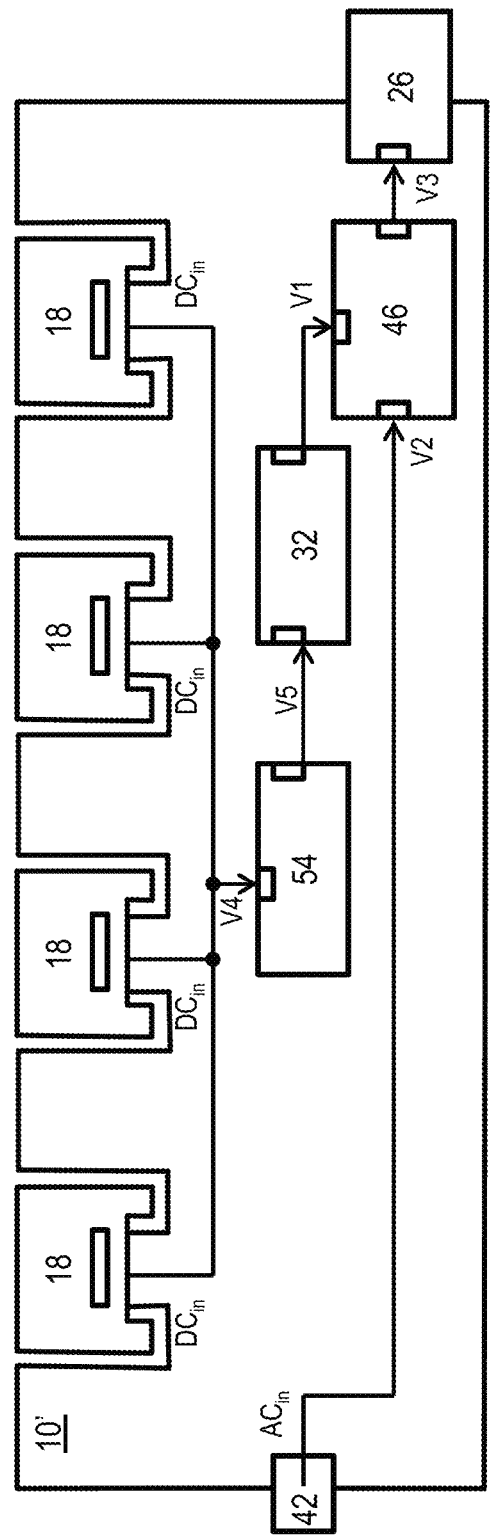
FIG. 25 is a simple block diagram of another exemplary portable power supply of the present invention.

Referring to FIG. 25, there is illustrated an exemplary power supply 10' of FIG. 18 further comprising a booster 54 and an inverter 32. Referring to FIG. 25, the input V1 of the voltage controller 46 is coupled to the output of the inverter 32 and the input V5 of the inverter 32 is coupled to the output of the booster 54 and the input V4 of the booster 54 is coupled to the battery pack(s) 18 such that the battery pack(s) 18 provides DC voltage to the booster 54 and the booster 54 provides boosted DC voltage to the inverter 32 and the inverter 32 provides boosted AC voltage to the voltage controller 46 and the input V2 of the voltage controller 46 is coupled to the AC input 42 such that the AC supply provides AC voltage to the voltage controller 46. The input V3 of the output coupler 26 is coupled to the output of the voltage controller 46 such that the voltage controller 46 provides voltage solely from input V1 or voltage solely from input V2 or provides voltage from V1 and V2, wherein the voltage input to inputs V1 and V2 may be synchronized with each other, may alternate with each other, may be connected in series or parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output.

Figure 26:
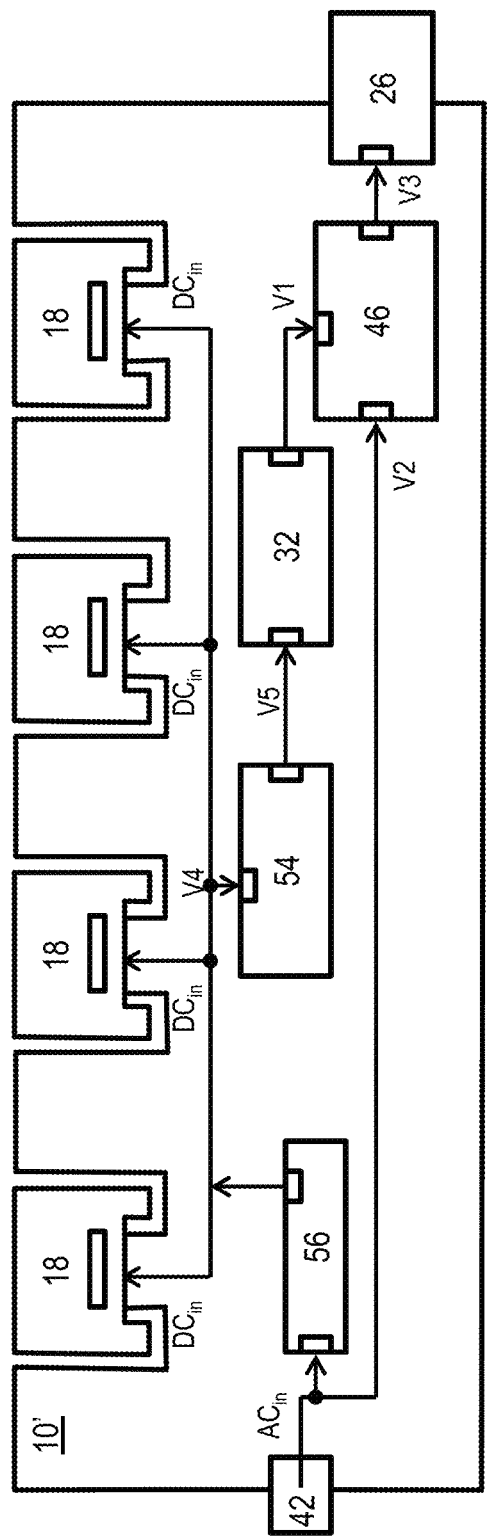
FIG. 26 is a simple block diagram of another exemplary portable power supply of the present invention.

Referring to FIG. 26, there is illustrated an exemplary power supply 10' of FIG. 18 further comprising a charger 56, a booster 54 and an inverter 30. In an alternate embodiment, the portable power supply 10' may not comprise a booster. Referring to FIG. 26, the input V1 of the voltage controller 46 is coupled to the output of the inverter 32 and the input V5 of the inverter 32 is coupled to the output of the booster 54 and the input V4 of the booster 54 is coupled to the battery pack(s) 18 such that the battery pack(s) 18 provides DC voltage to the booster 54 and the booster 54 provides boosted DC voltage to the inverter 32 and the inverter 32 provides boosted AC voltage to the voltage controller 46 and the input V2 of the voltage controller 46 is coupled to the AC input 42 such that the AC supply provides AC voltage to the voltage controller 46. The input V3 of the output coupler 26 is coupled to the output of the voltage controller 46 such that the voltage controller 46 provides voltage solely from input V1 or voltage solely from input V2 or provides voltage from V1 and V2, wherein the voltage input to inputs V1 and V2 may be synchronized with each other, may alternate with each other, may be connected in series or parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output.

As noted above, the portable power supply 10' may be configured to include a charger 56 to charge the battery pack(s) 18 that are coupled to the portable power supply 10' when the portable power supply 10' is coupled to the wall/AC mains line voltage.

When the portable power supply 10' is charging the battery pack(s) 18 using the wall/AC mains line power (charging mode), there are at least three different methods the portable power supply 10' can operate when a corded power tool 28 is coupled to the portable power supply 10'. The first method for providing power to the corded power tool 28 that is coupled to the portable power supply 10' when the portable power supply 10' is in charging mode is to provide the output power to the corded power tool 28 from the wall/AC mains line while also providing the charging power to the battery pack(s) 18 from the wall/AC mains line. In other words, the corded power tool 28 coupled to the portable power supply 10' and the charger 56 share the wall/AC mains line power. This is an important point because pulling power from the batteries 18 while they are being charged is difficult. The second method for providing power to the corded power tool 28 that is coupled to the portable power supply 10' when the portable power supply 10' is in charging mode is to stop charging the battery pack(s) 18 and provide power to the corded power tool 28 only from the battery pack(s) 18, e.g., do not provide power to the corded power tool 28 from the wall/AC mains line. The third method for providing power to the corded power tool 28 that is coupled to the portable power supply 10' when the portable power supply 10' is in charging mode is to stop charging the battery pack(s) 18 and provide power to the corded power tool 28 from both the battery pack(s) 18 and the wall/AC mains line. When using the third method, the output power of the portable power supply 10' is potentially greater than that of the wall/AC mains line alone because portable power supply 10' supplements the wall/AC mains line power with the battery pack(s) power.

Battery 18 charging while AC mains current draw is lower than 15 amps would provide a method to keep the batteries 18 charged.

Figure 27:
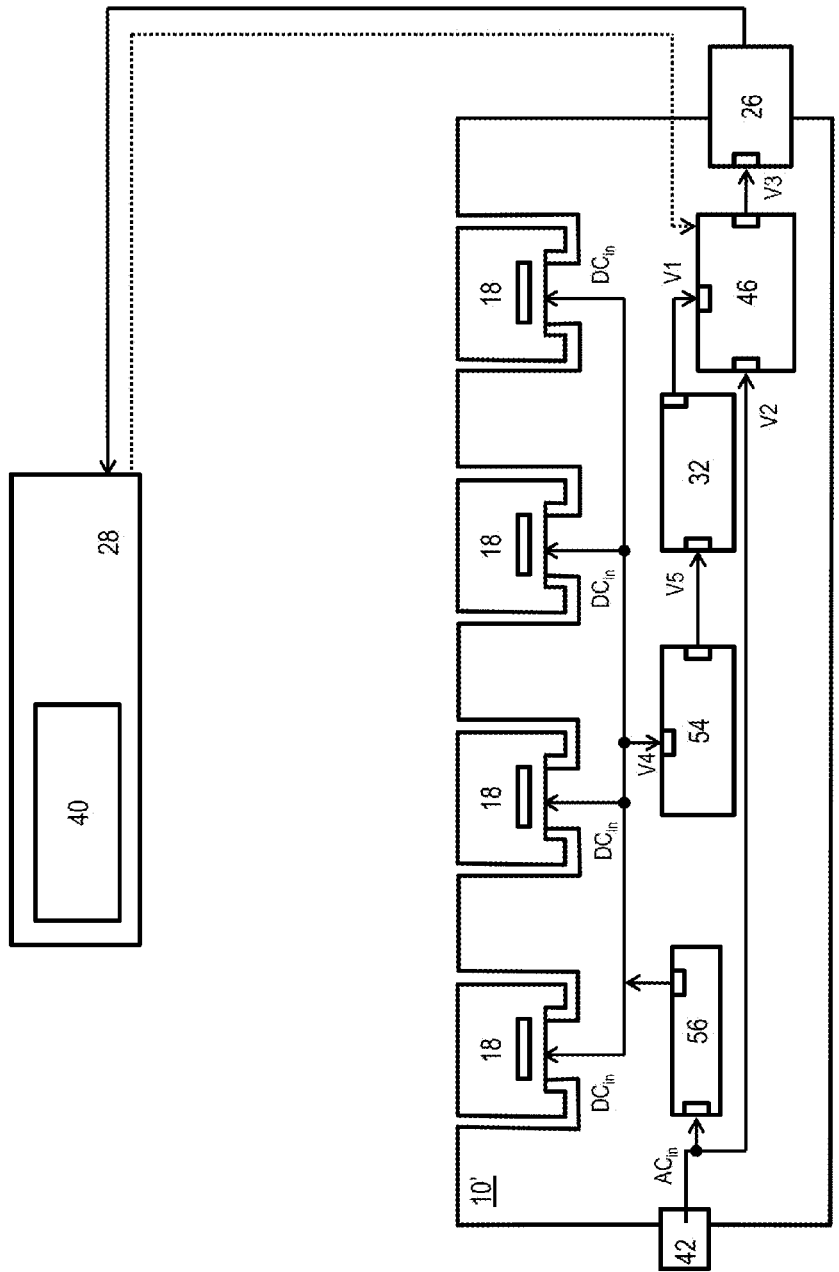
FIG. 27 is a simple block diagram of another exemplary portable power supply of the present invention.

Referring to FIG. 27, the portable power supply 10' may be coupled to an electrical device 28 to provide power from the power supply 10' to the electrical device 28. The electrical device 28 may include a device controller 40 and a signal connection line 58 between the electrical device 28 and the power supply 10'. The signal connection line 58 may be coupled to the voltage controller 46 to provide control signals to the voltage controller 46 to switch between the four states illustrated in FIG. 19. For example, the device 28 may be designed to operate at a higher current draw or voltage than the mains line is capable of providing. In this instance, the device 28 would instruct the power supply 10' to place the voltage controller 46 in the fourth state illustrated in FIG. 19*d* or when to switch between the second state illustrated in FIG. 19*b* and the third state illustrated in FIG. 19*c*. Another novel aspect of the present disclosure is the ability of a corded power tool 28 coupled to the portable power supply 10' to communicate with the portable power supply 10'. This feature allows a corded power tool 28 that requires or is capable of utilizing more power than the wall/AC mains lines is capable of delivering to communicate a request for additional power to the portable power supply 10'. In this instance, the corded power tool 28 can communicate to the portable power supply 10' and request additional power. When this occurs, the portable power supply 10' can combine the power from the battery pack(s) 18 and the power from the wall/AC mains line.

Figure 28:
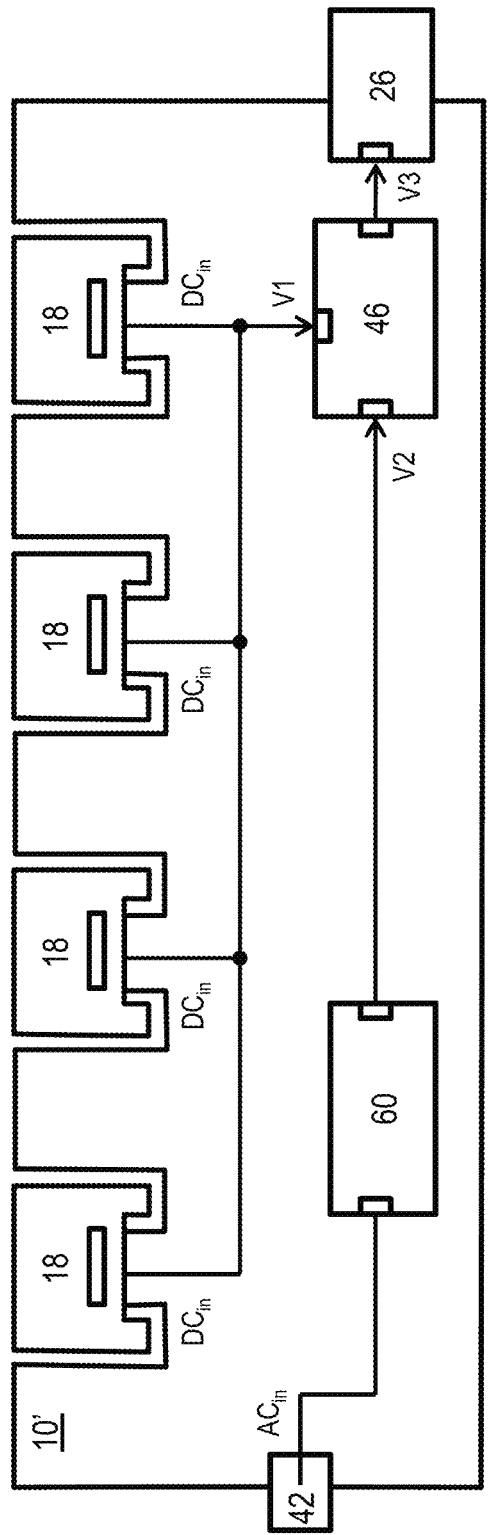
FIG. 28 is a simple block diagram of another exemplary portable power supply of the present invention.

Referring to FIG. 28, there is illustrated another exemplary embodiment of the portable power supply 10' of FIG. 18 further comprising a rectifier 60 coupled between the AC power input 42 and the voltage controller 46. As an example, the rectifier 60 may be a bridge rectifier. Referring to FIG. 28, the input V1 of the voltage controller 46 is coupled to the battery pack(s) 18 such that the battery pack(s) 18 provides DC voltage to the voltage controller 46 and the input V2 of the voltage controller 46 is coupled to the output of the rectifier 60. The input of the rectifier 60 is coupled to the AC input 42 such that the AC supply provides AC voltage to the rectifier 60 and the rectifier 60 provides DC voltage to the voltage controller 46. The input V3 of the output coupler 26 is coupled to the output of the voltage controller 46 such that the voltage controller 46 provides voltage solely from input V1 or voltage solely from V2 or provides voltage from V1 and V2, wherein the voltage input to inputs V1 and V2 may be synchronized with each other, may alternate with each other, may be connected in series or may be connected in parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output. In an alternate embodiment, the portable power supply 10' of FIG. 28 may comprise an inverter coupled between the output of the voltage controller 46 and the input of the output coupler 26. In another alternate embodiment, the portable power supply 10' of FIG. 28 may comprise a charger coupled between the AC power supply input 42 and the battery pack(s) 18.

Figure 29:
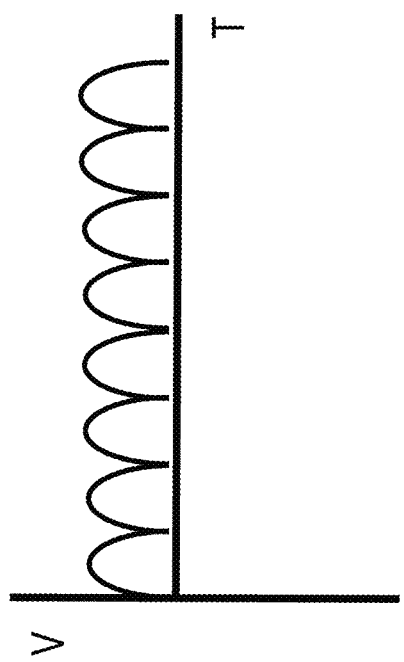
FIG. 29 is a simple graph of an exemplary output from an exemplary rectifier of the present invention.

With reference to FIG. 29, there is illustrated a simple graph of the voltage output of the rectifier 60.

With reference to FIG. 30, there is illustrated a simple graph of the voltage output V3 of the voltage controller 46 of FIG. 28. The waveform illustrated in FIG. 30 could be the result of the voltage controller 46 of FIG. 28 alternating between the state illustrated in FIG. 19*b* and the state illustrated in FIG. 19*c*. In this instance, the voltage controller 46 is in the state illustrated in FIG. 19*b* 50% of the switching duty cycle and in the state illustrated in FIG. 19*c* 50% of the switching duty cycle. In other words, the voltage controller 46 is in state 2 (DC power only) for a full duty cycle and then in state 3 (rectified AC) for a full duty cycle. The voltage controller 46 continues to switch back and forth (alternate) between states 2 and state 3.

With reference to FIG. 31, there is illustrated a simple graph of the voltage output of the voltage controller 46. The waveform illustrated in FIG. 31 could be the result of the voltage controller 46 of FIG. 28 being in the fourth state illustrated in FIG. 19*d*. In this instance, the DC power from the battery pack(s) 18 is combined with the rectified AC from the input AC power source. In this exemplary embodiment, the DC power "fills in" the valleys between the rectified AC power.

With reference to FIG. 28, another exemplary embodiment of the portable power supply 10' may comprise an inverter 32 coupled between the output of the voltage controller 46 and the input of the output 26 of the power supply 10'. By adding an AC inverter 32 between the voltage controller 46 and the output, the hybrid portable power supply 10' can be used to power other loads without overloading AC mains line 120V branch circuits. The control methods described above also apply with this concept. The inverter 32 is used to synchronize output power waveform with the AC mains line input power waveform to recreate an in-phase AC waveform as shows in FIGS. 22 and 23. FIG. 22 shown alternating cycle by cycle AC mains line power and battery power. FIG. 23 shows parallel operation where the battery is switched in 50% of the time but phase shifted to match the peaks of the AC mains line power.

Figure 32:
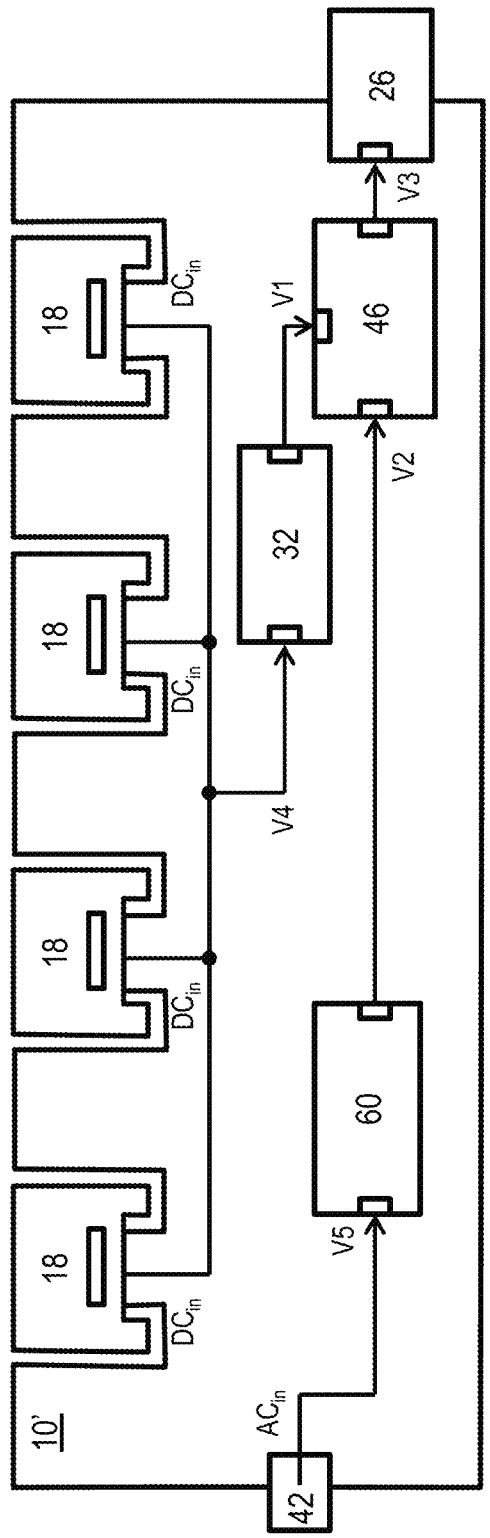
FIG. 32 is a simple block diagram of another exemplary portable power supply of the present invention.

Referring to FIG. 32, there is illustrated another exemplary embodiment of the power supply of FIG. 28 further comprising an inverter 32 coupled between the battery pack(s) 18 and the voltage controller 46. Referring to FIG. 32, the input V1 of the voltage controller 46 is coupled to the output of the inverter 32 and the input V4 of the inverter 32 is coupled to the battery pack(s) 18 such that the battery pack(s) 18 provides DC voltage to the inverter 32 and the inverter 32 provides AC voltage to the voltage controller 46. The input V2 of the voltage controller 46 is coupled to the output of the rectifier 60 and the input V5 of the rectifier 60 is coupled to the AC power supply connector 42 such that the AC power supply provides AC voltage to the rectifier 60 and the rectifier 60 provides DC voltage to the voltage controller 46. The input V3 of the output coupler 26 is coupled to the output of the voltage controller 46 such that the voltage controller 46 provides voltage solely from input V1 or voltage solely from V2 or provides voltage from V1 and V2, wherein the voltage input to inputs V1 and V2 may be synchronized with each other, may alternate with each other, may be connected in series or may be connected in parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output. In another alternate embodiment, the portable power supply 10' of FIG. 32 may comprise a charger coupled between the AC power supply input 42 and the battery pack(s) 18.

Figure 33:
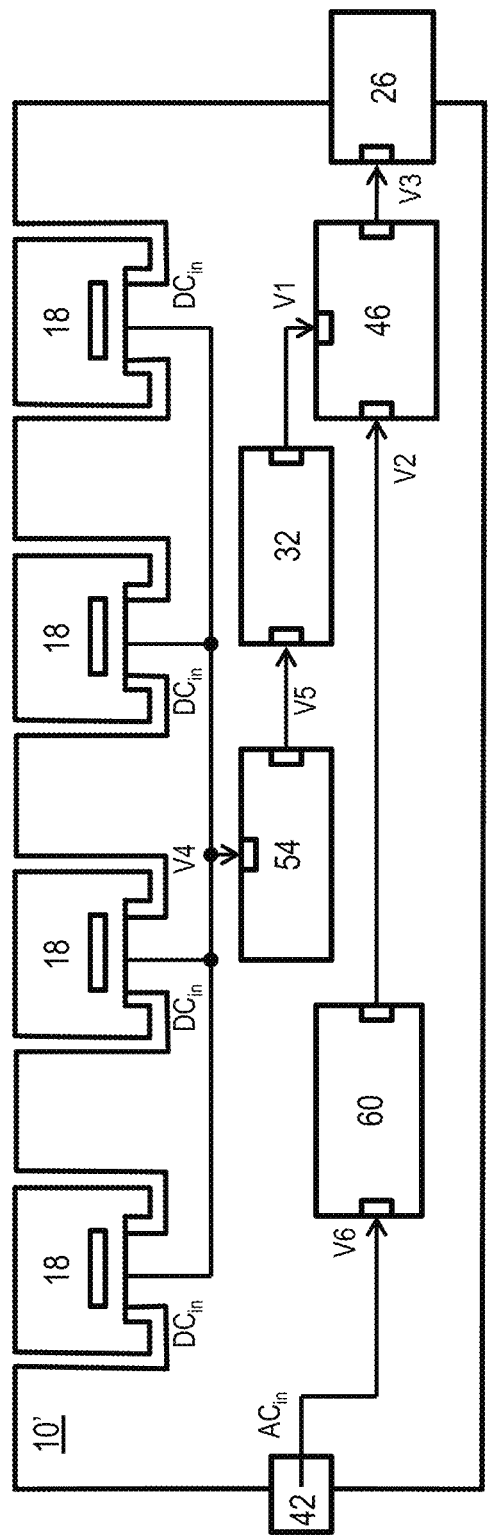
FIG. 33 is a simple block diagram of another exemplary portable power supply of the present invention.

Referring to FIG. 33, there is illustrated another exemplary embodiment of the portable power supply 10' of FIG. 32 further comprising a booster 54 coupled between the battery pack(s) 18 and the inverter 32. Referring to FIG. 25, the input V1 of the voltage controller 46 is coupled to the output of the inverter 32 and the input V5 of the inverter 32 is coupled to the output of the booster 54 and the input V4 of the booster 54 is coupled to the battery pack(s) 18 such that the battery pack(s) 18 provides DC voltage to the booster 54 and the booster 54 provides boosted DC voltage to the inverter 32 and the inverter 32 provides boosted AC voltage to the voltage controller 46. The input V2 of the voltage controller 46 is coupled to the output of the rectifier 60 and the input V6 of the rectifier 60 is coupled to the AC power supply connector 42 such that the AC power supply provides AC voltage to the rectifier 60 and the rectifier 60 provides DC voltage to the voltage controller 46. The input V3 of the output coupler 26 is coupled to the output of the voltage controller 46 such that the voltage controller 46 provides voltage solely from input V1 or voltage solely from input V2 or provides voltage from V1 and V2, wherein the voltage input to inputs V1 and V2 may be synchronized with each other, may alternate with each other, may be connected in series or parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output. In another alternate embodiment, the portable power supply 10' of FIG. 33 may comprise a charger coupled between the AC power supply input 42 and the battery pack(s) 18.

Figure 34:
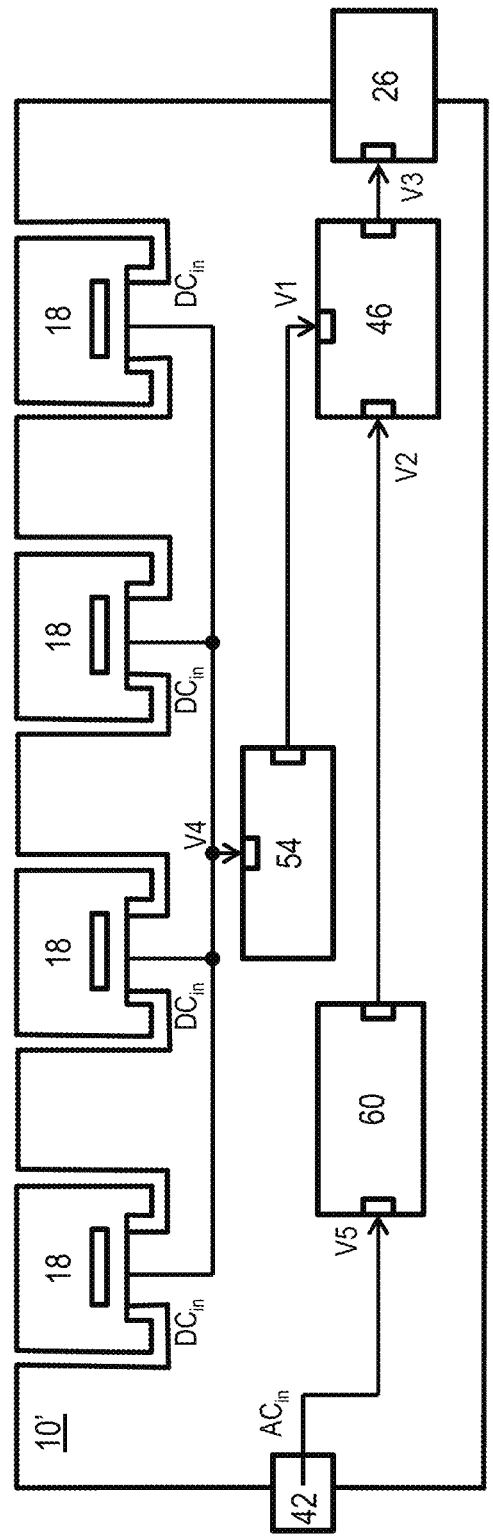
FIG. 34 is a simple block diagram of another exemplary portable power supply of the present invention.
Figure 35:
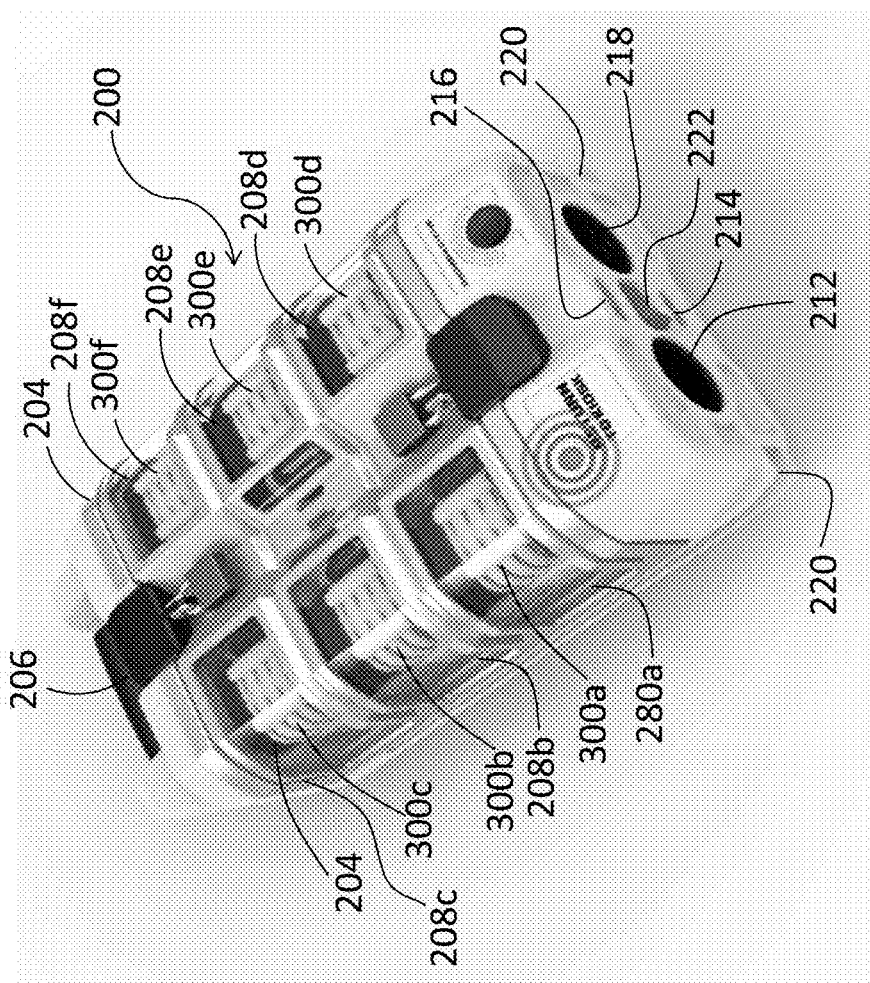
FIG. 35 is an isometric view of an exemplary embodiment of a carrier of the present invention.
Figure 36:
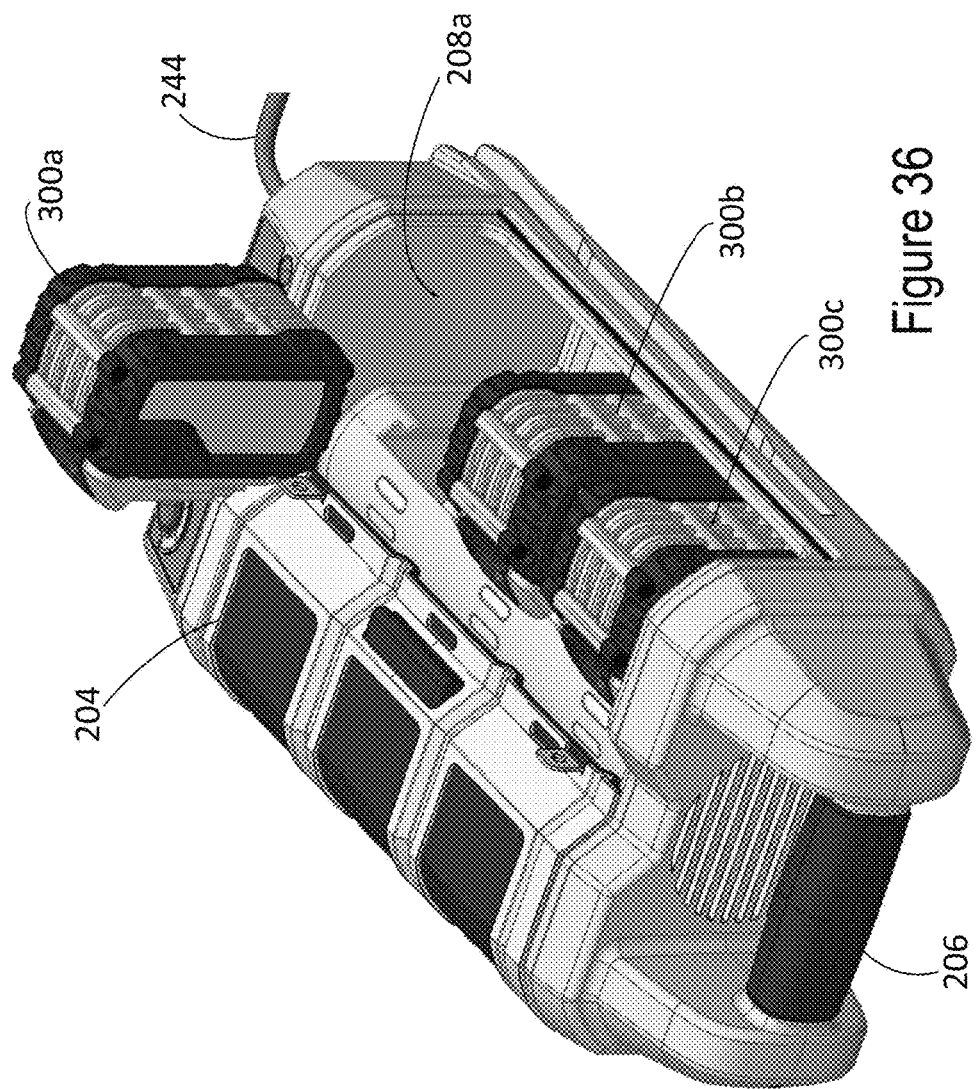
FIG. 36 is another isometric view of an exemplary embodiment of a carrier of the present invention.
Figure 37:
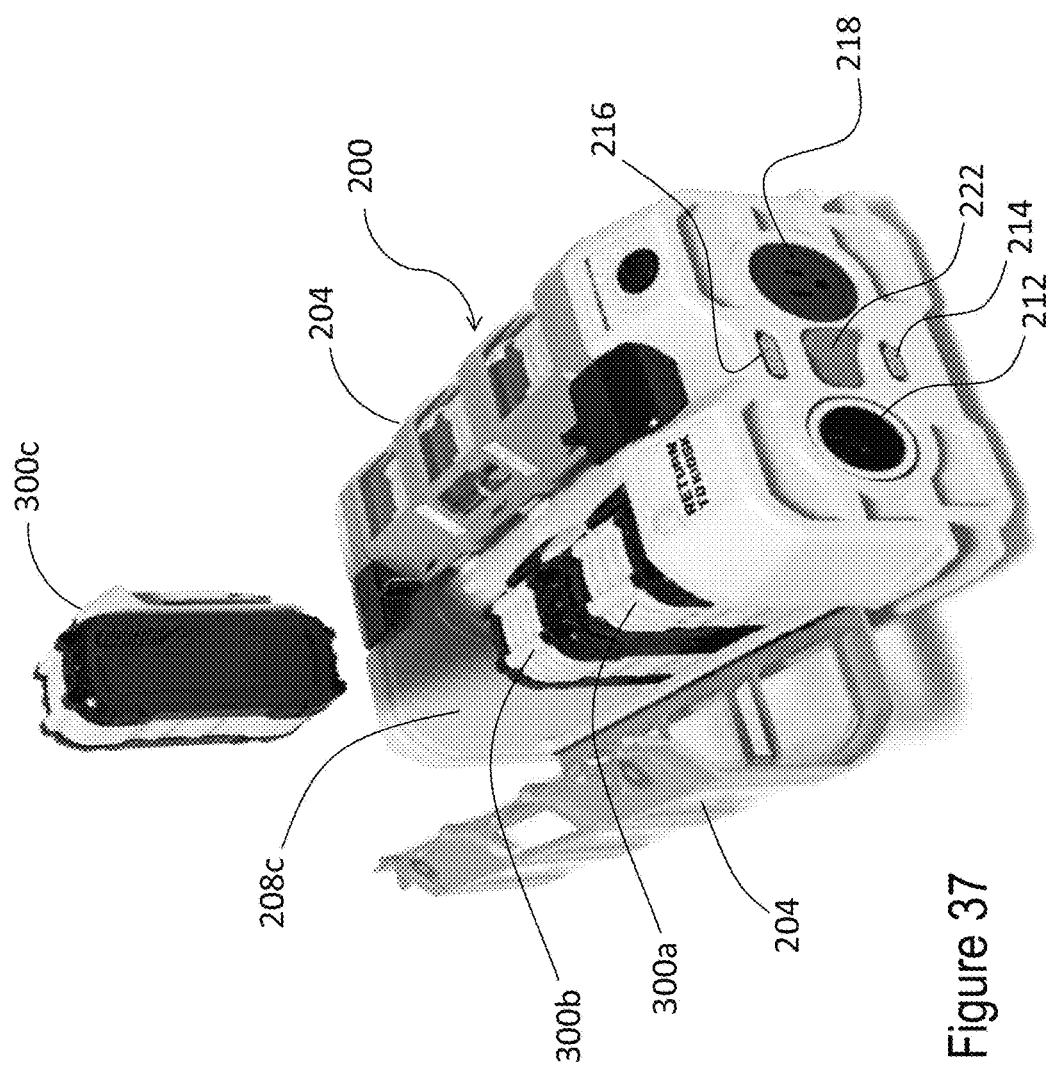
FIG. 37 is another isometric view of an exemplary embodiment of a carrier of the present invention.
Figure 38:
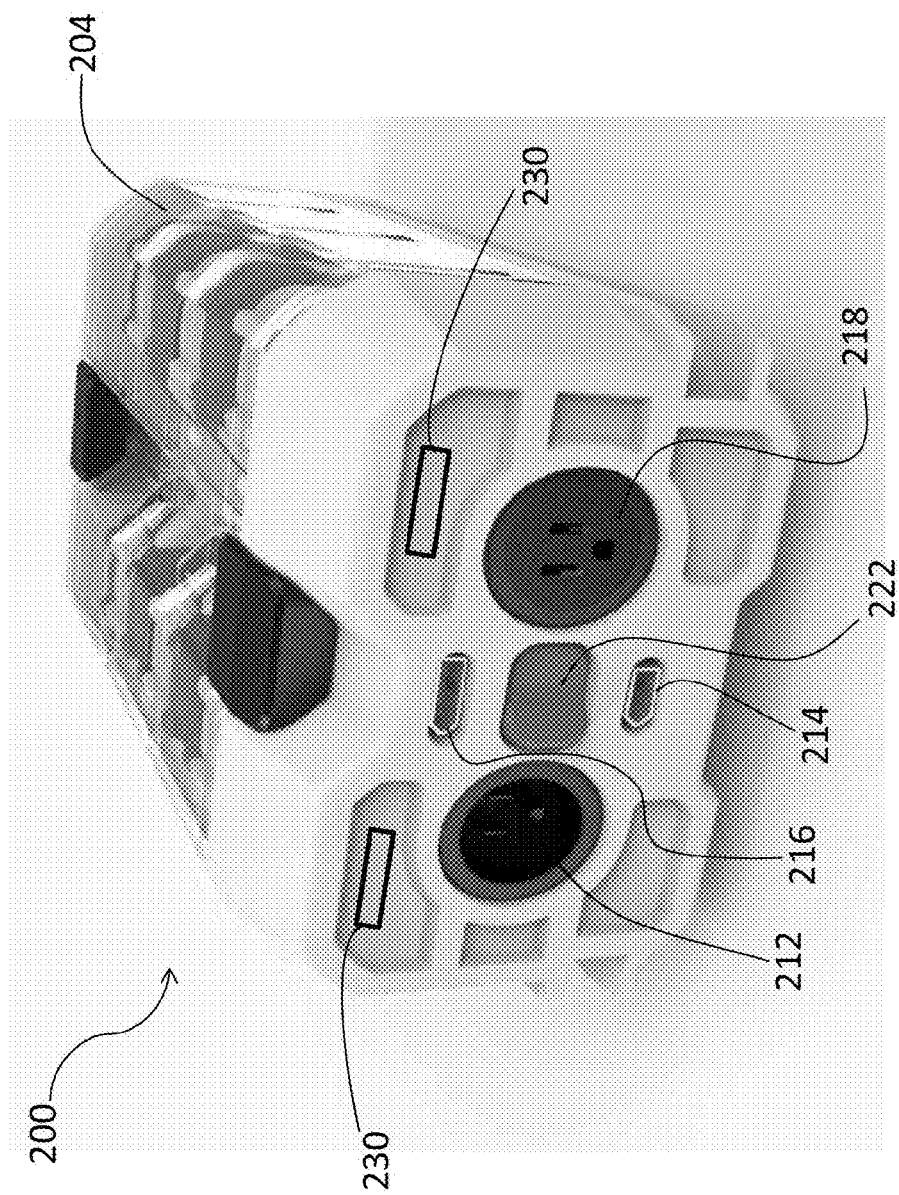
FIG. 38 is another isometric view of an exemplary embodiment of a carrier of the present invention.

Referring to FIG. 34, there is illustrated another exemplary embodiment of the portable power supply 10' of FIG. 28 further comprising a booster 54 coupled between the battery pack(s) 18 and the voltage controller 46. Referring to FIG. 34, the input V1 of the voltage controller 46 is coupled to the output of the booster 54 and the input V4 of the booster 54 is coupled to the battery pack(s) 18 such that the battery pack(s) 18 provides DC voltage to the booster 54 and the booster 54 provides boosted DC voltage to the voltage controller 46. The input V2 of the voltage controller 46 is coupled to the output of the rectifier 60 and the input V5 of the rectifier 60 is coupled to the AC power supply connector 42 such that the AC power supply provides AC voltage to the rectifier 60 and the rectifier 60 provides DC voltage to the voltage controller 46. The input V3 of the output coupler 26 is coupled to the output of the voltage controller 46 such that the voltage controller 46 provides voltage solely from input V1 or voltage solely from input V2 or provides voltage from V1 and V2, wherein the voltage input to inputs V1 and V2 may be synchronized with each other, may alternate with each other, may be connected in series or parallel to simultaneously provide voltage from the AC power supply and/or voltage from the battery pack(s) 18 to the output coupler 26. The voltage controller 46 determines the voltage signal to be output therefrom and therefore the power to be output therefrom. The voltage controller 46 selects from the voltage controller inputs V1, V2 to determine the power output. In an alternate embodiment, the portable power supply 10' of FIG. 34 may comprise an inverter coupled between the output of the voltage controller 46 and the input of the output coupler 26. In another alternate embodiment, the portable power supply 10' of FIG. 34 may comprise a charger coupled between the AC power supply input 42 and the battery pack(s) 18.

Referring to FIGS. 35-39, there is illustrated a carrier 200. The carrier 200 includes a housing 202 and a carrying handle 206. The carrier housing 202 includes side walls. The carrier 200 may also include a door or cover 204. The cover 204 may be transparent. The carrier housing 202 includes a plurality of receptacles 208. Each receptacle 208 is configured to receive a rechargeable, removable battery pack 300. The cover 204 may be configured to allow access to a plurality of the receptacles 208. In an alternate exemplary embodiment, there may be an individual cover 204 for each receptacle 208. The cover(s) may include latching system elements configured to operate with corresponding latching system elements on the carrier housing 202 to fix the cover 204 to the housing 202 and to allow a user to open and close the door(s) 204. The carrier 200 may include one or more security features, e.g., loops or latches 209 to receive one or more user applied padlocks 210 or other security locking devices to lock the cover(s) 204 to the carrier housing 202.

In the disclosed exemplary embodiment, the housing 202 includes six receptacles 208a-f for receiving six battery packs 300a-f, respectively. However, it should be understood that the carrier 200 may have any number of receptacles 208 for receiving a corresponding number of battery packs 300.

Figure 39A:
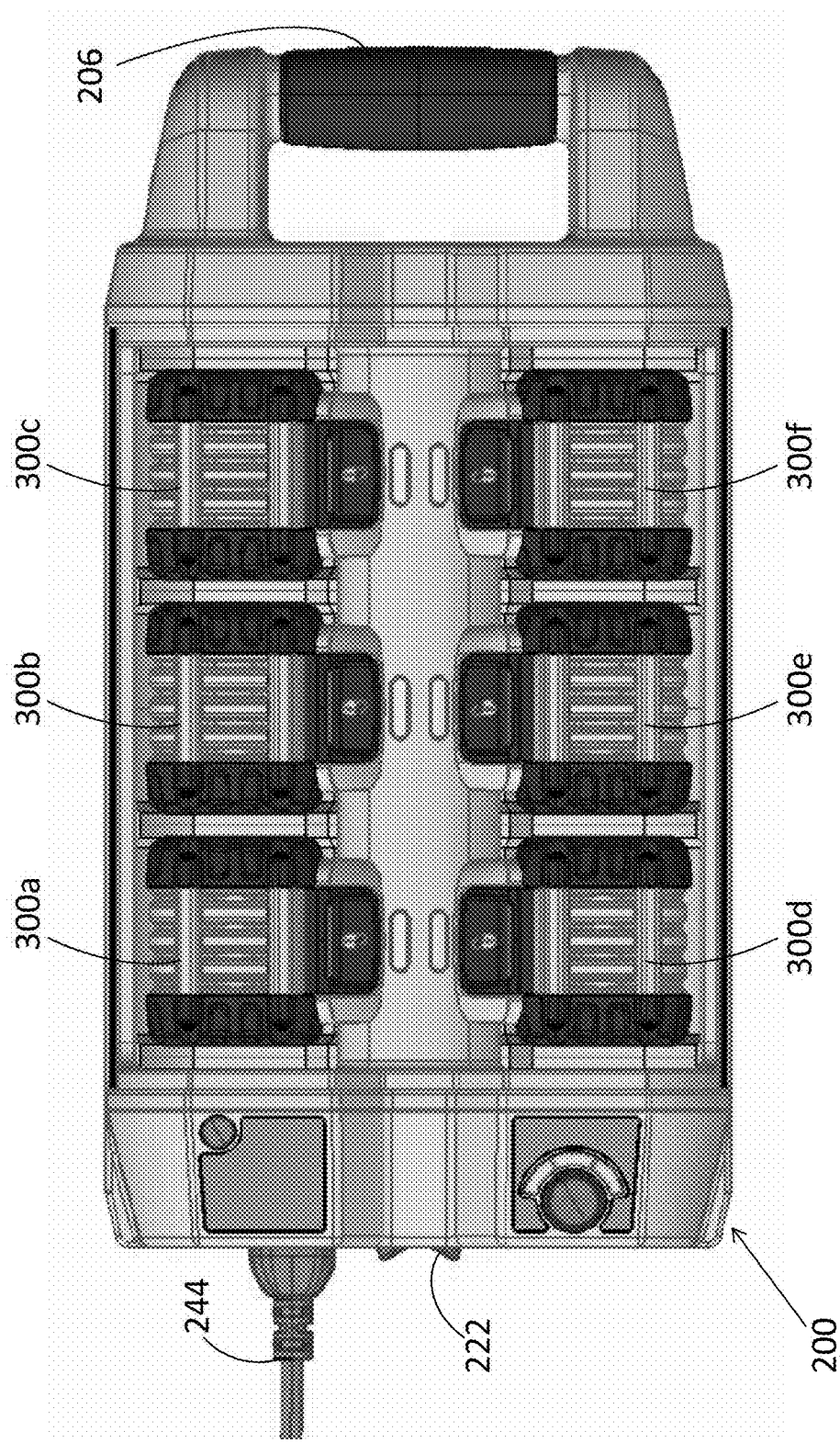
FIG. 39A is a plan view of an exemplary embodiment of a carrier of the present invention including six battery packs.
Figure 39B:
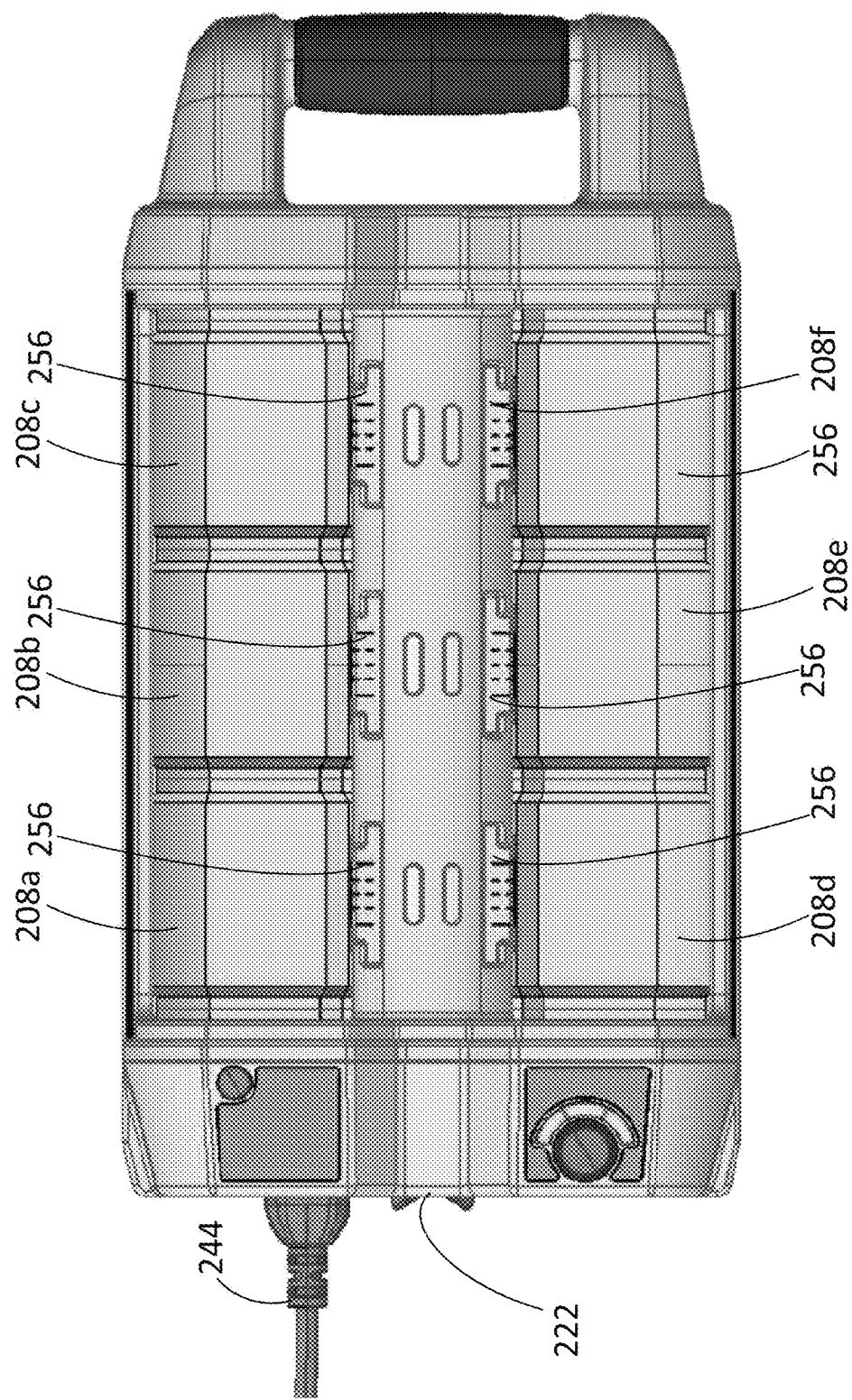
FIG. 39B is a plan view of the exemplary embodiment of the carrier of FIG. 39A without the battery packs.

As illustrated in FIGS. 39A and 39B, each receptacle 208 includes an interface for mating with the battery pack 300 and each battery pack 300 includes an interface for mating with the receptacle 208. The receptacle interface includes a terminal block 256 for electrically coupling the battery pack 300 to the internal circuitry of the carrier 200 and the battery interface includes a terminal block 310 for electrically coupling the receptacle 208 to the battery cells within the battery pack 300. The receptacle interface and terminal block 256 are substantially similar to a tool interface and terminal block of a cordless power tool configured to mate and operate with the battery pack 300. In the illustrated exemplary embodiment, the battery packs 300 are convertible battery packs, as disclosed and described in provisional U.S. Patent Application Nos. 61/944,953 filed May 18, 2014, 62/000,112 filed May 19, 2014 and 62/046546 filed Sep. 5, 2014, which are incorporated herein by reference. The battery packs 300 may be any one of the embodiments described in the aforementioned provisional applications. As such, the carrier terminal block would be configured in the same manner as the power tool terminal block for a corresponding convertible battery pack as disclosed and described in the aforementioned U.S. Provisional Applications. The exemplary battery packs 300 are 20V/60V rated voltage battery packs; however battery packs 300 having other rated voltages are contemplated and encompassed by the present disclosure. Additionally, in alternate exemplary embodiments, the battery packs 300 are non-convertible battery packs such as the battery packs disclosed and described in U.S. Pat. No. 8,653,787, which is incorporated herein by reference. These battery packs 300 may be any of a variety of rated voltages, for example 20V, 40V, 60V, etc.

The housing 202 also includes an AC power input connector 212, e.g., a 3 prong 120 VAC male plug or female receptacle, a universal DC power input connector 214 for connecting to a DC power supply, e.g., a 12V car charger port, a USB port, and/or a trailer adapter port, and a communications connector 216, e.g., a USB port, a serial port, or a set of electrical contacts. The carrier 200 also includes a power output connector 218. In a first exemplary embodiment, the power output connector 218 is an AC power output connector. In a second exemplary embodiment, the power output connector 218 is a DC power output connector. The carrier 200 also includes a switch 222 for switching between a charging mode of operation that charges the battery packs 300 using electrical power input through the power input connectors 212, 214, and a discharging mode of operation that outputs electrical power from the battery packs 300 through the power output connector 218. Alternatively, the external switch 222 may be replaced with an automatic internal switch and a current sensor for the AC and DC power inputs such that the internal switch switches to charging mode when the current sensor senses an input current and switches to discharge mode when the current sensor does not sense an input current.

Figure 40:
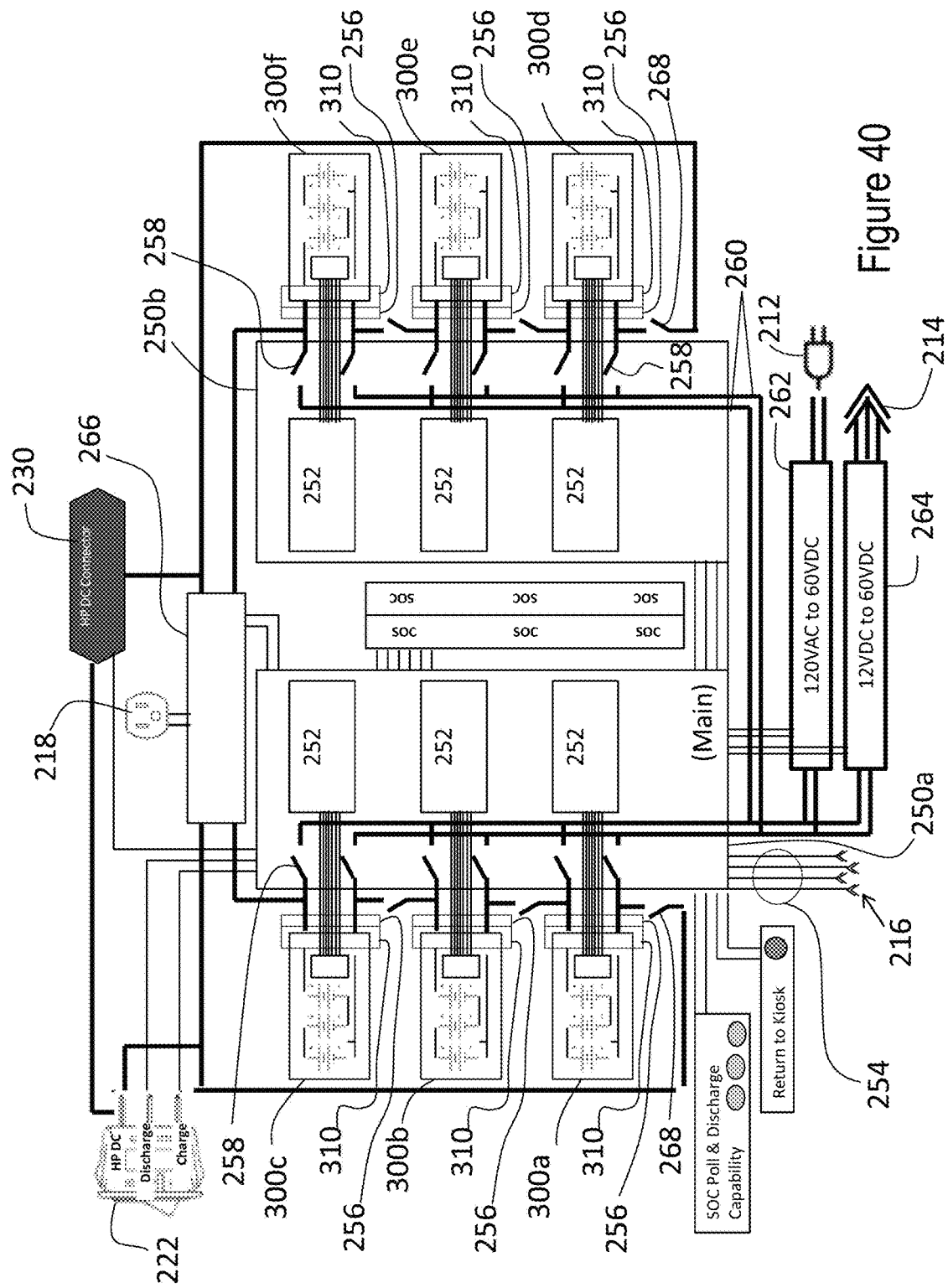
FIG. 40 is a simplified schematic diagram of an exemplary embodiment of a carrier and battery packs of the present invention.

As illustrated in the simplified schematic of FIG. 40, the carrier 200 includes a plurality of electrical and electronic components for monitoring, managing and/or controlling the charging and discharging of the battery packs 300. More particularly, the carrier 200 includes a system management unit (SMU) 250. The SMU 250 may be configured as a single printed circuit assembly or may be configured as two printed circuit assemblies SMU1 250*a*, SMU2 250*b*—as illustrated in FIG. 40—or may be configured as more than two printed circuit assemblies. The SMU 250 may include a processor and may include a charge/discharge control module 252. The carrier 200 may be configured to include a charge/discharge control module 252 for each battery 300— as illustrated in FIG. 30—or may include a single charge/ discharge control module 252 for all of the batteries 300 or may include some other number of charge/discharge control modules. As discussed in more detail below, the charge/ discharge control modules 252 communicate with the SMU 250.

The charge/discharge control modules 252 are electrically connected to the battery packs 300 via the receptacle terminal block 256 and the battery pack terminal block 310. The charge/discharge control module 252 controls a plurality of switches 258 to provide a charging current to the battery packs 300 through the carrier power supply lines 260, the receptacle terminal block 256 and the battery pack terminal block 310—as will be discussed in more detail below.

The SMU 250 also communicates with a power supply 262 coupled to the AC power input connector 212 and a power supply 264 coupled to the DC power input connector 214. The AC power supply 262 may be, for example, a 120 VAC to 60 VDC power supply and the DC power supply 264 may be, for example, a 12 VDC to 60 VDC power supply to supply power to the battery packs 300. The power supplies 262, 264 will be configured to provide a charging voltage equal to the rated charging voltage of the battery pack configuration of a particular carrier 200. For example, if all of the battery packs are 60 V battery packs then the power supplies 262, 264 will be configured to provide a 60 VDC output. Alternatively, if all of the battery packs are 20 V battery packs then the power supplies 262, 264 will be configured to provide a 20 VDC output.

The SMU 250 also communicates with an inverter 266. The inverter 266 may be a pure sine wave inverter, a modified sign wave inverter, a pulse wave inverter or any other inverter capable of providing an AC output signal or an approximated AC output signal, for example one of the signals illustrated in FIG. 7, for providing power to AC electrical and electronic devices. The inverter 266 is electrically connected to the power output connector 218. In the exemplary embodiment, the inverter is a 189 VDC to 120 VAC, square wave approximation sine wave inverter. In an alternate embodiment, the carrier 200 does not include an inverter and only provides DC output power.

The SMU 250 is also electrically connected to the discharge/charge mode switch 222. Generally speaking, when the switch 222 is in the charge position, a charge signal is sent to the SMU 250. In turn, the SMU 250 sends a signal to the inverter 266 to turn the inverter 266 off, sends a signal to the power supply 262, 264 to turn the power supply 262, 264 on, and selectively sends a signal to the switches 258 to close the switches 258 to selectively connect the battery packs 300 to the power supplies 262, 264. Depending upon the status of the battery pack 300 and the status of the carrier 200, the SMU 250 and the charge/discharge control modules 252 will operate to charge the appropriate battery packs 300. In other words, the charge/discharge control modules 252 may operate to charge the battery packs 300 one at a time, one than one but less than all simultaneously or all simultaneously.

Generally speaking, when the switch 222 is in the discharge position, a discharge signal is sent to the SMU 250. In turn, the SMU 250 sends a signal to the inverter 266 to turn the inverter 266 on, sends a signal to the power supply 262, 264 to turn the power supply 262, 264 off, and selectively sends a signal to the switches 258 to selectively open the switches 258 to disconnect the battery packs 300 from the power supplies 262, 264.

The carrier 200 may also include a plurality of door switches 268. The door switches 268 ensure that the terminal blocks of an empty receptacle are not of a dangerous electrical potential when the door 204 is open. More particularly if the door 204 is open and two receptacles 208*a*, 208*b* have fully charged battery packs 300*a*, 300*b* inserted therein and a third receptacle 208*c* does not have a battery pack 300*c* inserted therein a voltage across the empty terminal block could be approximately 60V. And if the door was open and the door switches were not present a user could conceivably touch the terminals at a dangerous electrical potential and receive a potentially dangerous shock. As such, when the door 204 is open all three door switches 268*a*, 268*b*, 268*c* will be open. This will provide an open circuit between carrier receptacle terminal blocks and prevent potential shocks when not all of the receptacles include battery packs 300.

The carrier 200 can communicate with each of the plurality of battery packs 300 for purposes of identifying a particular battery pack 300, performing a status diagnosis of the battery pack 300 and/or reporting data logging associated with the battery pack 300.

For example, an AC mains line power supply may provide charging power to the carrier 200 through a power supply cord 244 connected to the carrier AC power input connector 212, the carrier AC power supply 262 and the carrier power supply lines 260. Alternately, for example, an automotive power supply, a solar power supply or a trailer power supply may provide charging power to the carrier 200 through a supply cord connected to the carrier DC power input connector 214, the carrier DC power supply 264 and the carrier power supply lines 260.

Figure 41:
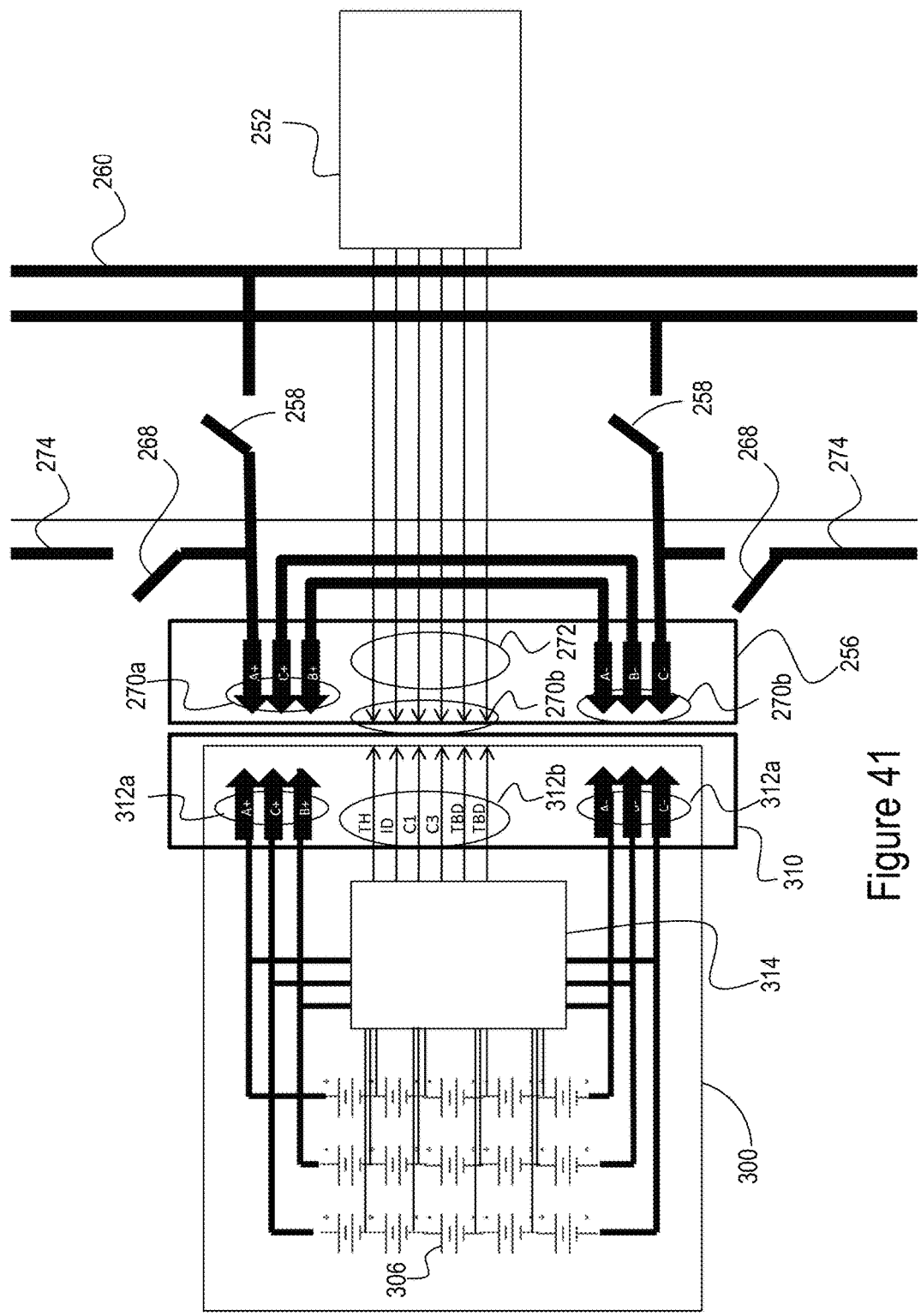
FIG. 41 is a simplified schematic diagram of an exemplary embodiment of a carrier and a battery pack of the present invention.

Referring to FIG. 41, there is illustrated an exemplary battery pack 300. As noted above, the battery pack 300 may be a convertible battery pack, for example any one of the battery packs disclosed and described in the above-referenced U.S. Provisional Application Nos. 61/944,953 filed May 18, 2014, 62/000,112 filed May 19, 2014 and 62/046,546 filed Sep. 5, 2014. As such, the battery pack 300 will not be described in detail. The battery pack 300 includes a plurality of cells 306. The battery pack 300 also includes a battery terminal block 310. The battery terminal block 310 includes a plurality of battery terminals 312. The battery terminals 312 include a first subset of terminals 312a that serve as power terminals 312a and a second subset of terminals 312b that serve as communications or signal terminals 312b. The battery pack 300 also includes a printed circuit assembly 314. In the illustrated exemplary embodiment, the PCA 314 is unique to a rental battery pack 300. For example, the rental PCA 314 may allow for 60V charging. Furthermore, the rental PCA 314 may include a clock and generate an expiration disable signal to disable the battery pack after a certain rental period has ended. This disable signal could be transmitted from the battery PCA 314 to the carrier 200. The rental PCA 314 may also include authentication and serial number information for communication to the carrier 200 to ensure that only appropriate battery packs are being used in conjunction with the carrier 200. The battery PCA 314 may also include a processor and a memory element, for example, an EEPROM to store the aforementioned information and other battery related information. In alternate embodiments, the battery pack may be a standard retail battery pack with a standard PCA 314 that operates with the carrier 200, the carrier SMU 250 and the charge/discharge control module 252.

The battery pack may also be discharged into an electrical device (e.g., a power tool) independent of the carrier by connecting the battery pack directly to the electrical device via the battery terminal block 310. In this case, the discharge circuitry may be located inside of the electrical device, may be incorporated into the battery pack, or some combination thereof. Further, the battery pack 300 may be able to be charged by a separate charger independent of the carrier 200 by connecting the battery pack 300 directly to the charger via the battery pack terminal block 310. The charging circuitry may be located in the charger, in the battery pack 300, or in some combination thereof. In certain embodiments, the battery pack 300 may be connected to an alternative charging and discharging electrical device such as a radio charger.

Also illustrated in FIG. 41 is a schematic diagram of the receptacle terminal block 256. The receptacle terminal block 256 includes a plurality of carrier terminals 270. The carrier terminals 270 include a first subset of terminals 270a that serve as power terminals 270a and a second subset of terminals 270b that serve as communications or signal terminals 270b. As noted above, the carrier 200 includes the charge/discharge control module 252. The charge/discharge control module 252 is connected to the carrier terminal block 256 by the communication lines 272 which in turn are connected to the carrier communication/signal terminals 270b. The charge/discharge control module 252 also controls the carrier charge control switches 258 to enable/disable charging of the battery packs 300. The charge/discharge control module 252 may also be connected to the power discharge lines 274 to enable/disable discharging of the battery packs 300. The charge/discharge control module 252 may also process and/or transmit the communication signals from the battery pack 300 to the SMU 250.

Referring again to FIG. 40, the carrier 200 may discharge in various configurations. For example, if the receptacles 208a, 208b, 208c have 60V battery packs 300a, 300b, 300c therein, the carrier can output 120V RMS AC, 15 A waveform through the inverter 266—the three battery packs 300a, 300b, 300c produce 180V peak voltage for input to the inverter 266. However, if one of the receptacles, for example 208a, does not have a battery pack 300a therein the circuit will be open and the other two battery packs 300b, 300c will not be able to discharge. While the three battery packs 300a, 300b, 300c are discharging a 120V AC supply, the three other battery packs 300d, 300e, 300f from the carrier 200 may be used to operate various electrical devices for example, the convertible battery packs 300d, 300e could be used to provide power to two 20V rated voltage power tools and the battery pack 300f could be used to provide power to a 60V rated voltage power tool. Alternatively, the battery pack 300d could be used to provide power to a 20V rated voltage power tool and the battery packs 300e, 300f could be used to provide power to a 120V rated voltage AC/DC power tool.

The carrier 200 may also provide an AC power supply when the carrier is connected to an AC input power source. Particularly, when the carrier 200 is connected to an AC power supply, for example an AC mains line, the carrier 200 could operate as a power supply pass through by employing a switch and thereby bypassing the internal power supply 262 and the inverter 266 and providing an AC power supply directly from the AC input connector 212 to the AC output connector 218. Alternatively, when the carrier 200 is connected to an AC power supply, for example an AC mains line, and there are three battery packs 300a, 300b, 300c in the carrier, the carrier 200 can provide AC power supply out from the battery packs 300a, 300b, 300c through the inverter 266 and power output connector 218 and when power is not being drawn from the battery packs 300/inverter 266, the carrier 200 can charge the battery packs 300a, 300b 300c. Alternatively, if there are more than three battery packs 300 in the carrier 200 and the carrier 200 is connected to an AC power supply, the carrier 200 can provide an AC power supply out from three of the battery packs 300a, 300b, 300c while simultaneously charging the remaining battery packs 300d and/or 300e and/or 300f.

The carrier 200 may also provide very high power output to a specialized high power connector 230. In a first exemplary embodiment, if all six of the receptacles 208a-f have 60V battery packs 300a-f, DC power may be sourced directly from the battery packs 300a-f—bypassing the inverter 266—and permitting a larger power output on the specialized high power connector 230 than would otherwise be possible within the limitations of the inverter 266 or the AC mains line with a circuit limitation, e.g., a circuit breaker. The specialized connector 230 may be configured to restrict the DC power supply for a line of power tools specifically configured to operate with the carrier 200 in this mode.

The carrier 200 may also provide "hybrid" power to the power output connector 218. More specifically, if the carrier 200 is connected to an AC power supply, for example an AC mains line, and the carrier 200 has three battery packs 300a, 300b, 300c in the receptacles 208a 208b, 208c, the carrier 200 can rectify the AC power supply input and combine that rectified AC power with the DC power supply from the battery packs 300a and/or 300b and/or 300c to provide the combined power to an external power tool or other electrical device. This hybrid output power has the benefit that it may exceed the current limitations of the AC mains line, e.g., 15 A. Furthermore, the carrier 200 may bypass the inverter 266 thereby providing greater output power than would otherwise be possible due to the practical limitations of the inverter 266. Still further, the runtime of the battery packs 300 would be extended as compared to the runtime if the output power was sourced solely from the battery packs 300, as a substantial portion of the output power is sourced from the AC power supply. Still further, the runtime of the battery packs 300 would be extended by charging the battery packs 300 during periods when a device is not drawing power from the battery packs 300. In addition, in a hybrid-capable group of power tools, identification and other battery pack and tool information may be communicated between the carrier 200 and the power tool through a line cord where digital information is transmitted at the zero crossing of the AC waveform or prior to enabling power delivery to the tool.

In conventional cordless power tool systems, which include a cordless power tool, a battery pack and a battery pack charger, the power tool includes an interface for mating and coupling with the battery pack and the battery pack includes a corresponding interface for mating and coupling with the power tool. The charger also includes an interface, very similar to the interface of the power tool, for mating and coupling with the battery pack. Each of the interfaces includes a terminal block assembly. The terminal block assembly includes a terminal block and a plurality of terminals housed in the terminal block. The battery pack terminal block and terminals are configured to mate and couple with the power tool terminal block and terminals and the charger terminal block and terminals. The terminals of the battery pack, power tool and charger include a subset of terminals for transferring power and a subset of terminals for transferring signals. In the conventional system, when the battery pack is coupled to the tool and the tool is discharging it is not uncommon for relatively high currents to pass through the power terminals. As such, the tool power terminals are typically made of a more substantial material and/or are more robust. When the battery pack is coupled to the charger, the currents being transferred between the charger and the pack are relatively low and as such, the power terminals of the charger can be relatively less substantial and/or less robust.

Referring to FIGS. 42-45, in the case of a portable power supply 10' or carrier 200 of the present disclosure, the power supply includes an interface for mating and coupling with the battery packs 18, 300 that are also configured to mate with cordless power tools 28. The power supply interface includes a terminal block assembly 255 including a terminal block 256 and a plurality of terminals 270. The plurality of terminals 270 include a subset of terminals for providing power 270a and a subset of terminals for providing signal 270b. The power terminals 270a include a positive terminal 270a+ and a negative terminal 270a−. In portable power supplies that receive and utilize battery packs to provide discharge power to corded tools connected to the power supply and also include a charging circuit for charging the battery packs, the power terminals 270a must be designed and configured for transferring charging power and transferring discharging power.

Figure 42:
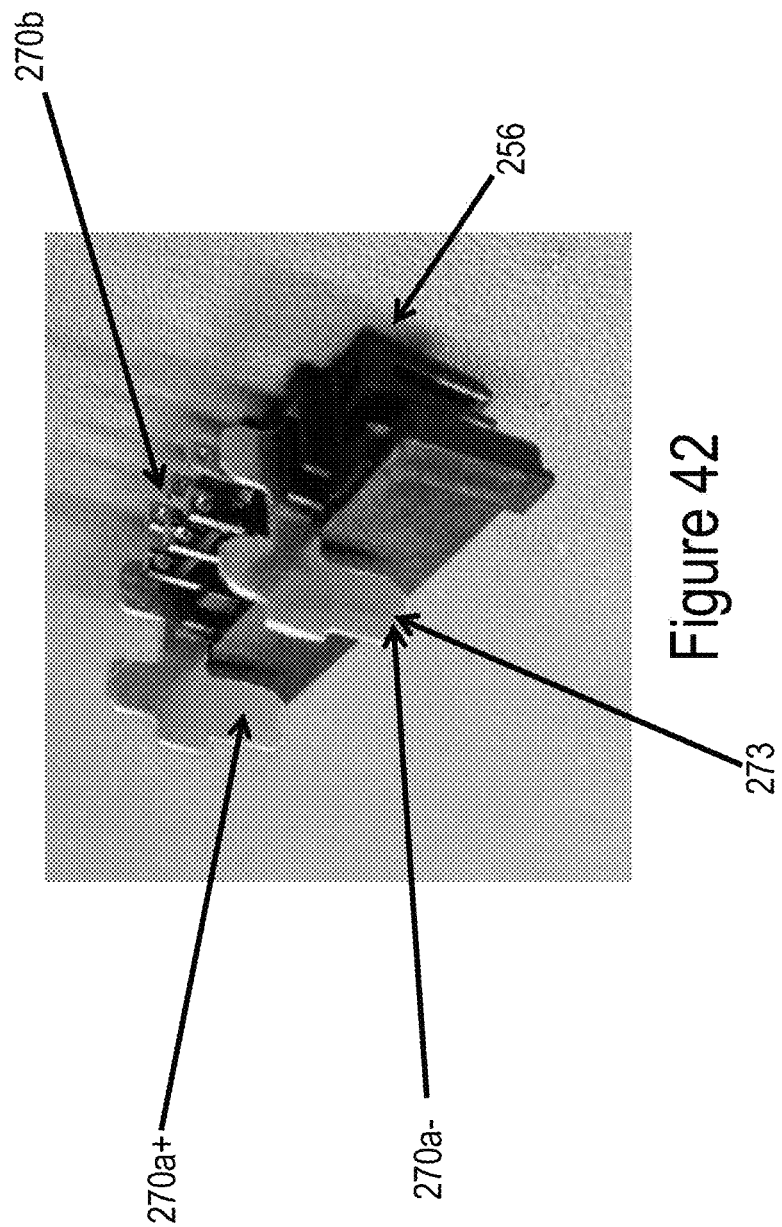
FIG. 42 is an exemplary embodiment of a terminal block and a set of terminals of the present invention.
Figure 43:
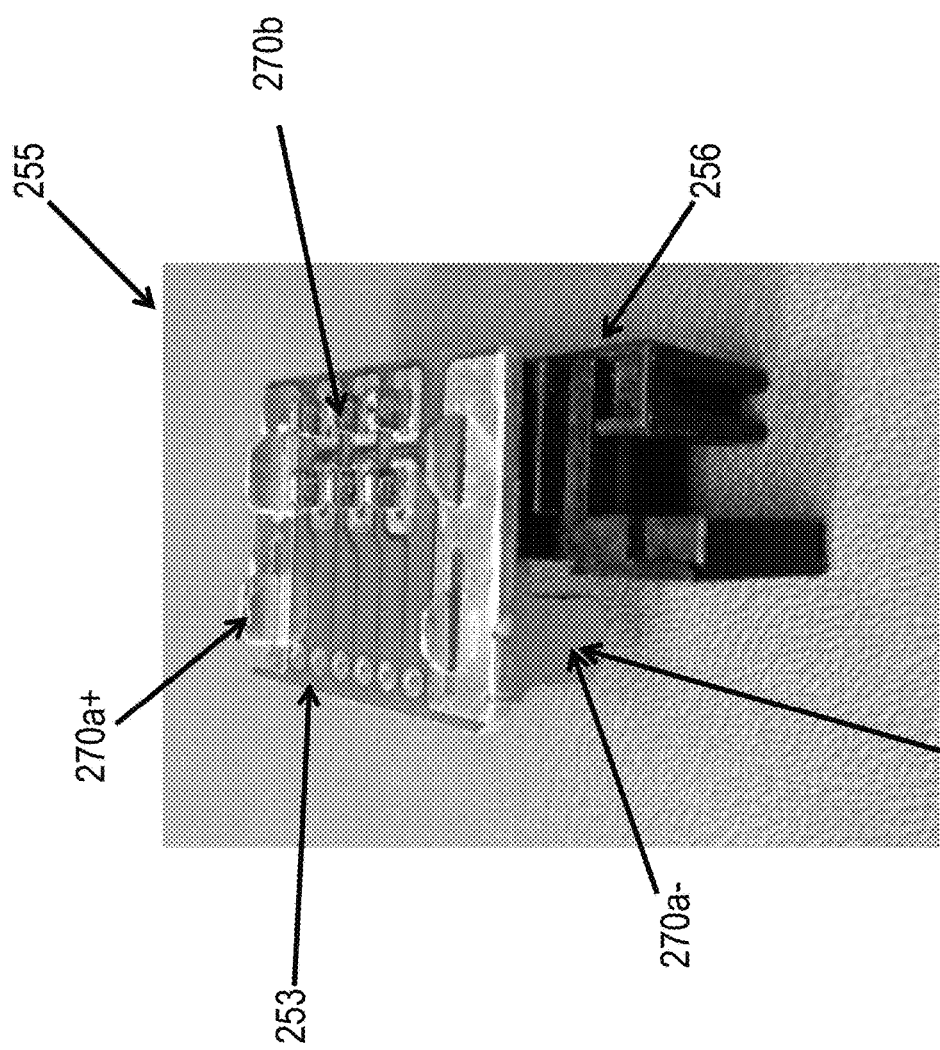
FIG. 43 is an exemplary embodiment of a terminal block assembly of the present invention.
Figure 44:
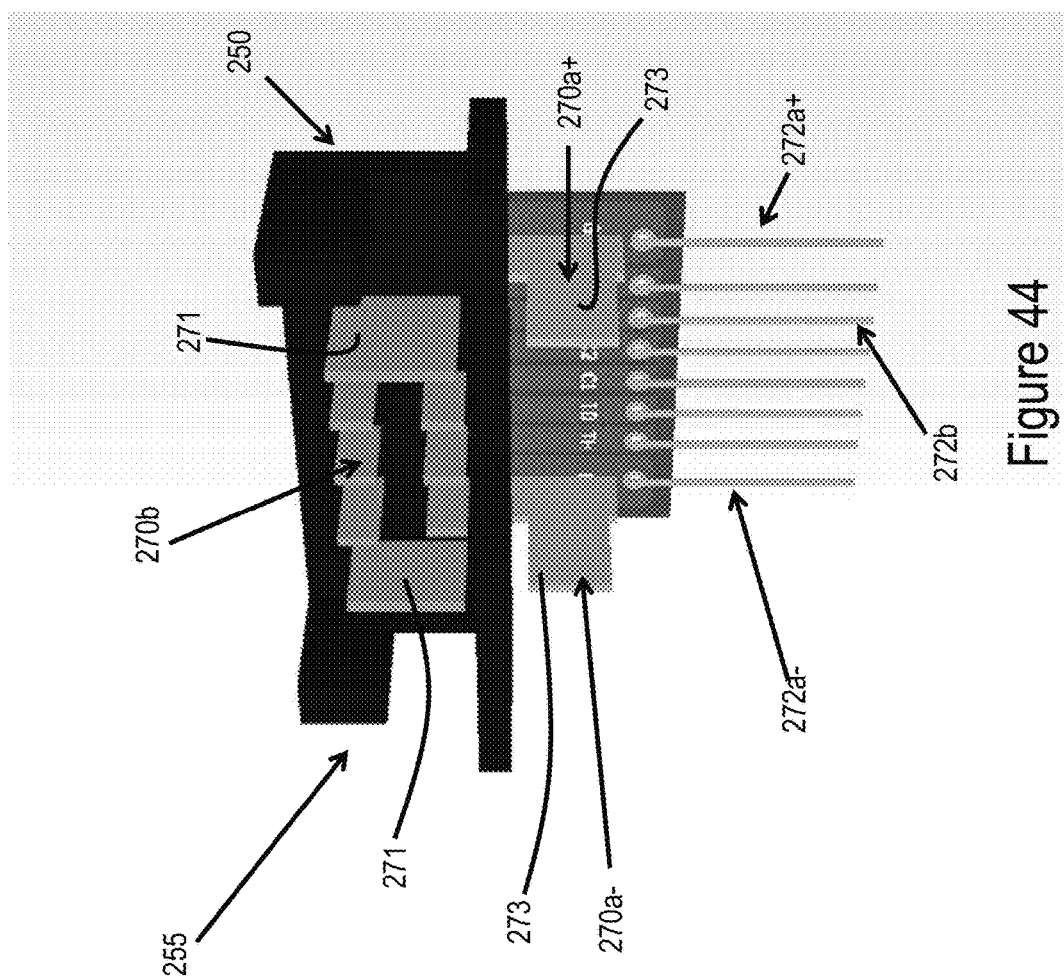
FIG. 44 is an exemplary embodiment of a terminal block assembly of the present invention.

Referring to FIGS. 42-44, there is illustrated a terminal block assembly 255. The terminal block assembly 255 includes a set of power terminals 270a+, 270a− that are held by the terminal block 256. The power terminals 270a include an interior portion 271 positioned within the terminal block and that mates with the battery pack power terminals and an exterior portion 273 that extends outside the terminal block 256. The terminal block assembly 255 also includes a terminal block PCB 253 coupled to the terminal block 256, the power terminals 270a and the signal terminals 270b. The terminal block assembly 255 also includes a plurality of connections, for example wires, 272 that connect the terminal block PCB 253 to the charge control PCB 250. The connections 272 include a first subset of connections for providing charging power to the terminal block assembly 272a+, 272a− and a second subset of connections for transferring signals 272b between the terminal block assembly 255 and the charge control PCB 250. The charging power connections 272a+, 272a− are coupled to the power terminals 270a+, 270a−, respectively.

Figure 45:
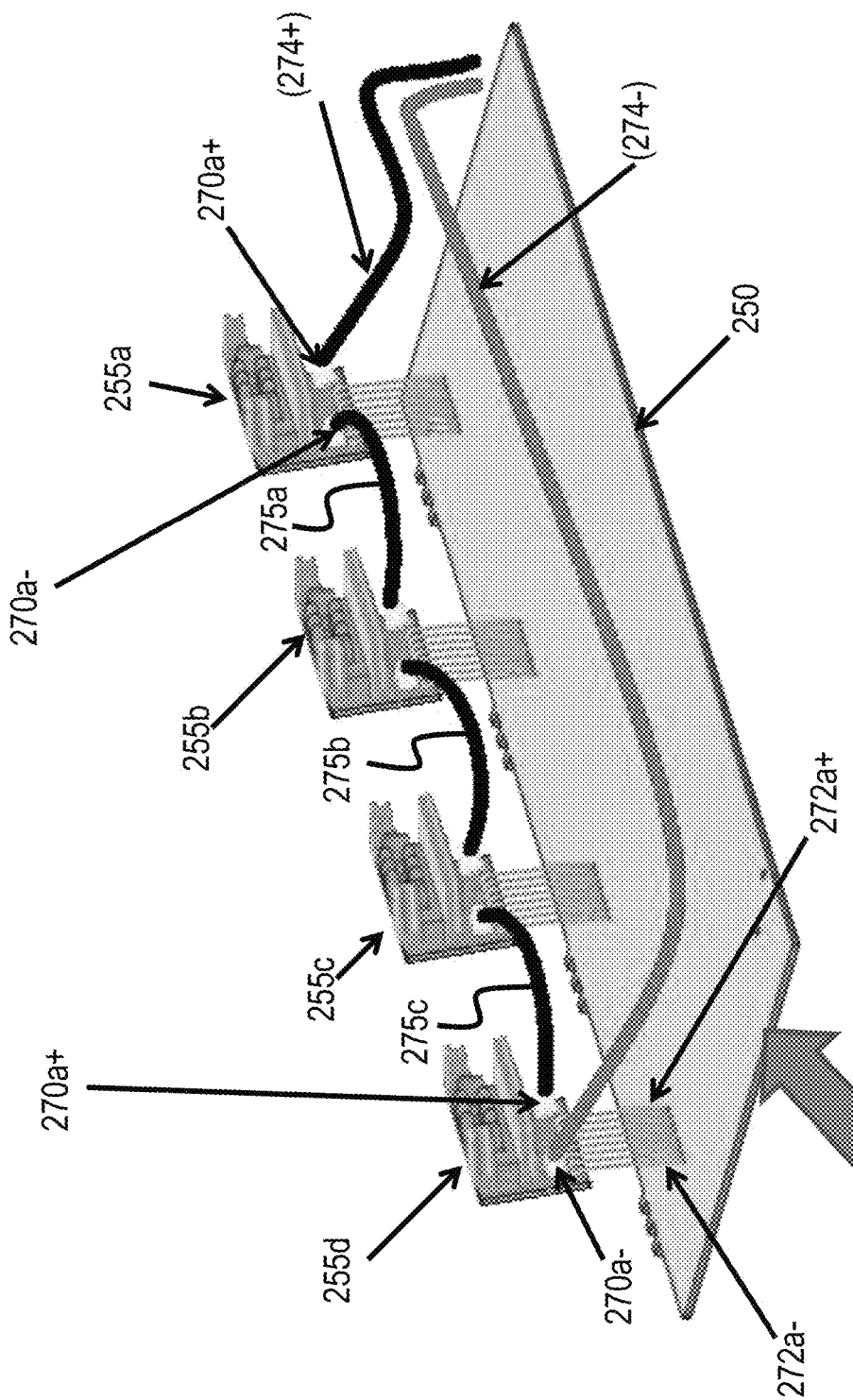
FIG. 45 is an exemplary embodiment of a set of a terminal block assemblies coupled to a charge control printed circuit board.

Referring to FIG. 45, the terminal block assembly 255 is coupled to the charge control PCB 250 by the connections 272. As illustrated in FIG. 45, there are four terminal block assemblies 255 coupled to the charge control PCB 250. In alternate embodiments, there may be more or less terminal block assemblies 255 coupled to the charge control PCB 250. Also illustrated in FIG. 45 is a set of wires for discharge 274 that connect the terminal block assemblies 255 in series. The discharge wires 274 are coupled to the output 218 for providing discharge power to a coupled corded power tool 28. As is illustrated in FIG. 45, the positive power supply discharge connection 274+ is coupled to the exterior portion 273 of the positive power terminal 270a+ of the first terminal block assembly 255a. There is a first interconnection wire 275a connecting the exterior portion 273 of the negative power terminal 270a− of the first terminal block assembly 255a to the exterior portion 273 of the positive power terminal 270a+ of the second terminal block assembly 255b. There is a second interconnection wire 275b connecting the exterior portion 273 of the negative power terminal 270a− of the second terminal block assembly 255b to the exterior portion 273 of the positive power terminal 270a+ of the third terminal block assembly 255c. There is a third interconnection wire 275c connecting the exterior portion 273 of the negative power terminal 270a− of the third terminal block assembly 255c to the exterior portion 273 of the positive power terminal 270a+ of the fourth terminal block assembly 255d. The negative power supply discharge connection 274− is coupled to the exterior portion 273 of the negative power terminal 270a− of the fourth terminal block assembly 255d.

The configuration described with regard to FIGS. 42-45 enables the portable power supply 10', 200 to charge the plurality of battery packs 18, 300 using a charging current supply 260 in parallel via the charge control PCB 250 and the terminal block PCB 253 and discharge the battery packs 18, 300 in series through an economical and robust terminal block assembly.

Figure 46:
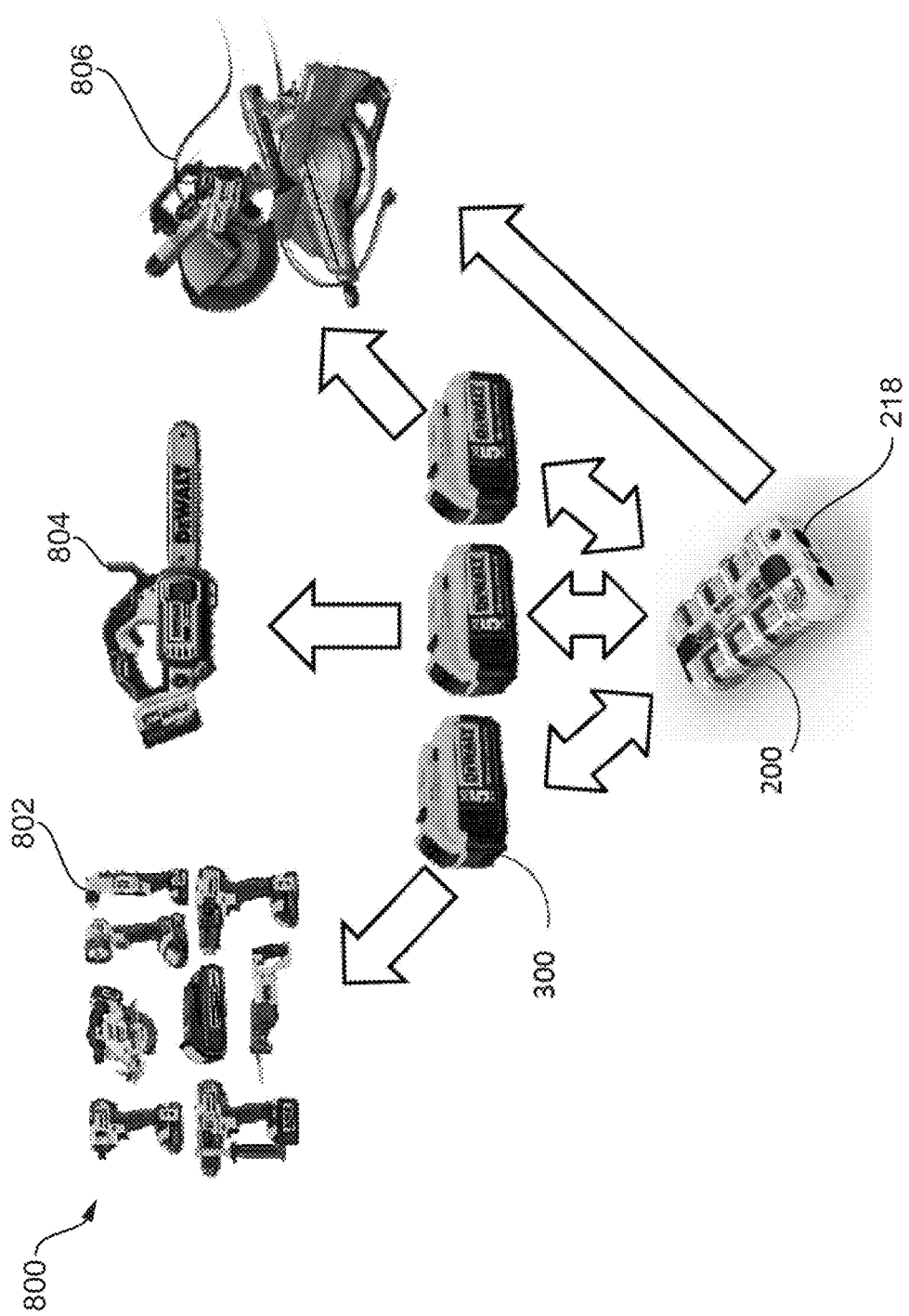
FIG. 46 is an exemplary illustration of a relationship between a carrier, battery packs and power tools of the present invention.

FIGS. 46-56 illustrate relationships between the carriers 200, the battery packs 300 and a variety of power tools and other electrical devices. FIG. 46 pictorially illustrates that the carrier 200 may be used to store and charge a plurality of the battery packs 300. In addition, the battery packs may be used to power a variety of power tools 800 including a set of low rated voltage DC power tools 802 (e.g., under 40V, such as 4V, 8V, 12V, 18V, 20V, 24V and/or 36V), a set of medium rated voltage DC power tools 804 (e.g., 40V to 80V, such as 40V, 54V, 60V, 72V, and/or 80V), and a set of high rated voltage DC-only or AC/DC power tools 806 (e.g., 100V to 240V, such as 100V, 110V, 120V, 220V, 230V and/or 240V). In one embodiment, the battery packs 300 may include one or more convertible battery packs, each of which may be converted between (1) a first rated voltage and a first rated capacity and (2) a second rated voltage and a second rated capacity that are different than the first rated voltage and the first rated capacity. For example, a convertible battery pack may be convertible between a low rated voltage that corresponds to the low rated voltage power tools 802 and a medium rated voltage that corresponds to the medium rated voltage power tools 804. In this case, a convertible battery pack 300 in its low rated voltage configuration can power a low rated voltage power tool 802, a convertible battery pack 300 in its medium rated voltage configuration can power a medium rated voltage power tool 804, and a pair of convertible battery packs 300 in their medium rated voltage configuration can together power a high rated voltage power tool 806. For example, the battery packs 300 may be convertible between a 20V rated voltage and a 60V rated voltage so that one battery pack can power a 20V low rated voltage power tool 802 when the battery pack 300 is in its 20V configuration and can power a 60V medium rated voltage power tool when the battery pack is in its 60V configuration, and a pair of the battery packs 300 in their 60V configuration can power a 120V high rated voltage power tool. In addition, if the high rated voltage power tool 804 is an AC/DC power tool that can be alternatively powered by an AC input, the AC/DC high rated voltage power tool 804 can be powered by connecting an AC cord between the AC power output connector 218 of the carrier 200 and an AC input of the AC/DC high rated voltage power tool 804. Further details about using convertible battery packs to power a system of low, medium, and high rated voltage power tools can be found in the aforementioned provisional U.S. Patent Application Nos. 61/944,953 filed May 18, 2014, 62/000,112 filed May 19, 2014 and 62/046,546 filed Sep. 5, 2014, and in U.S. patent application Ser. No. 14/715,258, filed May 18, 2015, each of which is incorporated herein by reference.

Figure 47:
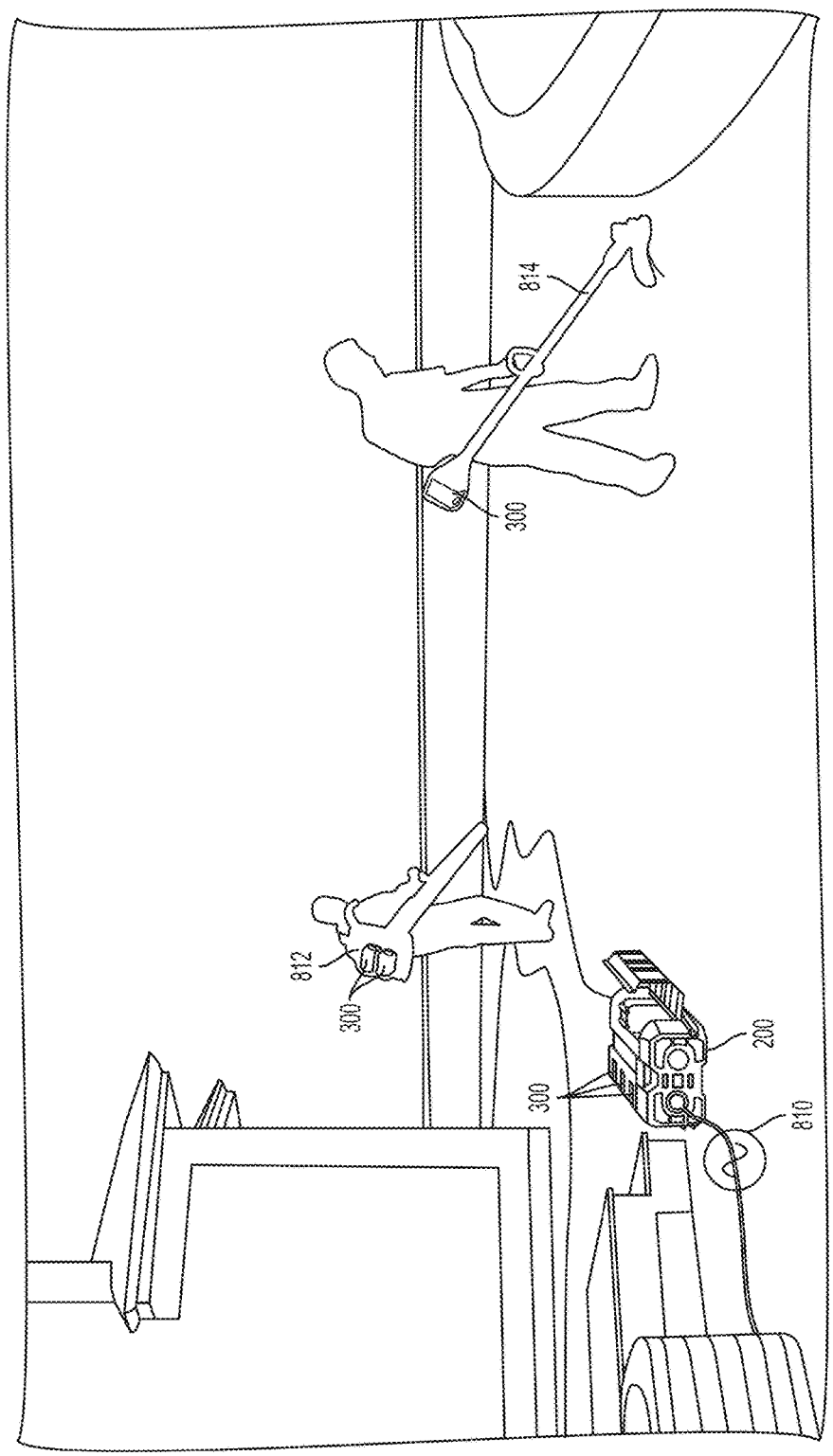
FIG. 47 is another exemplary illustration of a relationship between a carrier, battery packs and power tools of the present invention.

FIG. 47 pictorially illustrates an exemplary embodiment of a carrier 200, battery packs 300, and power tools 800 in use. In this embodiment, three battery packs 300 are stored and being charged in the carrier 200 by an AC power supply 810. In the meantime, two battery packs 300 are being used to power a first cordless power tool 812 having a first rated voltage (e.g., a 60V or 120V blower) and one battery pack 300 is being used to power a second cordless power tool 814 having a second rated voltage (e.g., a 20V or 40V string trimmer).

Figure 48:
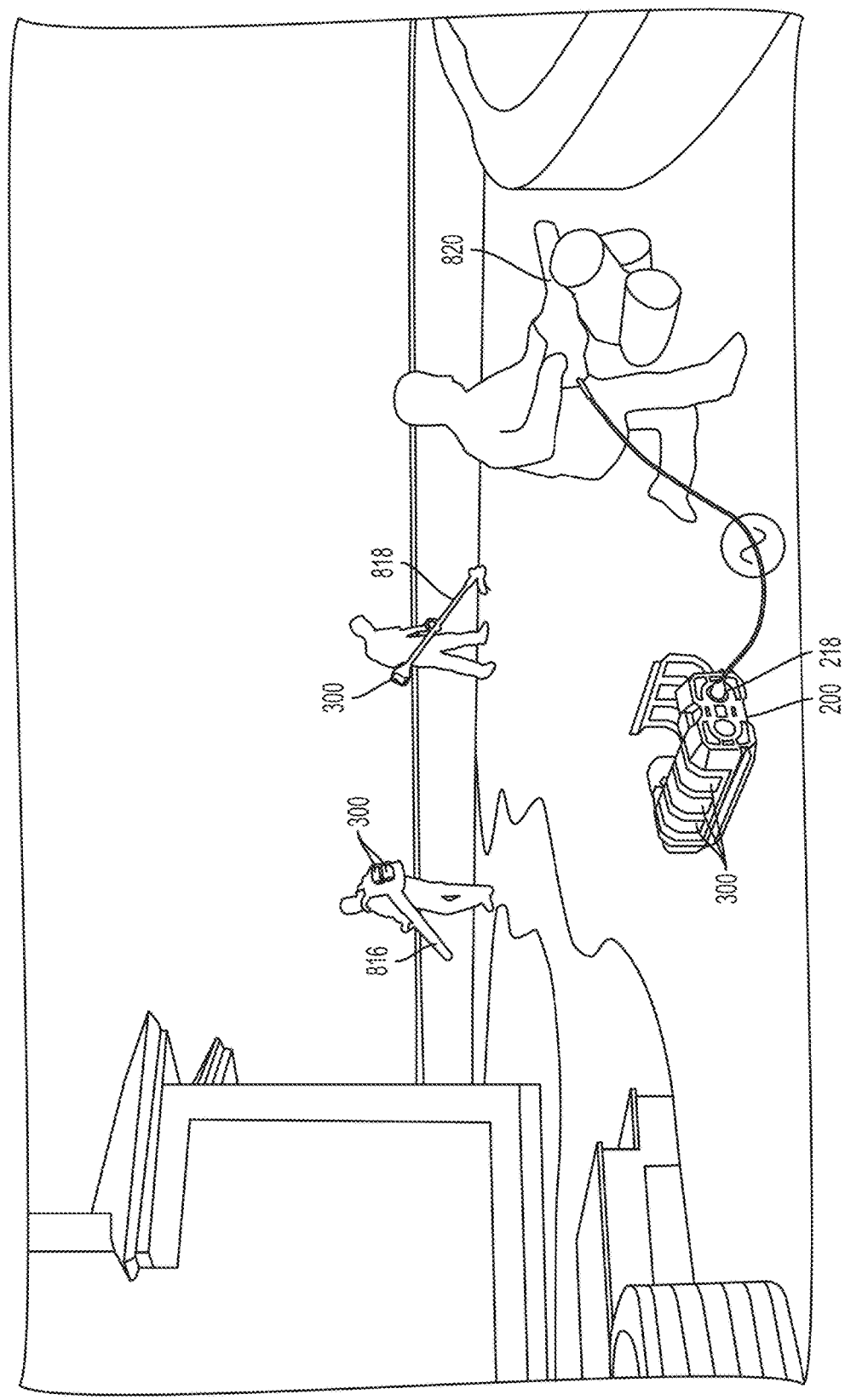
FIG. 48 is another exemplary illustration of a relationship between a carrier, battery packs and power tools of the present invention.

In another embodiment pictorially illustrated in FIG. 48 one battery pack 300 is being used to power a first cordless power tool 816 having a first rated voltage (e.g., a 20V or 40V string trimmer), and two battery packs 300 are being used to power a second cordless power tool 816 having a second rated voltage (e.g., a 60V or 120V blower). Meanwhile, three battery packs stored in the carrier 200 are being used to power an AC-only corded power tool 820 (e.g., an AC chain saw) via a cord connected to the AC power output connector 218 of the carrier.

Figure 49:
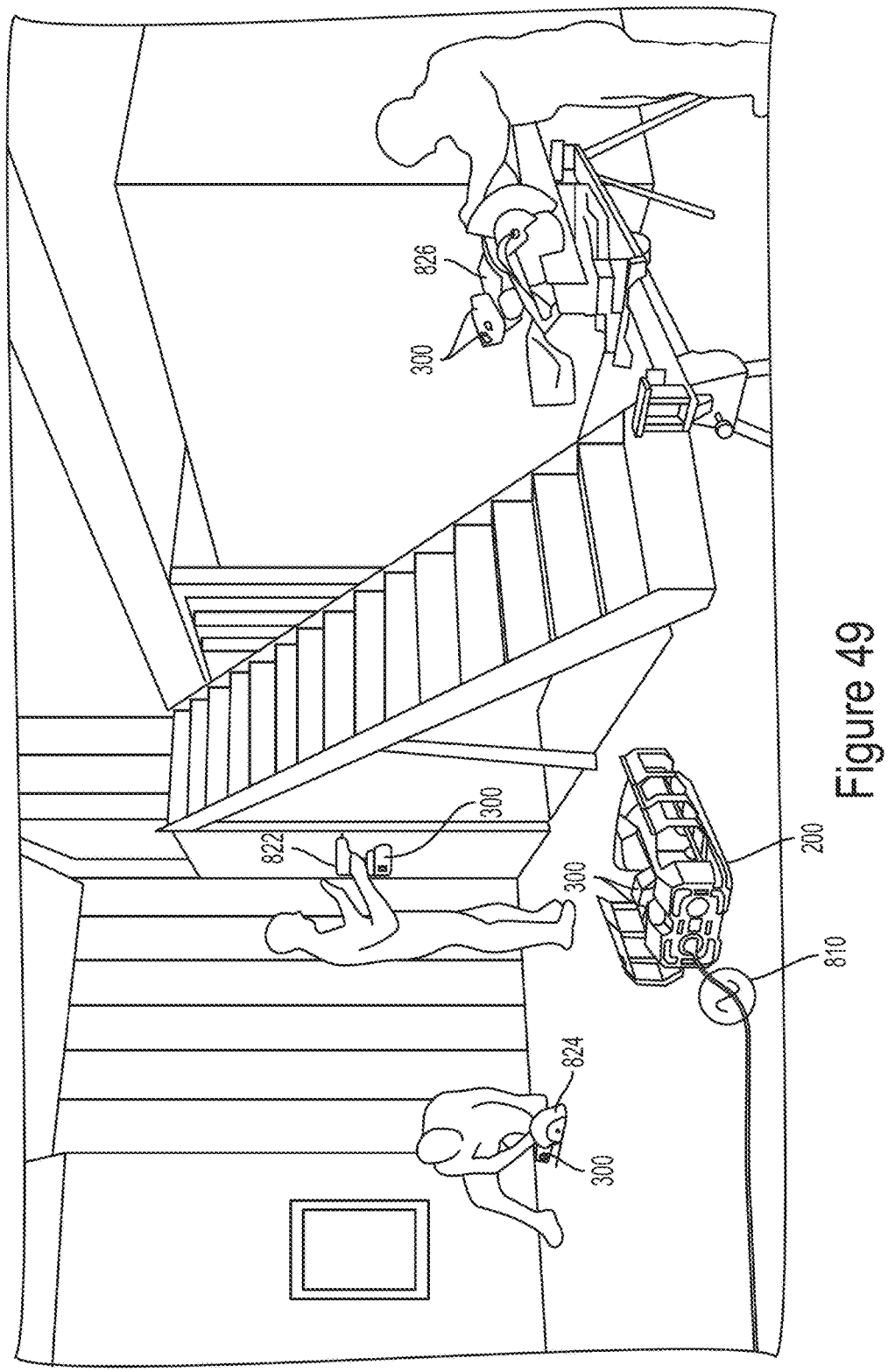
FIG. 49 is another exemplary illustration of a relationship between a carrier, battery packs and power tools of the present invention.

In another embodiment pictorially illustrated in FIG. 49 one convertible battery pack 300 is being used to power a first cordless power tool 822 having a low rated voltage (e.g., a 20V circular saw), one convertible battery pack 300 is being used to power a second cordless power tool 824 having a medium rated voltage (e.g., a 60V circular saw), and two convertible battery packs 300 are being used to power a third cordless or AC/DC power tool 826 having a high rated voltage (e.g., a 120V miter saw). Meanwhile, two battery packs 300 are stored and being charged in the carrier 200 by an AC power supply.

Figure 50:
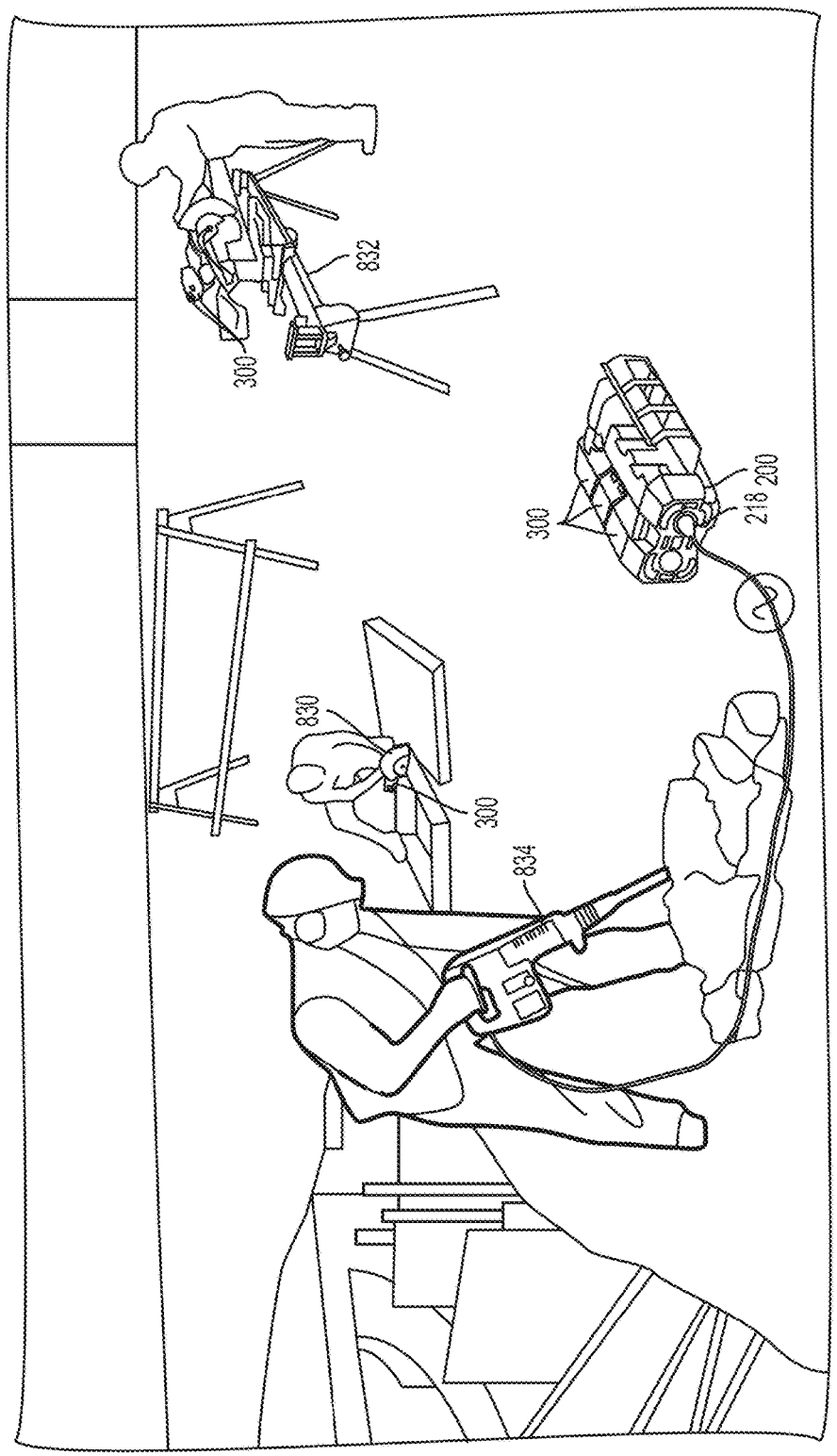
FIG. 50 is another exemplary illustration of a relationship between a carrier, battery packs and power tools of the present invention.

In another embodiment pictorially illustrated in FIG. 50 one battery pack 300 is being used to power a first cordless power tool 830 having a first rated voltage (e.g., a 60V circular saw), and two battery packs 300 is being used to power a second cordless or AC/DC power tool 832 having a second rated voltage (e.g., a 120V miter saw). Meanwhile, three battery packs stored in the carrier 200 are being used to power an AC-only corded power tool 834 (e.g., an AC hammer) via a cord connected to the AC power output connector 218 of the carrier 200.

Figure 51:
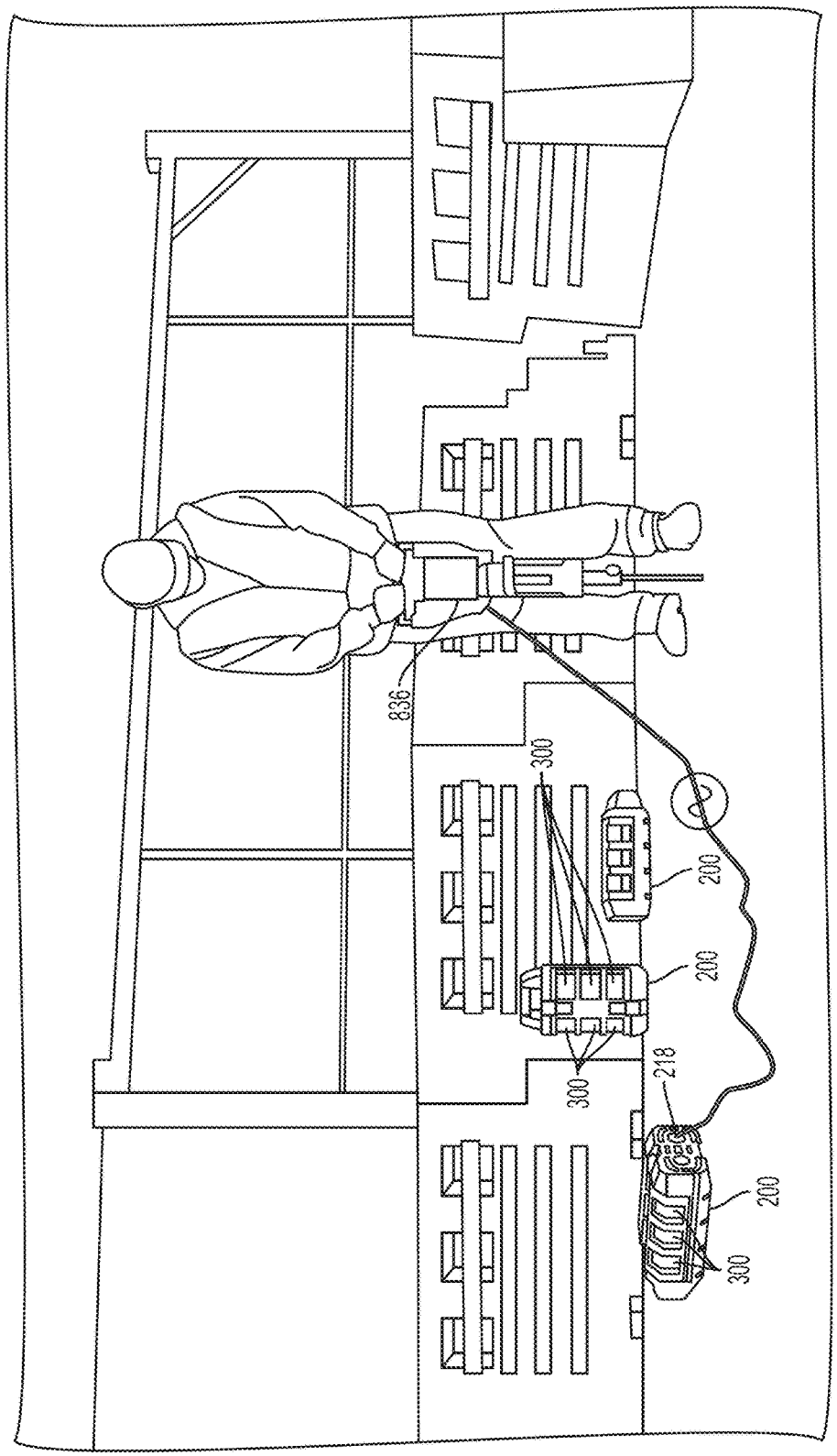
FIG. 51 is another exemplary illustration of a relationship between a carrier, battery packs and power tools of the present invention.

In another embodiment pictorially illustrated in FIG. 51 a plurality of battery packs 300 in a carrier 200 are being used to power a high powered AC tool 836 (e.g., a 120V or 180V jackhammer) via a cord connected to the AC power output connector 218 of the carrier 200. In the meantime, other carriers 200 containing additional battery packs 300 await use. This enables a user to power the high powered AC tool for an entire work day.

Figure 52:
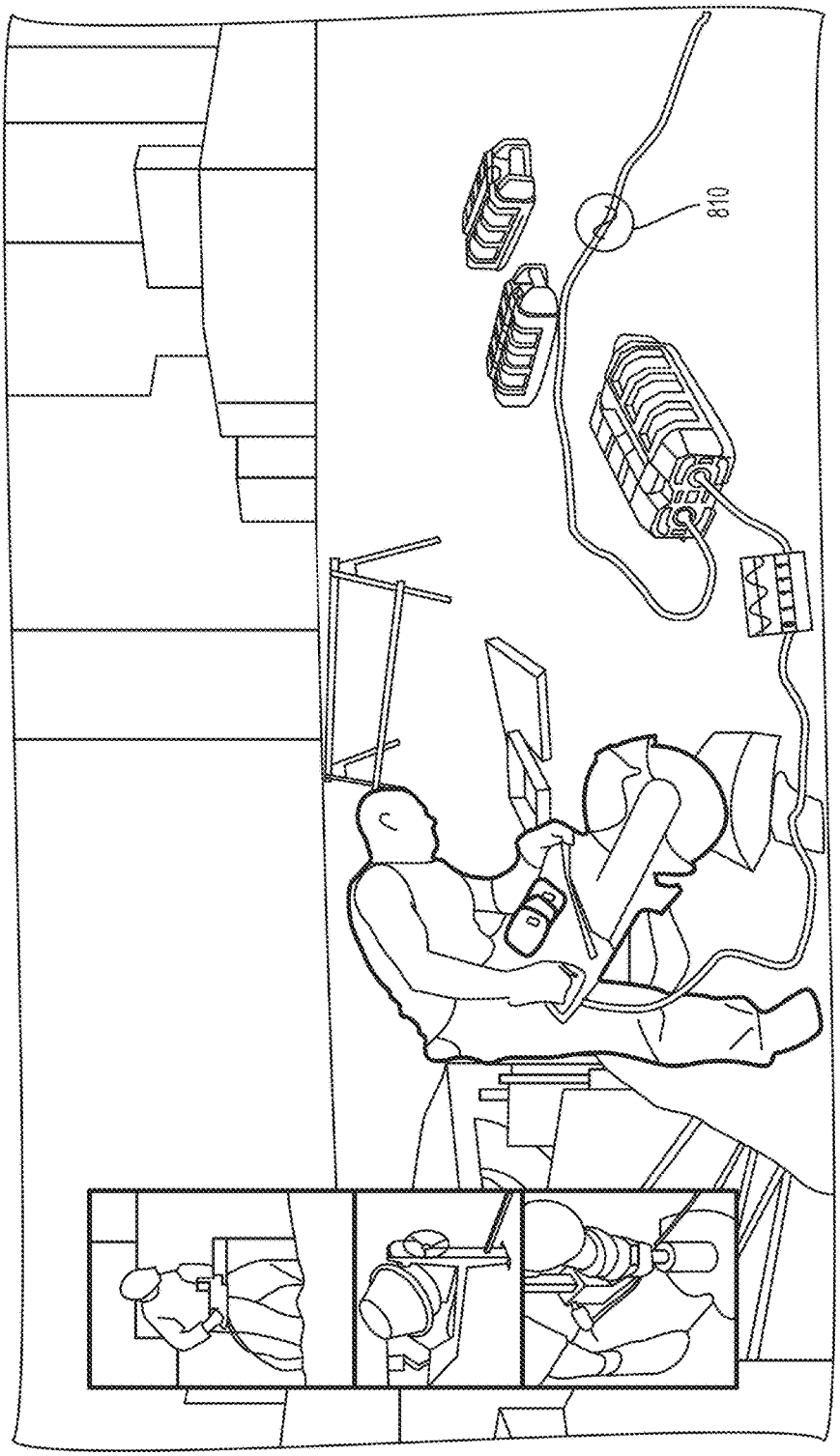
FIG. 52 is another exemplary illustration of a relationship between a carrier, battery packs and power tools of the present invention.

In another embodiment pictorially illustrated in FIG. 52, the carrier 200 provides power from an external AC power supply 810 and power from the battery packs 300. The power may be provided from the AC power supply 8109 and the battery packs 300 simultaneously or alternatively, as described in more detail above.

Figure 53:
FIG. 53 is an exemplary illustration of a rental return warning system of a carrier of the present invention.

In another embodiment pictorially illustrated in FIG. 53, the carrier 200 disables at the end of a predetermined rental period (e.g., three days). An indicator LED 280 on the carrier flashes to notify the user to return the carrier 200 to the kiosk. In addition, an alert is transmitted wirelessly to an app on the user's cell phone or tablet computer 840. Via the cell phone or tablet computer 840, the user may renew the rental period for an additional amount of time (e.g., one more day).

Figure 54:
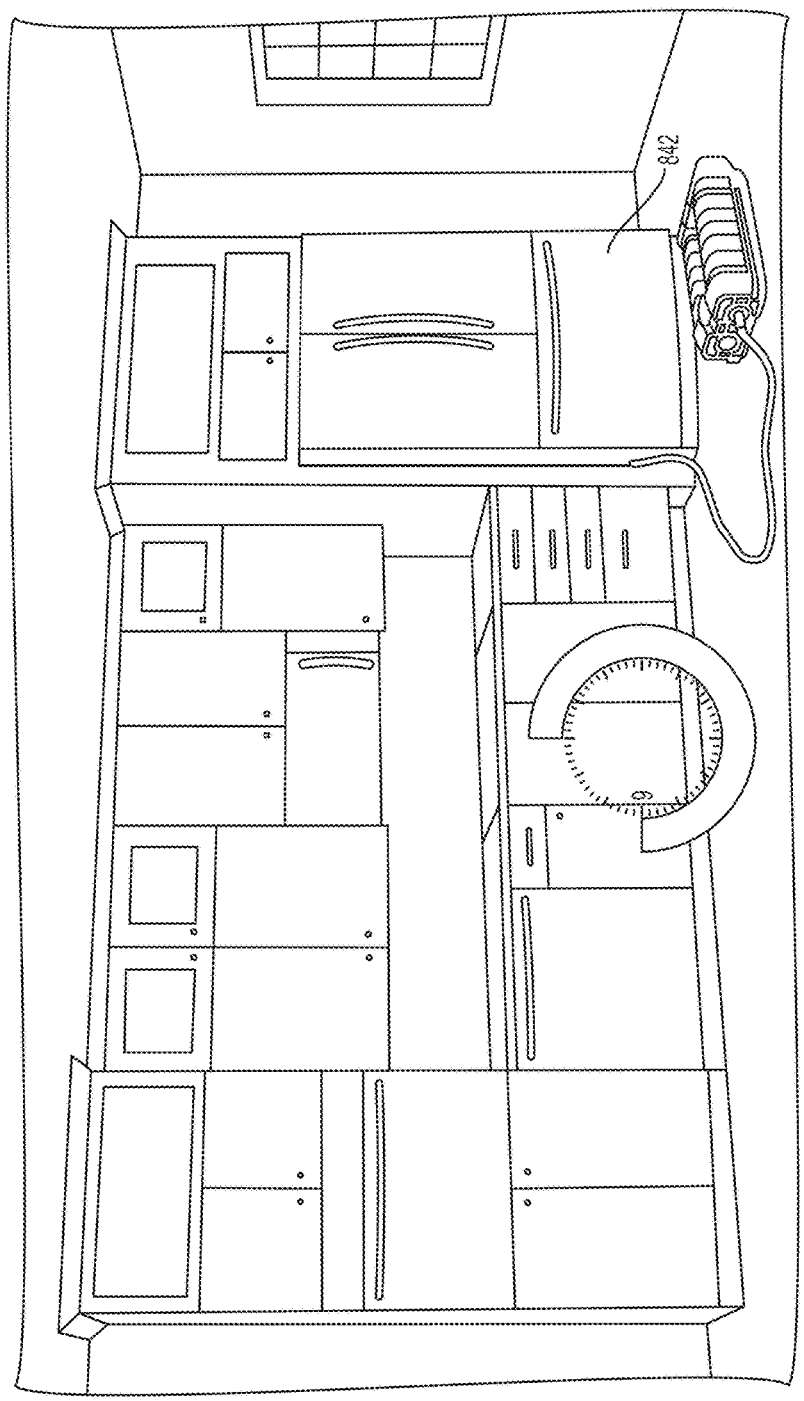
FIG. 54 is an exemplary illustration of a relationship between a carrier, battery packs and electrical devices of the present invention.

In another embodiment pictorially illustrated in FIG. 54, the carrier 200 containing a plurality of battery packs 300 may be used to power an AC electrical device or appliance 842 (e.g., a refrigerator) via a cord connected to the AC power output connector 218.

Figure 55:
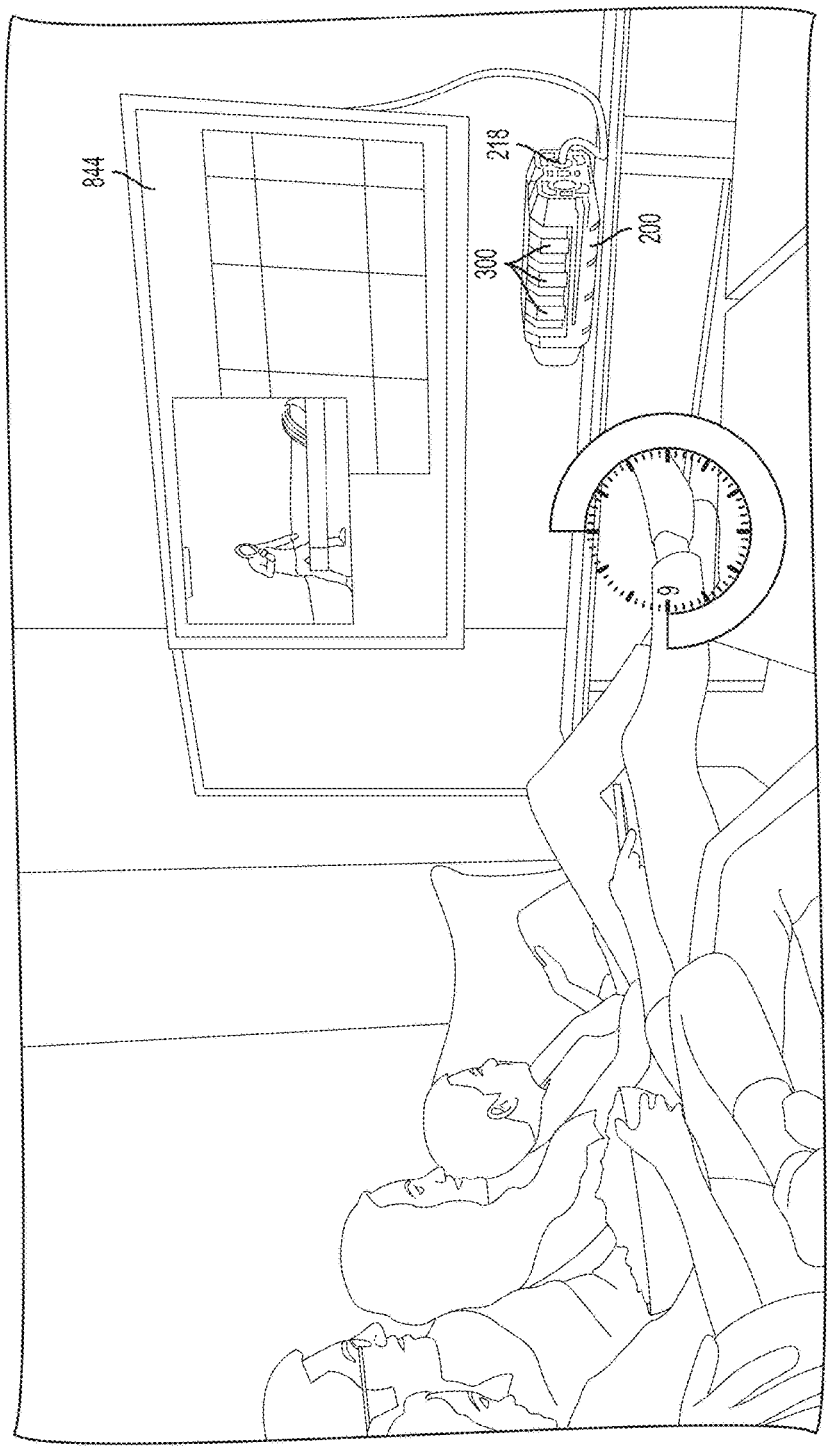
FIG. 55 is another exemplary illustration of a relationship between a carrier, battery packs and electrical devices of the present invention.

In another embodiment pictorially illustrated in FIG. 55, the carrier 200 containing a plurality of battery packs 300 may be used to power an AC electrical device or appliance 844 (e.g., a television) via a cord connected to the AC power output connector 218.

Figure 56:
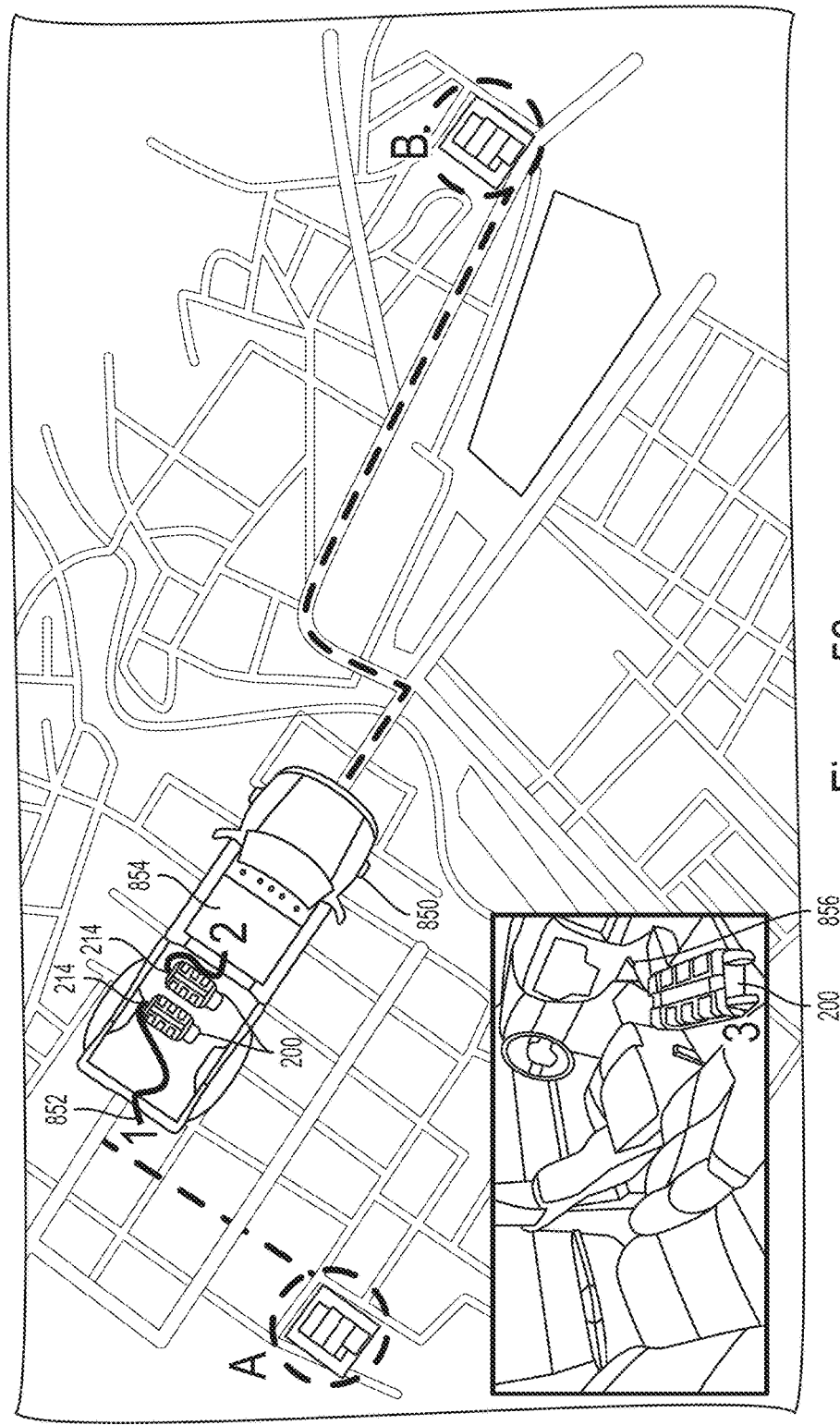
FIG. 56 is an exemplary illustration of various methods for charging battery packs in a carrier of the present invention.

FIG. 56 pictorially illustrates the various ways for a user to charge the battery packs 300 in a carrier 200 while transporting it in a vehicle 850 from a first location A to a second location B. First, the carrier 200 may be used to charge the battery packs 300 by connecting a cord from a trailer adapter port 852 to the universal DC power input connector 214. Second, the carrier 200 may be used to charge the battery packs 300 by connecting a cord from a solar cell array 854 to the universal DC power input connector 214. Third, the carrier 200 may be used to charge the battery packs 300 by connecting a cord from a 12V car charger port 856 to the universal DC power input connector 214.

Figure 57:
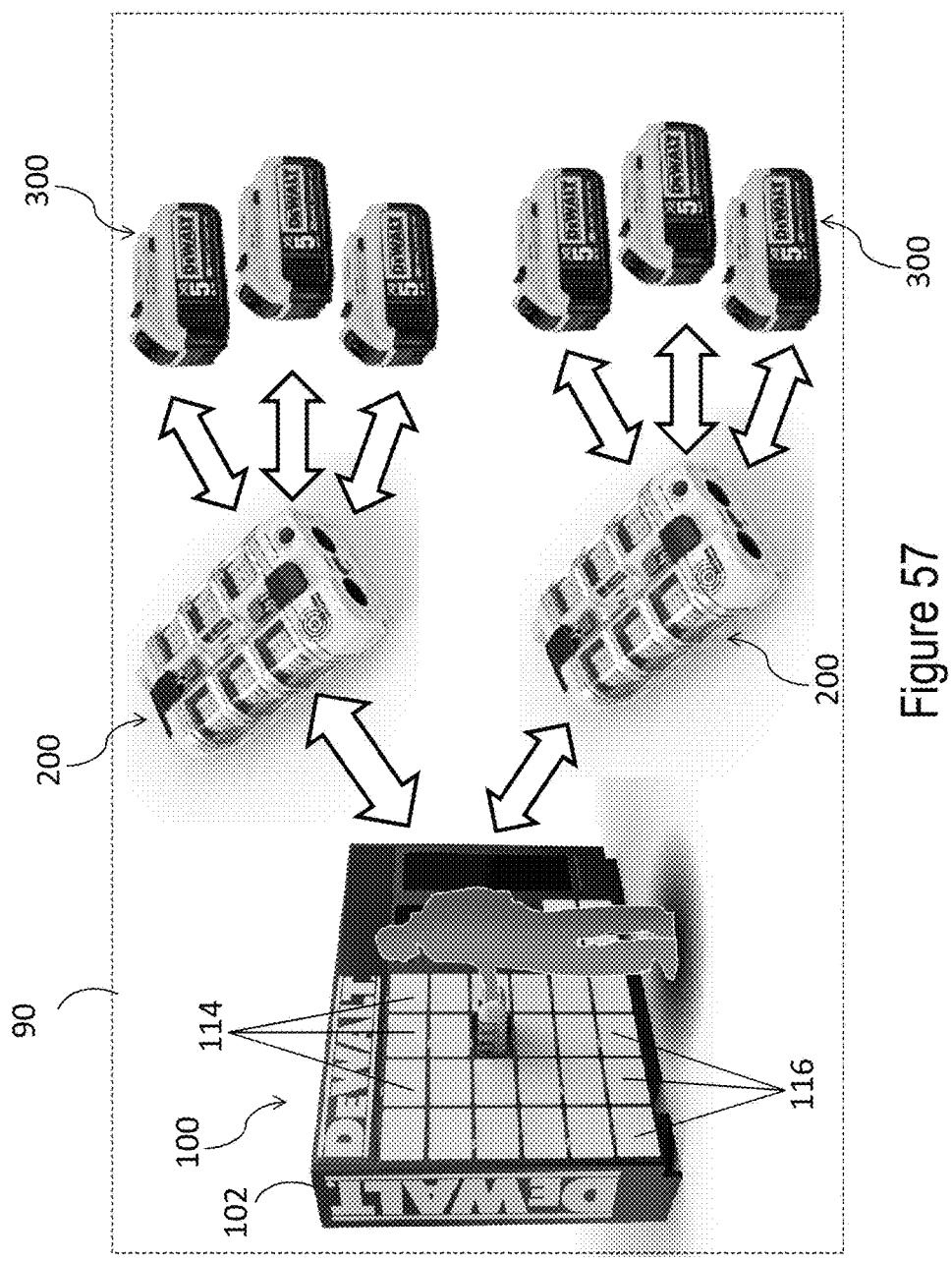
FIG. 57 is an exemplary embodiment of a rental system of the present invention.

Referring to FIG. 57, in an exemplary embodiment, a system 90 for renting, transporting, charging and discharging battery packs (e.g., for power tools and other electrical devices) includes a vending machine or kiosk 100, one or more of the battery pack carriers or trays 200 received in and dispensed by the kiosk 100, and one or more rechargeable, removable battery packs 300 received in each of the carriers 200 or received directly in the kiosk 100 independent of the carriers 200. The carriers 200 may be configured to charge the battery packs 300 inside and/or outside of the kiosk 100 via one or more power inlets, and to enable discharging the battery packs 300 through one or more power outlets. The kiosk 100 may enable receiving, dispensing, and renting the carriers 200 and battery packs 300, and causing the carriers 200 to charge the battery packs 300 when the carriers 200 are received in the kiosk 100.

Figure 58:
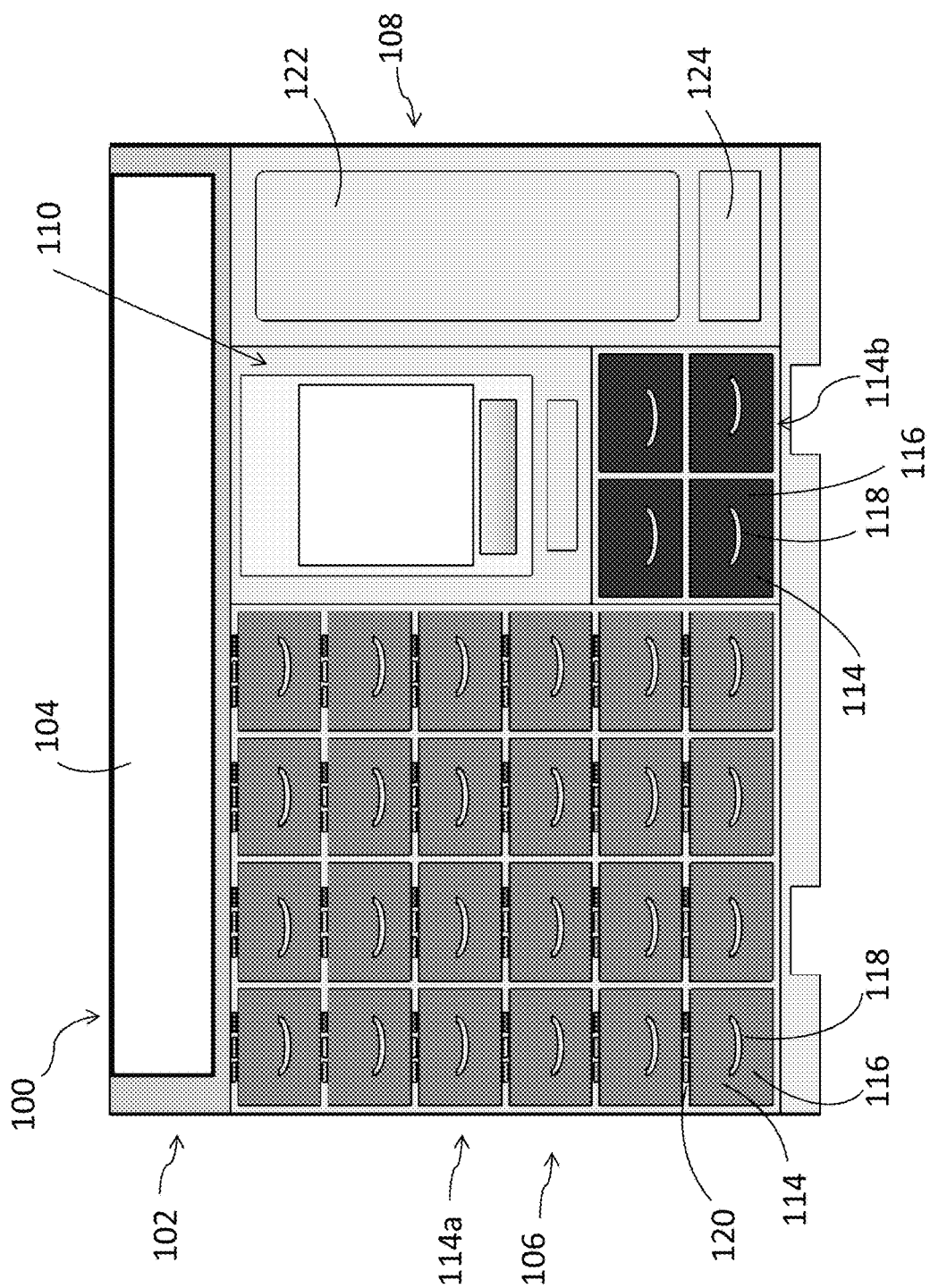
FIG. 58 is an exemplary embodiment of a kiosk of the rental system of FIG. 57.

Referring also to FIG. 58, the kiosk 100 includes a housing 102 with an advertising display area 104, a battery pack rental area 106, a retail vending area 108, and a user interface 110. The advertising display 104 may be a static display (e.g., a static sign) or a dynamic display (e.g., an LCD screen).

The battery pack rental area 106 includes a plurality of bins 114. Each bin 114 is configured to dispense, receive, store, and provide power for charging one of the carriers 200 and the associated battery packs 300. The bins 114 are each closed by a lockable door 116, and may each further include a handle 118. The doors 116 are configured to unlock when a user rents or returns one of the carriers 200.

Figure 59:
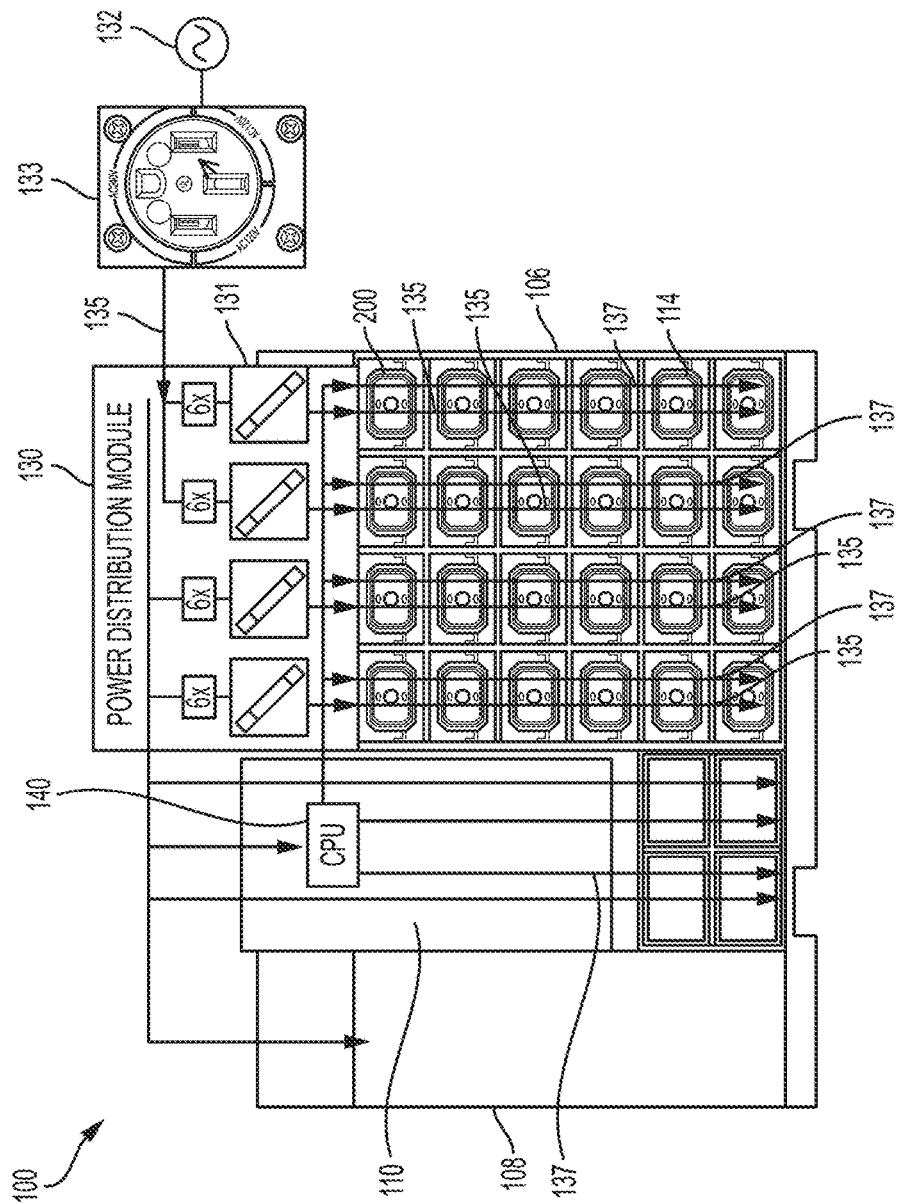
FIG. 59 is an exemplary embodiment of the kiosk of FIG. 58.

Referring to FIG. 59, the power distribution module 130 is coupled to a source of external electrical power 132, e.g., an AC mains line, batteries, solar panels, a generator, etc. via a plug or connector 133. The power distribution module 130 distributes the electrical power to the other areas of the kiosk 100, including to the battery pack rental area 106, the retail vending area 108, the user interface 110, and the advertising display area 104. The power distribution module 130 may include circuits to modify, rectify, transform, divide, modulate, regulate and/or invert the incoming electrical signals for distribution to the various areas of the kiosk 100 by means known to one of ordinary skill in the art. For example, the power distribution module 130 may transform an incoming AC signal to a DC signal to distribute to some of the components. In addition, the power distribution module 130 may include one or more fuses or circuit breakers 131 to prevent overload of the circuits in the various modules of the kiosk 100. The kiosk 100 includes the power supply line 135 coupled to the bin power connector 180 of each bin 114. The bin power connector 180 is configured to electrically and mechanically couple with the carrier AC power input connector 212 when the carrier 200 is received in the bin 114. Also as noted above, the kiosk 100 includes the communications line 137 coupled to the bin communications connector 178. The bin communications connector is configured to electrically and mechanically couple with the carrier communications connector 216 when the carrier 200 is received in the bin 114. As described in greater detail below, when the carrier 200 is received in the bin 114, the communications line 137 and the communications connectors 178, 216 enable communications between the kiosk 100 and the carrier 200 to manage and/or control when and how the power delivered through the power input line 135 is used to charge the battery packs 300.

Alternatively, an exemplary power distribution module is coupled to a 240V, 50 A power source such as an AC mains line 132. The power distribution 130 splits the 240V AC power source into two 120V AC power sources distributed over a power bus or power supply lines. The power distribution module 130 distributes the 120V AC power supply to each bin 114 over a power bus or power supply line 135. The power distribution module 130 may include a fuse 131, for example a 10 A fuse, on the AC power supply line prior to the bins 114. The power distribution module 130 also provides power to the CPU 140. Either the power distribution module 130 or the CPU 140 may include circuitry to convert the 120V AC power supply to the appropriate voltage for the CPU 140, as would be understood by one of ordinary skill in the art.

Also illustrated in FIG. 59 are communication lines 137 between the CPU 140 and each of the bins 114. As noted above, each bin 114 includes a communications connector 178 and as discussed in more detail below, each carrier 200 includes a communications connector that is configured to couple to the bin communications connector 178. These communications connectors allow the CPU 140 to monitor and communicate with the bins 114, the carriers 200 and the batteries 300 to manage receiving, dispensing, and renting the carriers 200 and battery packs 300, and monitoring and/or managing the charging of the battery packs 300 by the carriers 200.

Figure 60A:
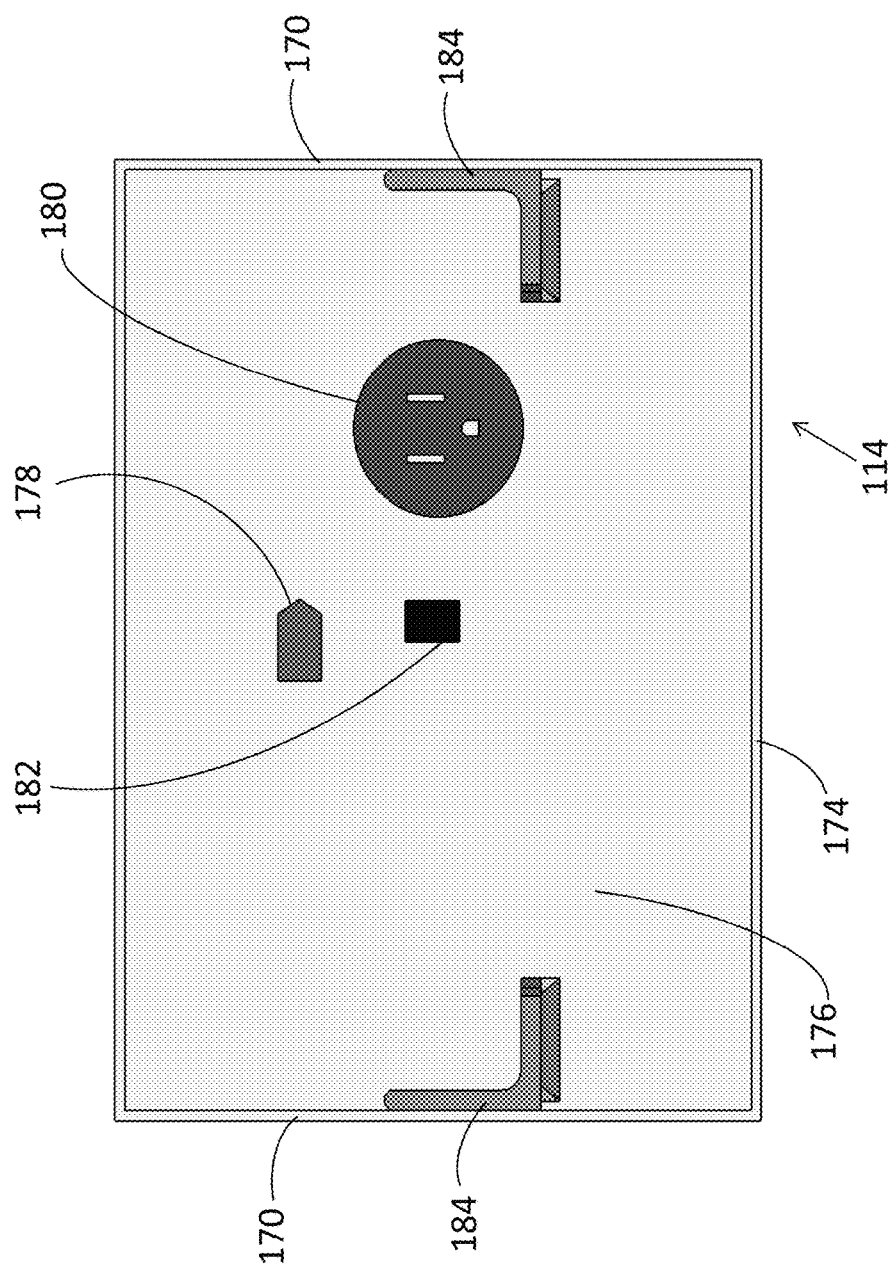
FIG. 60A and FIG. 60B are a front view and a side view of an exemplary embodiment of a bin of the kiosk of FIG. 58.
Figure 60B:
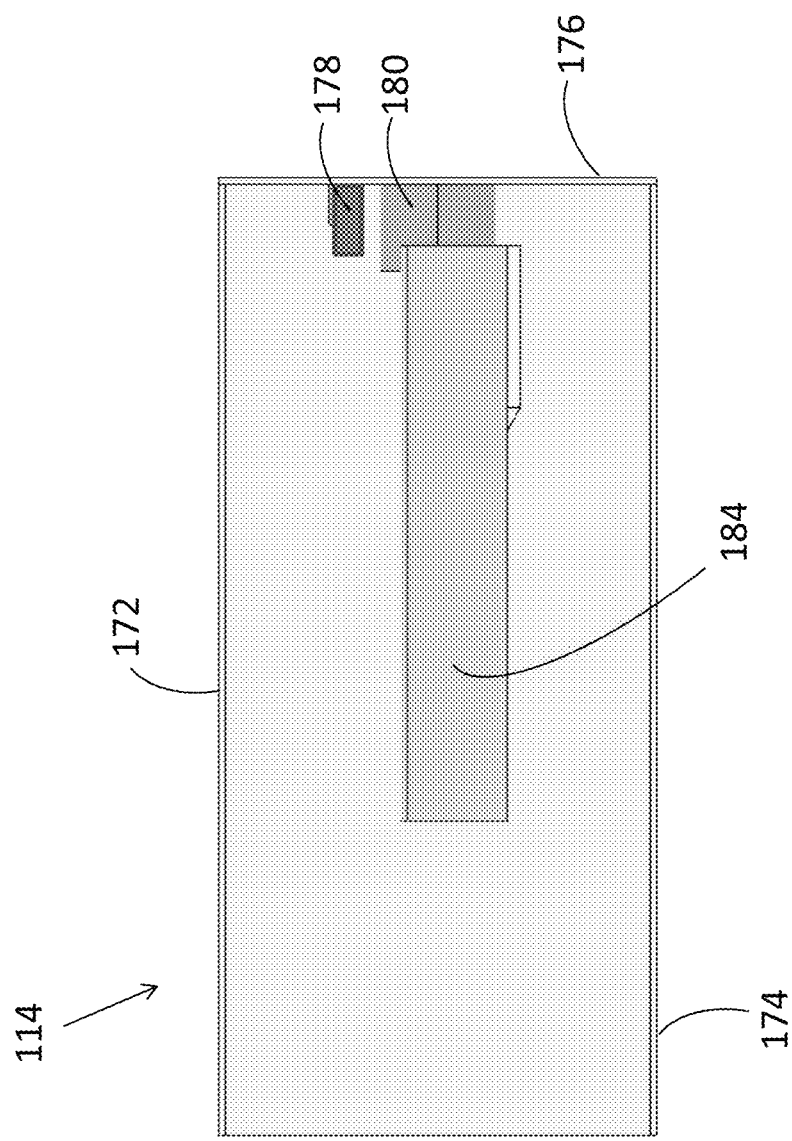

Referring to FIGS. 60A and 60B, an example of an empty bin 114 is illustrated. The bin 114 includes five walls—two opposing sidewalls 170, a top wall 172, a bottom wall 174, and a rear wall 176—and the bin door 116 forming a generally rectangular cavity for receiving, housing and dispensing the carrier 200. Each sidewall includes a longitudinal extending rail 184—providing a pair of rails 184 in each bin 114. The rails 184 will be discussed in more detail below. The rear wall 176 of each bin 114 includes a plurality of connectors. Specifically, the rear wall 176 includes a communication connector 178 for providing communication between the kiosk 100 and the carrier 200 and a power connector 180 for providing power to the carrier 200. The rear wall 176 also includes an extension 182 for toggling a carrier charge/discharge switch into charging mode. These elements correspond to a plurality of corresponding elements in the carrier 200. Specifically, the carrier housing includes sidewalls. Each of the sidewalls includes a longitudinal groove 220. Each carrier housing groove 220 is configured to receive one of the bin sidewall rails 184 when the carrier 200 is received in the bin 114. These grooves 220 and rails 184 insure that the carrier AC power input connector 212, the carrier communications connector 216 and the charge/discharge switch 222 align with the bin power connector 180, the bin communications connector 178, and the bin extension 182, respectively, when the carrier 200 is received in the bin 114. The rails 184 may be adjustable to accommodate various size carriers 200. The rails 184 may serve to keep the carrier 200 raised from the bottom wall 174 to allow air cooling of the carrier 200 when the battery packs 300 are being charged inside the bin 114.

The charge/discharge control modules 252 described above can communicate with the SMU 250 which in turn communicates with the kiosk 100 through a plurality of communication lines 254 connected to the communication connector 216.

Figure 61B:
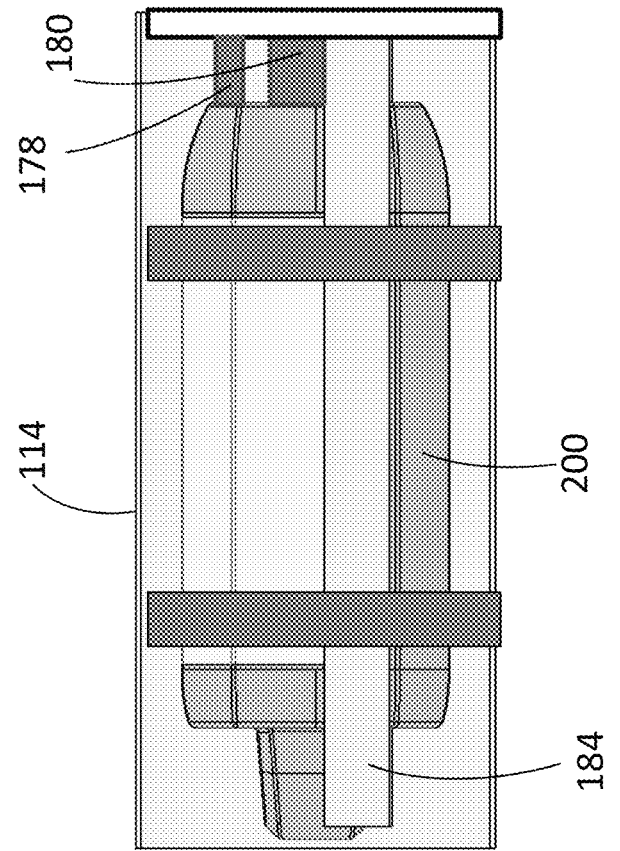
FIGS. 61A and 61B are front view and a side view of an exemplary embodiment of a bin and carrier of the rental system of FIG. 57.
Figure 61A:
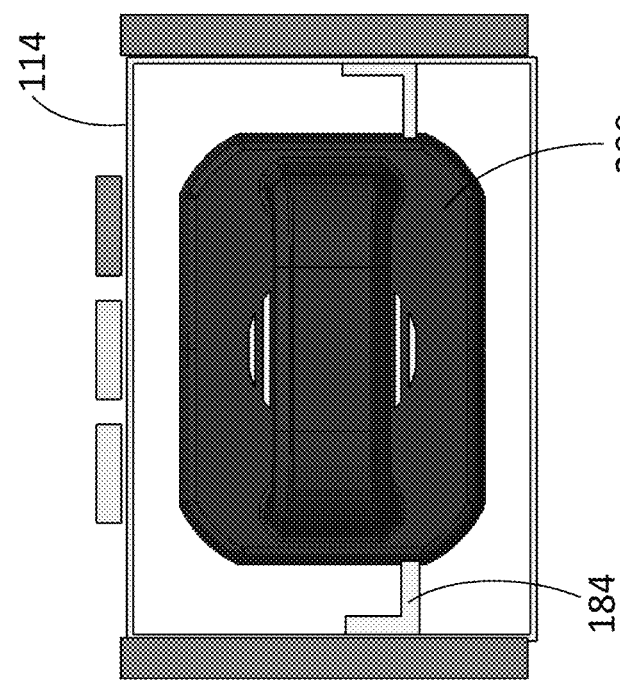

Referring to FIG. 61, there is illustrated a view of the bin 114 from a front side of the kiosk 100 including an exemplary carrier 200. As noted above, the bin 114 includes two sidewalls 170, a top wall 172 and a bottom wall 174. As also noted above, each of the sidewalls includes the rails 184. Also illustrated in FIG. 61 is the bin communications connector 178 coupled to the carrier communications connector 216 and the bin power connector 180 coupled to the carrier AC power input connector 212.

The carrier 200 can communicate with the kiosk 100 through the carrier communication lines 254, the carrier communication connector 216, the bin communication connector 178 and the kiosk communication lines 137 when the carrier 200 is in the kiosk bin 114 for transferring information regarding the status and health of the battery packs 300 and carrier 200, regarding the identification of the battery packs 300, regarding the data logging information associated with the battery packs 300, and for receiving charge instructions from the kiosk 100. When the carrier 200 is received in the bin 114 the kiosk 100 may provide charging power to the carrier 200 through the kiosk power supply lines 135, the bin power connector 180, the carrier AC power input connector 212, the AC power supply 262, and the carrier power supply lines 260. When the carrier 200 is not in the kiosk 100, alternate power sources may provide charging power to the carrier 200.

Figure 62:
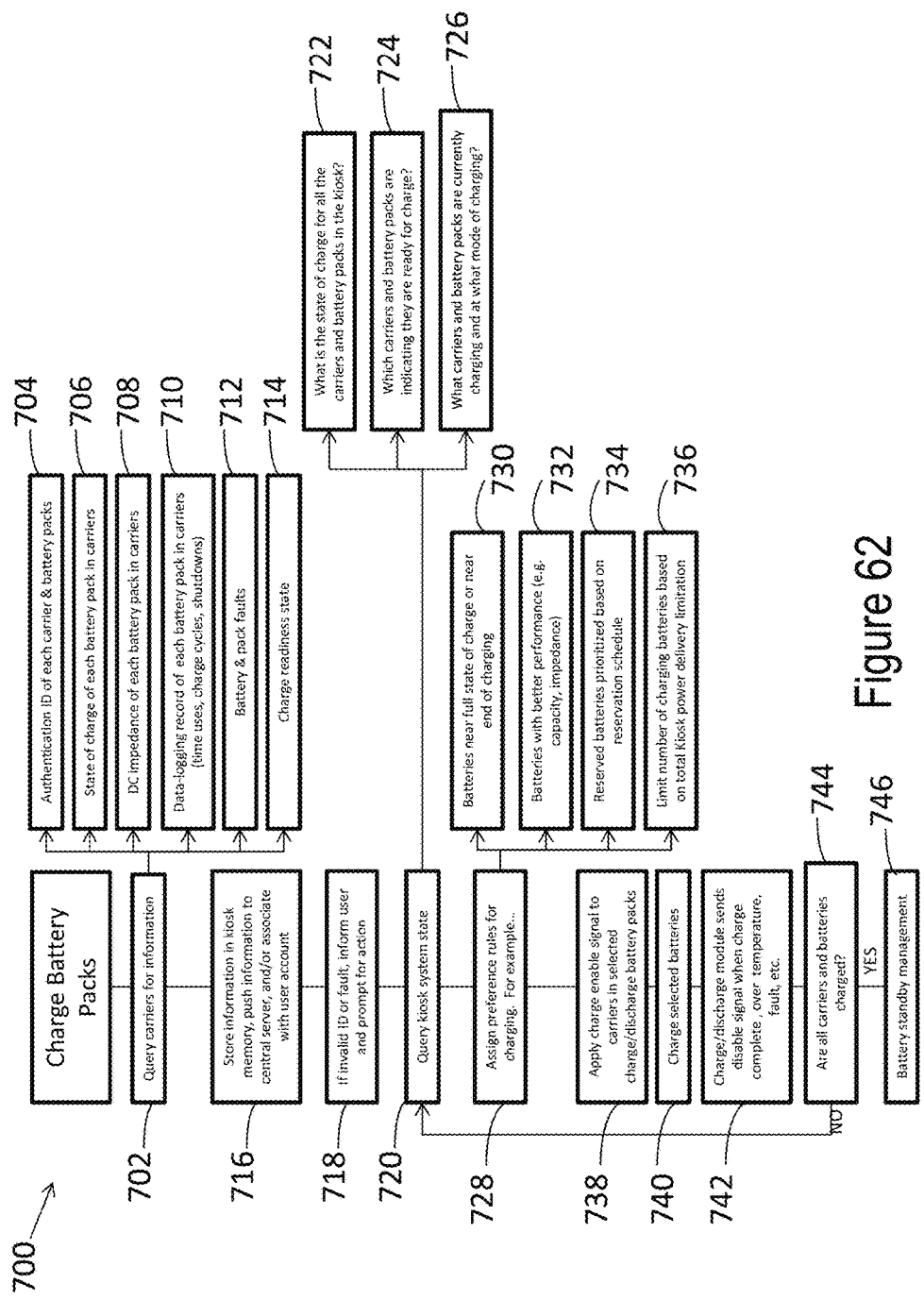
FIG. 62 is an exemplary flow chart for charging battery packs in a carrier in a kiosk of the rental system of FIG. 57.

In an alternate exemplary embodiment, the carrier 200 does not include a charger and the kiosk 100 does include a charger. In this embodiment, the battery packs 300 may only be charged when the carrier 200 is in the kiosk bin 114 or connected to a separate charger that could provide equivalent charging functionality to that of the kiosk 100. Referring to FIG. 62, in an exemplary embodiment, the kiosk 100 may include software and/or hardware programmed to implement a process 700 to actively manage the charging of multiple carriers 200 and battery packs 300 received in the bins 114. At step 702, each time a carrier 200 is returned to the kiosk 100, the kiosk CPU 140 queries returned carrier 200 for information about the authentication ID (step 704), the state of charge (step 706), the DC impedance (step 708), data-logging information (e.g., time uses, charge cycles, shutdowns, etc.) (step 710), faults (step 712), and charge readiness state (step 714) for each pack in each carrier. At step 716, this information is stored in the kiosk memory/database module 138, transmitted to the central server 160, and/or associated with one or more user accounts. At step 718, if there is an invalid pack ID or fault, the user is informed of the fault and prompted for action (e.g., prompting the user to remove the faulty carrier and battery packs and to insert the correct carrier and battery packs into the bins).

At step 720, the kiosk CPU 140 queries each of the carriers 200 stored in the kiosk 100 for their system state. For example, at step 722, the kiosk CPU 140 queries the state of charge for each of the carriers 200 and battery packs 300 stored in the kiosk 100. At step 724, the kiosk CPU 140 queries which carriers 200 and battery packs 300 are ready for charging. At step 726, the kiosk CPU 140 queries which carriers 200 and battery packs 300 are currently charging and in which mode of charging. At step 730, the kiosk CPU 140 prioritizes the charging order of the carriers 200 based on a variety of preference rules, such as, for example, which battery packs 300 are near full state of charge or end of charging (step 730), which battery packs 300 have better performance (e.g., capacity, impedance) (step 732), when certain carriers 200 and battery packs 300 are reserved for future rental (step 734), and limits on total power delivery capability of the kiosk (step 736).

At step 738, a charge enable signal is delivered via the communications connectors 176, 216 to the carrier(s) that have been selected for priority charging according to the preference rules. At step 740, the carriers 200 that have received the charge enable signals charge the battery packs 300 located in those carriers 200. At step 742, each carrier 200 sends a disable signal to the kiosk CPU 140 when the charging is complete, when the battery packs 300 or carriers 200 exceed a temperature threshold, or when there is a fault in the charging. Upon sending the disable signal, the carrier 200 will stop charging the battery packs, and the CPU 140 will send a charge enable signal to the next carrier 200 in the priority order. At step 744, the CPU 140 queries the carriers 200 as to whether all of the battery packs 300 in each carrier 200 are fully charged. If not, then the CPU 140 returns to step 728 to reassign priority to the carriers 200. If all battery packs 300 are fully charged, then at step 746, the kiosk switches to a battery pack standby management mode in which it maintains the state of charge of all of the battery packs received in the kiosk.

The carrier 200 can output a power supply signal from the power supply output connector 218 in the form of a waveform that is an approximation of an AC mains line power supply allowing the carrier output to operate nearly all corded electrical devices, including for example, power tools and home appliances such as refrigerators, televisions, etc.

Numerous modifications may be made to the exemplary implementations described above. These and other implementations are within the scope of this application.

The invention claimed is:

1. A portable power supply, comprising:
a direct current (DC) voltage supply input connector configured to receive DC voltage from a DC voltage supply;
an alternating current (AC) voltage supply input connector configured to receive AC voltage from an AC voltage supply;
an output connector configured to couple to an electrical device to provide power to the electrical device;
a voltage controller having a first input coupled to the DC voltage supply input connector to receive the DC voltage and a second input coupled to the AC voltage supply input connector to receive the AC voltage, an output coupled to the output connector, a switch controller, a first switch for connecting and disconnecting the first input to the output to supply the DC voltage to the output, and a second switch for connecting and disconnecting the second input to the output to supply the AC voltage to the output, wherein the switch controller selectively closes and opens the first and second switches to connect and disconnect the first and second inputs to the output.

2. A portable power supply, as recited in claim 1, wherein the switch controller alternates between coupling the first input to the output and coupling the second input to the output.

3. A portable power supply, as recited in claim 1, wherein the switch controller simultaneously couples the first input and the second input to the output.

4. A portable power supply, as recited in claim 1, wherein the DC voltage supply input connector comprises an interface configured to electromechanically mate with a battery pack.

5. A portable power supply, as recited in claim 4, wherein the portable power supply interface is substantially identical to a cordless power tool interface configured to electromechanically mate with the battery pack.

6. A portable power supply, comprising:
a housing, the housing comprising (1) an electromechanical interface configured to removably couple with an electromechanical interface of a battery pack wherein the battery pack electromechanical interface is configured to removably couple with an electromechanical interface of a first electrical device, (2) an input configured to receive an alternating current (AC) power source, (3) an output configured to couple to a second electrical device to provide power to the second electrical device;
a voltage controller coupled to the housing electromechanical interface, coupled to the input, and coupled to the output, wherein the voltage controller is configured (1) to couple the input or the electromechanical interface to the output and (2) to couple the input and the electromechanical interface to the output.

7. A portable power supply, as recited in claim 6, further comprising a rectifier coupled to the input.

8. A portable power supply, as recited in claim 6, further comprising an inverter coupled to the housing electromechanical interface.

9. A portable power supply, as recited in claim 6, further comprising a booster coupled to the housing electromechanical interface.

10. A portable power supply, as recited in claim 6, wherein the voltage controller alternates coupling the input and the electromechanical interface to the output during a cycle of an AC power signal received from the AC power source.

11. A portable power supply system, comprising:
a battery pack;
a first electrical device;
a second electrical device; and
a charging and discharging container having a housing with a receptacle, the receptacle configured to removably receive and electrically connect to the battery pack, a power input connector configured to receive input power from an external power supply, a power output connector configured to deliver an output power from the battery pack, wherein the power output connector is electrically coupleable to the first electrical device to power the first electrical device when the battery pack is received in the receptacle, and wherein the battery pack is electrically coupleable to the second electrical device to power the second electrical device when the battery pack is removed from the receptacle.

12. A portable power supply system, as recited in claim 11, further comprising a charging circuit configured to control charging of the battery pack with the input power when the battery pack is received in the receptacle, and a discharging circuit configured to control discharging of output power from the battery pack to the power output connector.

13. A portable power supply system, as recited in claim 11, wherein the power input connector is configured to receive a source of AC input power.

14. A portable power supply system, as recited in claim 11, wherein the power input connector comprises a first connector configured to receive a source of AC input power and a second connector configured to receive a source of DC input power.

15. A portable power supply system, as recited in claim 14, further comprising an inverter circuit configured to convert DC power output from the battery pack to AC power that is delivered to the power output connector.

16. A portable power supply system, as recited in claim 11, wherein the power input connector is configured to receive AC input power and the receptacle is configured to receive DC input power from the battery pack and the received DC input power is combined with the AC input power and the combined DC input power and AC input power is delivered to the power output connector.

17. A portable power supply system, as recited in claim 16, further comprising a switch network configured to selectively connect the DC input power and the AC input power to the power output connector.

18. A portable power supply system, as recited in claim 17, wherein the DC input power and the AC input power are coupled to the power output connector in parallel.

19. A portable power supply system, as recited in claim 17, wherein the DC input power and the AC input power are coupled to the power output connector in series.

20. A portable power supply system, as recited in claim 17, wherein the DC input power and the AC input power are coupled to the power output connector in an alternating manner.

21. A portable power supply system, as recited in claim 17, wherein the DC input power and the AC input power are coupled to the power output connector in a simultaneous manner.

22. A portable power supply system, as recited in claim 16, further comprising a rectifier, wherein the AC input power is coupled to an input of the rectifier and the rectifier outputs rectified AC input power to the power output connector.

* * * * *